US006847979B2

(12) United States Patent
Allemang et al.

(10) Patent No.: US 6,847,979 B2
(45) Date of Patent: Jan. 25, 2005

(54) CONCEPTUAL FACTORING AND UNIFICATION OF GRAPHS REPRESENTING SEMANTIC MODELS

(75) Inventors: Dean T. Allemang, Boston, MA (US); Mark A. Simos, Watertown, MA (US)

(73) Assignee: Synquiry Technologies, LTD, Belmont, MA (US)

( * ) Notice: Subject to any disclaimer, the term of this patent is extended or adjusted under 35 U.S.C. 154(b) by 278 days.

(21) Appl. No.: 10/204,792

(22) PCT Filed: Feb. 23, 2001

(86) PCT No.: PCT/US01/06038

§ 371 (c)(1),
(2), (4) Date: Aug. 23, 2002

(87) PCT Pub. No.: WO01/63382

PCT Pub. Date: Aug. 30, 2001

(65) Prior Publication Data

US 2003/0050915 A1 Mar. 13, 2003

Related U.S. Application Data

(60) Provisional application No. 60/185,096, filed on Feb. 25, 2000.

(51) Int. Cl.[7] .............................................. G06F 17/00
(52) U.S. Cl. ..................... 707/102; 707/104.1; 345/440
(58) Field of Search ................................. 707/102, 100, 707/101, 104.1; 345/440

(56) References Cited

PUBLICATIONS

*PROMPT: Algorithm and Tool for Automated Ontology Merging and Alignment*, Natalya Fridman Noy and Mark A. Musen, © 2000, American Association for Artificial Intelligence, 6 pages.

*Primary Examiner*—Uyen Le
(74) *Attorney, Agent, or Firm*—Gordon E. Nelson

(57) ABSTRACT

Techniques for factoring one or more source graphs into a composite graph containing nodes representing analogous elements of the source graphs and a variability graph containing nodes representing differences in the source graphs. The composite graph is made by taking analogous input trees from the source graphs and traversing the trees from top to bottom looking for nodes in each tree at each level that are analogous to the nodes at that level in the other input trees. The sets of analogous nodes are found by first automatically correlating the nodes in the level currently being examined. Correlation may, for example, be based on similar values of a property of the nodes being correlated. Representations of the sets of correlated nodes are then displayed to a user, who indicates which sets of correlated nodes are in fact analogous. The user may also indicate that the nodes in a set of correlated nodes are not analogous or that nodes that were found by the automatic correlation not to be autonomous are in fact. The analogous nodes are allocated to a corresponding node at a corresponding level in the composite graph; the other nodes are allocated to a set of anomalous nodes. One application for the techniques is managing graphs which are models of catalogs of items.

30 Claims, 29 Drawing Sheets

CONCEPTUAL FACTORING AND UNIFICATION OF GRAPHS REPRESENTING SEMANTIC MODELS

CROSS REFERENCES TO RELATED APPLICATIONS

The present patent application claims priority from U.S. provisional patent application No. 60/185,096, Dean T. Allemang and Mark A. Simos, Conceptual factoring and unification: an automated, human-in-the-loop procedure for factoring source metadata with repetitive substructure and analogous content into multiple, nonredundant interacting semantic models, filed Feb. 25, 2000.

BACKGROUND OF THE INVENTION

1. Field of the Invention

The invention relates generally to the manipulation of representations of graphs in computer systems and more specifically to automated techniques for conceptually factoring and/or unifying graphs.

2. Description of Related Art

Information is useful only if it is accessible. There are two senses in which it must be accessible: those who need it must have physical access to it, and it must be indexed or cataloged so that those who need a particular item of information can easily find what they want. The data processing and communications revolutions of the second half of the twentieth century made it possible both to store much more information and to provide much more physical access to the stored information than ever before. The database technology component of the data processing revolution also made data cataloging and indexing easier than ever before, but the users of the information needed far more flexibility in finding, viewing, and analyzing the information than the relatively rigid database systems could provide.

The development of electronic commerce, or E-commerce, made flexible access to information more important than ever before. If E-commerce is to succeed, a Web merchant has to offer the E-shopper easier access to the goods or services being being sold than what the shopper can get by ordering from a mail-order catalog or by going to the local shopping mall. To the shopper, access is only easy if it is access the way the shopper wants to have it, and in the E-commerce context, that means that the Web merchant must offer the shopper as many different ways to access the goods or services as there are kinds of shoppers.

A particularly effective way of providing flexible access to information is that described in the PCT International Application PCT/US00/01042, J. Anthony, A system for composing applications based on explicit semantic models, event driven autonomous agents, and resource proxies, filed 14 Jan. 2000 and published Jul. 20, 2000 as International Publication Number WO 00/42529. FIGS. 1–12 of PCT/US00/01042 are included in the present patent application along with those parts of the Detailed Description that describe them. The system that is the subject matter of PCT/US00/01042 will be termed in the following the Ariadne system. In the Ariadne system, representations of graphs are used to organize information. Vertices in the graphs represent items of information and concepts that organize the items of information and edges in the graphs represent relationships between the vertices. In E-commerce, the items of information are typically product descriptions, while the concepts organize the product descriptions so that the Web shopper can access them in various ways. For example, a description of a given kind of shoe may be accessible not only via the concept "shoes", but via concepts such as "leather", "men's wear", "formal wear", "color", and so forth. The concepts themselves are organized into models. Each model belongs to a particular model type. The model type for the model specifies the properties of the edges that connect the vertices representing the concepts. An overview of the Ariadne system's graphs, models, and model types may be found in the sections Using graphs to specify multiple aspects of a collection of data through Relating concepts to the world in the Detailed Description of the present patent application.

While Ariadne models make providing flexible access to information easier than ever before, the models must be made and maintained. When Ariadne is used for E-commerce, for example, the models that describe the products must be made. There is information and to spare in catalogs and databases about the products to be accessed using Ariadne models, but the models must still be made from the information A solution to that problem is described in the PCT international application PCT/US01/02688. J. S. Anthony and Dean T. Allemang, Software composition using graph types, graphs, and agents, filed 26 Jan 2001. As described in PCT/US01/02688, the Ariadne system uses graphs and agents, programs that are executed in response to events in the context provided by one or more models, to automatically convert catalogs represented in XML into Ariadne models. The same techniques can be used to convert other legacy representations of information into Ariadne models.

The maintenance problem, however, remains. It has two aspects: eliminating redundant information in a single model and integrating information from different sources.

Eliminating Redundant Information

Because catalogs are linear, they contain much redundant information; this information remains in the Ariadne model made from the catalog. The redundant information creates many problems:

Catalog size may increase, in some cases at a nonlinear rate relative to the number of truly is new categories that are being added to the catalog.

It is difficult to maintain catalogues consistently: updates may need to be made at numerous points within a structure.

Any given catalog structure will favor only certain styles of navigating and querying the catalog, with inadequate user support for other styles and other scenarios. Awkward "climb-around" navigation may be required to move to a conceptually closely related topic that is distant within the actual hierarchy. Mitigating this problem with ancillary links specified by human catalogers does not scale or persist well; such links are effort- and knowledge-intensive to create, maintain, and change over time.

Integrating Information from Different Sources

Reconciling information from different sources requires that the person doing the reconciling understand the differences between the sources and make tradeoffs between standardization and inclusiveness. Beginning with understanding the differences between the sources, when there are discrepancies between subtrees of a vendor's product catalog, the discrepancies may represent different language choices of different catalogers on different days, temporary gaps in the product line, or logical differences in the two contexts (say, men's vs. women's clothing). When we are integrating models from independent sources (for example, from two different vendor's catalogs) there are likely to be even more discrepancies of this kind. We need a technique that makes it possible to deal with such discrepancies quickly and in a uniform manner.

In making the tradeoff between standardization and exclusiveness, current technologies allow only two approaches: either a "one size fits all" approach which requires that each source of metadata conform to a single set of categories or a "kitchen sink" approach which takes the union of all the categories represented by all the sources. Hybrid approaches, like a fixed standard or "generic" model which defers to local models for any non-common sources, do not escape the problems of the two basic approaches.

There are numerous drawbacks to each approach.

For the standard model approach:

Standard sets of categories are often strongly resisted by different stakeholders in the business context—this is the case both within the enterprise, as in efforts at knowledge dissemination and centralized knowledge sharing, and in cross-enterprise contexts like buisness-to-business (B2B E-commerce.

Where standard sets pf categories can be adopted, there must be a design process for creating the standards; and this process, if not simple creation of categories by fiat, must involve some systematic study of candidate sources to synthesize a standard.

Once the standard set of categories is designed, each metadata source must do an initial conversion of its material to fit that standard. This is also an effort and knowledge intensive process.

Unless the independent information sources convert their own catalogs to the single standard, additional work will need to be done every time new inventory is made accessible via the standardized categories. The problem becomes more acute when there is a need to evolve the separate categories by, say, adding new lower-level categories. These must somehow be reconciled with the standard.

For the "kitchen sink" union of all local metadata approach:

The solution winds up with many spurious duplicate categories in the main model. Some might represent true duplicates, others might represent homonyms or categories from different sources with a common name but different interpretation.

Even where the categories have distinct names, the converse problem exists. Sometimes the different names represent significant differences in the categorized content, other times, the different names are names used in different contexts for similar items.

Interpreting these connections between categories is certainly difficult to do. But if it is not done when the main catalog is made, we simply burden the user of the main catalog with the work. The user will need to make these interpretations every time a search for a specific item is performed, the user will have to make the interpretations without the catalogers' knowledge, and will have to do this even though the correct interpretations change slowly, if at all. So the "union" solution is in effect a non-solution that leaves the user to deal with problems that should have been solved by the catalogers.

The union approach does create categories that provide access, via a single query, to content from multiple original sources. For example, if clothing from different catalogs were integrated in this way, "Women's Garments" would be listed from Merchandiser A, "Women's Clothes" from Merchandiser B. No category would show both in a common query. Even if the system supported queries on multiple categories simultaneously (effectively, union vs. intersection operations) to return the content classified in multiple categories within a single list, the user would still need to know that these two categories were the ones to select. Of course, the more sources there are, the greater the burden on the user to select the proper categories.

There are some obvious other operational drawbacks, such as: large relative size of the common "kitchen sink" catalog; sensitivity of that catalog's look and feel to local changes made by separate catalog sources (either new categories get migrated in, changing the main catalog; or they don't and they have no connectivity to the main catalog); and the fact that, to disambiguate the categories, the typical trend will be towards explicit inclusion of the information source as part of the category (e.g., "Merchandiser A Women's Clothes", "Merchandiser B Women's Garments"). At this point the union catalog is providing little value other than a single point of access for multiple collections. No real semantic integration has been performed.

For both the approaches listed above, there is another serious drawback. So far we have discussed the integration problem from the point of view of the information source, e.g., a merchandiser's catalog. But, particularly in a B2B context, the consumer, procurement or demand side will have the same needs for customized categories to streamline repeated buying decisions. Neither the "one size fits all" nor the "kitchen sink" approach provides any means to support customer-specific views into the category system of this kind.

The reason that present approaches fail to address so many of these problems is that they all attempt to coordinate multiple information sources using an information representation that is no more powerful than the one used in the sources. For instance, we cannot reconcile discrepancies among several taxonomies with a single taxonomy without resorting to either one or the other of "one size fits all" and "kitchen sink". The solution is to migrate to a richer semantic framework such as the one provided by the Ariadne system. To make the migration, techniques are needed for transforming existing information sources into richer semantic frameworks. Providing such techniques is an object of the present invention.

SUMMARY OF THE INVENTION

The techniques automate the operation of combining models. With the techniques, systems can be built which permit a user to easily and efficiently produce a constellation of factored models from one or more source models. The constellation of factored models includes a composite model in which common aspects of the source models are combined and a variability model which contains the differences between the models. The constellation loses none of the information of the source models and allows the information of the source models to be accessed in ways not possible with the source models.

A key technique in making the composite model is unifying analogous nodes of the source models in the composite model. The technique automatically correlates child nodes belonging to parent nodes from one or more graphs other than the composite model with each other and with any child nodes of a parent node in the composite model and then displays the correlations in a user interface.

A user then indicates whether he or she takes the correlated nodes to be analogous; if they are and they are not correlated with a child node that is already in the composite node, child nodes corresponding to the correlated nodes are added to the child nodes of the composite model's parent node. The above technique can be used with input trees from the source models; in this case, the technique can be employed recursively to unify analogous nodes at all levels of the input trees.

Another key technique in making the composite model is using the structure of the source models to determine whether a node from one of the source models is correlated with a node from another of the source models. In this technique, the first node's relationship to at least another node in its source model is analyzed to produce a first result and the second node's relationship to at least another node in its source model is analyzed to produce a second result, and the results are used to determine at least in part whether the first node is correlated with the second node.

Other objects and advantages will be apparent to those skilled in the arts to which the invention pertains upon perusal of the following Detailed Description and drawing, wherein:

BRIEF DESCRIPTION OF THE DRAWING

FIG. 31 shows how an anomalous concept may be dealt with.

Figure 1:
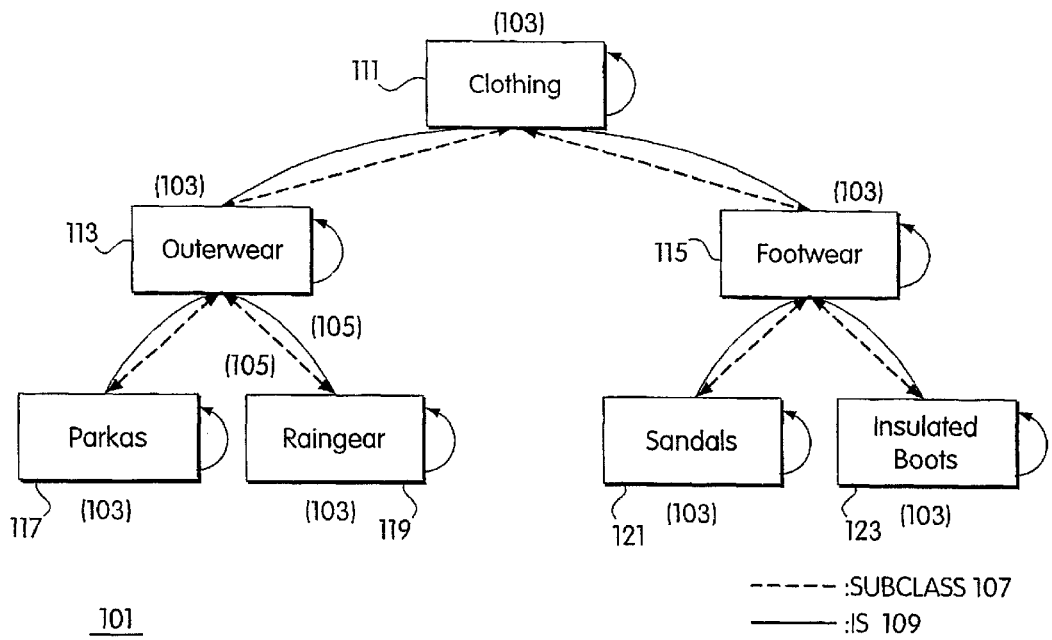
FIG. 1 illustrates how graphs may be used to show relationships among entities.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The first part of the Detailed Description is an overview of the Ariadne system from PCT/US00/01042; the description of the techniques for conceptual factoring and unification employed in the Ariadne system begins with the section Conceptual factoring and unification.

Using Graphs to Specify Multiple Aspects of a Collection of Data: FIG. 1

For purposes of the following informal discussion, the term graph is used in the sense of a set of points where at least one of the points is connected to itself or another point by an arc. The points are termed the vertices of the graph and the arcs are termed its edges. In the graphs used in the invention, the vertices represent entities such as concepts and the edges represent relationships between the concepts. In FIG. 1, graphs are used to represent a taxonomy 101 of concepts relating to clothing. The concepts belonging to a given taxonomy are related to each other in both a top-down fashion, i.e., from the most general concept to the least general concept, and a bottom-up fashion, i.e., from the least general concept to the most general. In the top-down relationship, the concepts are related as class and subclass; for example, in taxonomy 101, footwear is a subclass of clothing and insulated boots is a subclass of footwear. The bottom-up relationship is termed an is a relationship, i.e., insulated boots is one of the concepts of footwear and footwear is one of the concepts of clothing.

Thus, in taxonomy 101, each vertex 103 represents a concept relating to clothing, and edges 105 connect the vertices 103. The arrowhead on the edge indicates the direction of the relationship. There are two graphs in FIG. 1; one graph, indicated by dashed straight lines 107, indicates the subclass relationships between the concepts represented by the vertices; the other graph, indicated by solid arcs 109, indicates the is a relationships. Thus, graph 107 shows that outerwear 113 and footwear 115 are subclasses of clothing 111 and parkas 117 and raingear 119 are in turn subclasses of outerwear 113. Further, as shown by solid arcs 109, sandals 121 has an is a relationship to footwear 115, footwear 115 has an is a relationship to clothing 111, and so forth for the other concepts. Each concept has a solid arc 119 pointing to itself because each concept is itself, and therefore has an is a relationship with itself.

Subclass graph 107 and is a graph 109 thus organize the set of clothing concepts in FIG. 1 according to two aspects: a subclass aspect and an is a aspect. Subclass graph 107 tells us that outerwear 113 has two subclasses: parkas 117 and raingear 119; is a graph 109 tells us that outerwear 113 is clothing 111. Graphs 107 and 109 make it possible to consider any concept in taxonomy 101 from the point of view of its subclass relationships to other concepts and from the point of view of its is a relationships to other concepts. The operation of considering an entity in taxonomy 101 first as it belongs to one of the graphs and then as it belongs to another of the graphs is termed pivoting. The concepts of FIG. 1 can of course have relationships other than those of taxonomy 101, and those relationships, too, can be represented by graphs made up of concepts belonging to the set shown in FIG. 1 and edges connected to them. Each such graph organizes the set of clothing concepts according to another aspect, and pivoting permits a given concept to be seen according to any of the aspects represented by any of the graphs that the concept belongs to.

Figure 2:
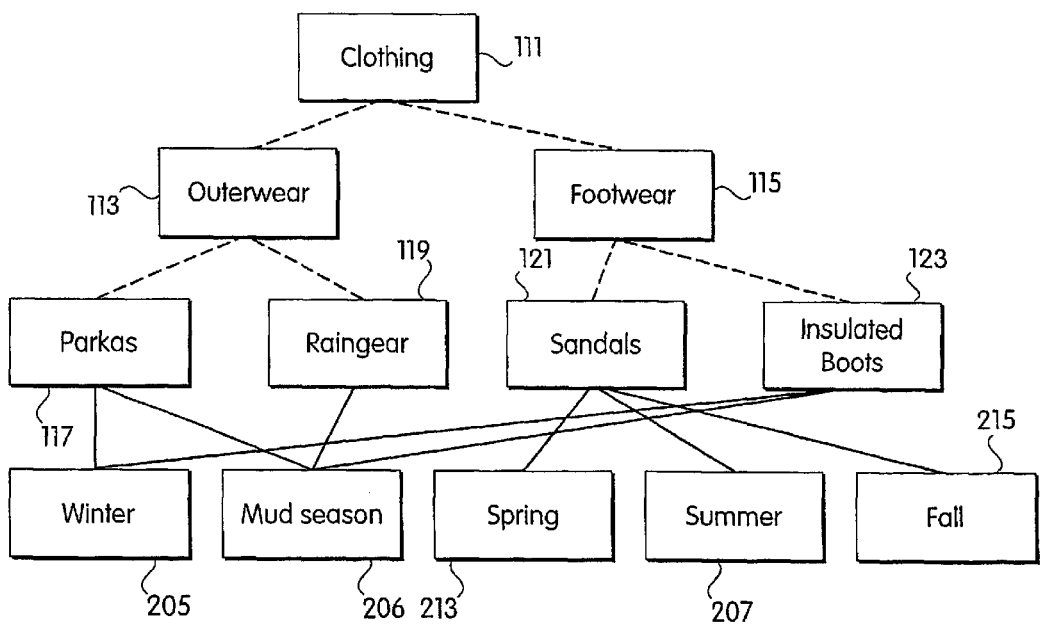
FIG. 2 shows a complex model.

Models and Facets: FIG. 2

Taxonomy 101 is of course only one of many possible ways of organizing the set of concepts shown in FIG. 1. In the following discussion, a particular way of organizing a set of concepts or other entities is termed a model. Thus, in FIG. 1, the concepts are organized according to a taxonomy model. As we have seen, when concepts are organized in this fashion, the relationships between them are shown by two graphs: subclass graph 107 and is a graph 109; each of these graphs is termed a facet of the model; thus the taxonomy model of FIG. 1 has a subclass facet 107 and an is a facet 109. The pivoting operation permits a concept in the set to be considered according to each of the facets that the concept belongs to.

The model of FIG. 1 is simple, i.e., it is a single taxonomy. A model may, however, also be complex, i.e., composed of two or more models. FIG. 2 shows such a complex model 201. In FIG. 2, the set of concepts of FIG. 1 has been expanded so that the items of clothing can be organized according to the season they are appropriate for. The new concepts represent the five seasons of the New England climate: winter 205, mud season 206, spring 213, summer 207, and fall 215. The set of concepts shown in FIG. 2 is organized according to complex model 201, which in turn is made up of two simple models. Clothing taxonomy model 209 is the taxonomy model shown in FIG. 1; seasonal clothing model 211 is a model of type simple graph which relates concepts representing clothing to concepts representing the five New England seasons. The facets of model 211 relate a season concept to clothing concepts for the kinds of clothing worn in the season and a clothing concept to the seasons in which the clothing is worn. The concepts parkas 117, raingear 119, sandals 121, and insulated boots 123 belong to both models. Considered as part of clothing model 209, sandals 121 is a subclass of footwear 115; considered as part of the seasonal clothing model, sandals 121 is related to the seasons in which sandals are worn, namely spring, summer, and fall. Outerwear 113, on the other hand, belongs only to clothing model 209, while winter 205 belongs only to seasonal clothing model 211.

Complex models permit additional operations. For instance, pivoting may be used with complex model 201 to consider a given concept according to each facet of each of the models the concept belongs to. For example, the concept sandals may be considered on the one hand as it is related to the concepts of clothing model 209 and on the other as it is related to the concepts of seasonal clothing model 211. Moreover, since each model organizes the concepts in different ways, the models define different sets of concepts and set operations such as union, intersection, difference, and set xor may be applied.

Model Types

Any set of entities which belongs to a taxonomy can be organized by means of a taxonomy model like model 209. Just as all taxonomies are alike in how they organize the entities that belong to them, any taxonomy model will have an is a facet and a subclass facet and similar relationships will exist between the entities belonging to a given facet. Moreover, any user of a taxonomy model will want to perform similar operations using the taxonomy. For example, a user will want to display all of the concepts that are subclasses of a given concept or all of the concepts that a given concept has an is a relationship with. One can thus speak of the taxonomy model type, and all other models will similarly belong to model types. As with models, a model type may be either simple or complex. Because all models belonging to a given model type have similar operations, it is possible to define those operations for the model type and make them automatically available for any model of the type.

In the present invention, users of the invention may define their own model types or use model types defined by others. A model type is defined as follows:

a facet specifier specifies each of the facets belonging to models of the type;

within each facet specifier, a relation specifier that specifies how entities joined by an edge of the facet are related;

a propagation specifiers for the facets and/or the entire model; a propagation specifier specifies how operations belonging to models having the model type are performed.

The model type for the taxonomy model thus has a subclass facet specifier for the subclass facet and an is a facet specifier for the is a facet. The relation specifier for the subclass facet specifies that the subclass relationship is transitive, non-reflexive, and non-symmetric. The fact that the relationship is transitive means that if entity A is a subclass of entity B and entity C is a subclass of entity B, then entity C is a subclass of entity. A, or in terms of FIG. 1, that parkas 117 is a subclass of clothing 111. The fact that the subclass relationship is non-reflexive means that an entity cannot be a subclass of itself (which is why there are no edges of subclass graph 107 connecting an entity to itself). The fact that the relationship is non-symmetric means that if entity B is a subclass of entity A, entity A cannot be a subclass of entity B or in terms of FIG. 1, if parkas 117 is a subclass of outerwear 113, outerwear 113 cannot be a subclass of parkas 117. The relation specifier for the is a facet specifies that the is a relationship is transitive, reflexive, and non-symmetric. Thus, as shown in FIG. 1, parkas 117 is itself as well as outerwear and clothing, but if parkas are outerwear, then outerwear cannot be (just) parkas.

The relation specifiers are used to define procedures for adding concepts to models belonging to the class. For instance, if new concepts, say swimwear, bathing suits, and wetsuits are added to the model of FIG. 1, with swimwear being a subclass of clothing and bathing suits and wetsuits being subclasses of swimwear, the relation specifiers will ensure that there are edges in the subclass facet connecting clothing to swimwear and swimwear to bathing suits and wetsuits, but no edges in the subclass facet connecting clothing to wetsuits or bathing suits to wetsuits, and will similarly ensure that there are edges in the is a facet connecting each of the new concepts to itself and wetsuits and bathing suits to swimwear and swimwear to clothing, but no edges connecting wetsuits and bathing suits to clothing and none connecting wetsuits and bathing suits to each other.

One example of a propagator for a taxonomy is a subclass display propagator that displays all of the subclasses belonging to a class. The subclass display propagator works by simply following the subclass facet beginning at the specified class. Thus, if the class is clothing, the display propagator will display outerwear 113, parkas 117, raingear 119, footwear 115, sandals 121, and insulated boots 123. Another example is an is a display propagator that displays the concepts that the specified concept belongs to. This propagator simply follows the is a facet beginning at the specified concept. Thus, for sandals 121, it will display sandals 121, footwear 115, and clothing 111.

Figure 3:
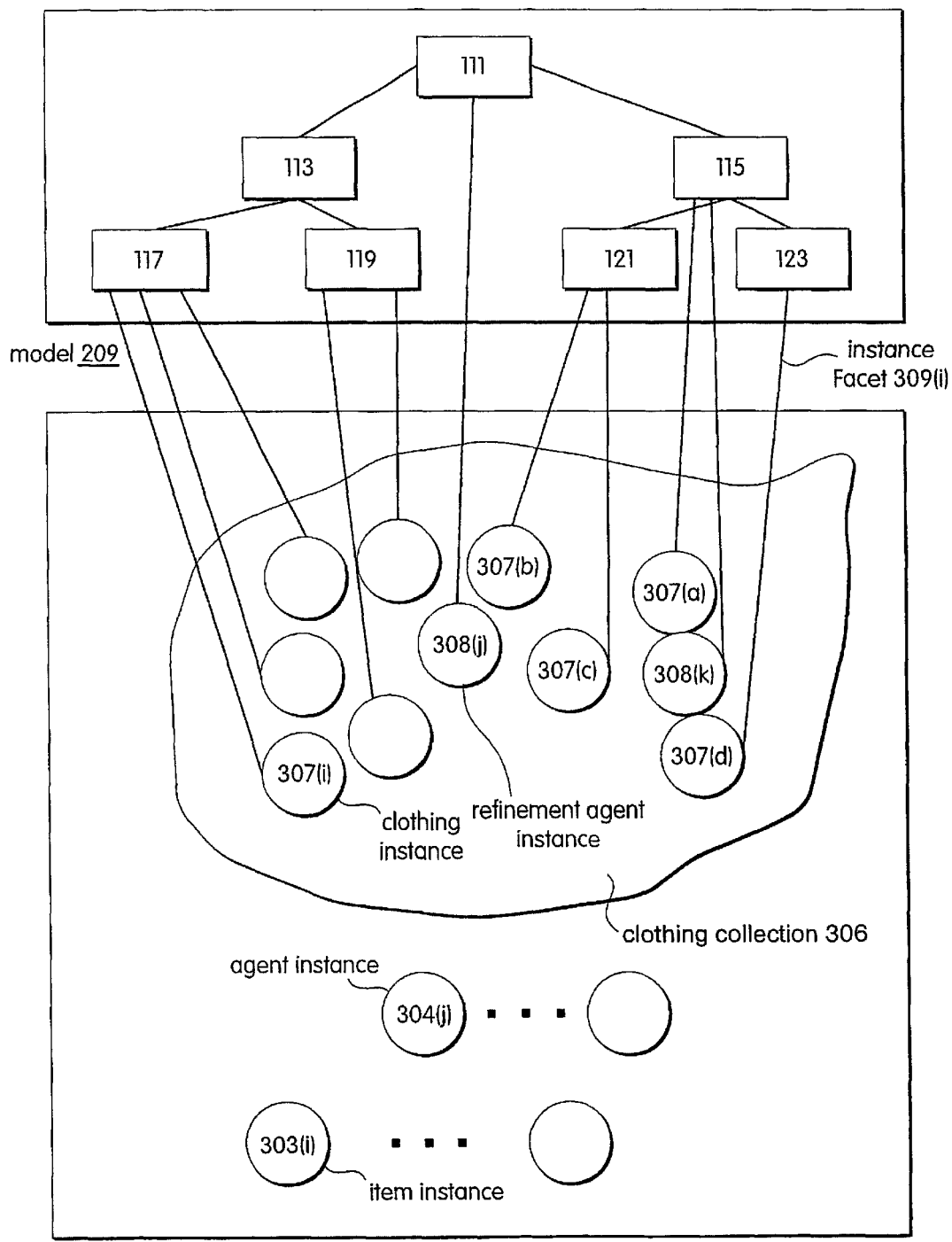
FIG. 3 shows how the concepts of a model are related to instances and agents.

Relating Concepts to the World: FIG. 3

In order to be useful, the cards in a library card catalog relate the concepts used in the catalog to books in the library. The same is true with concepts organized by models. In order for the concepts to be useful, they must be related to entities that are examples of the concepts. In the invention, an entity that is or may be an example of a concept is termed an instance, and an instance that is an example of a concept is termed an instance of the concept. It should be pointed out here that one of the things which may be an example of a concept is a model, and thus, an instance may be a model. Using models as instances in other models is one way of making complex models.

All of the instances available to a system in which the invention is implemented is termed the world of the system. In general, one makes a model to deal with a given area from several aspects, and this area is termed the model's subject. For example, the subject of model 209 is clothing and all of the instances of its concepts represent items of clothing. One thus makes a model for a subject and then relates the model to instances in the world that are relevant to the model's subject. The instances in the world that are relevant to a given subject are termed the subject's collection.

FIG. 3 shows how concepts are related to instances in a preferred embodiment. FIG. 3 shows a set 301 of instances representing objects accessible to the system upon which model 209 is being used. This set 301 is termed herein the world of the model. The subject of model 209 is clothing; in FIG. 3, instances belonging to clothing's collection are surrounded by a curve, as shown at 306. Thus, in FIG. 3, model 209 is being applied to world 301, but the instances with which it is actually concerned belong to clothing collection 306. Item instances in clothing collection 306 are consequently termed clothing instances 307. The instances in clothing collection 306 with which model 209 is concerned all represent items of clothing or agents, as will be explained below; however, other instances in clothing collection 306 may represent models. Of course, more than one set of concepts may apply to a subject or a world and a given set of concepts may be applied to different subjects or worlds.

There are two kinds of instances in world 301: item instances 303, which represent items, including other models, that may be related to concepts, and agent instances 304, which represent programs that are executed by models in response to the occurrence of events such as the addition of a concept to the model or a request by a user to view items belonging to a given concept. While the program represented by an agent may be any program at all, the program executes in the context of the model and can thus take advantage of the model's facets and propagators. In effect, the operations defined for the model are available to agents in the same fashion that programs belonging to run-time libraries are available to application programs.

The mechanism by which an item instance 303 or an agent instance 304 is related to a concept is an instance facet 309. There is an instance facet 309 for each instance that is related to a given concept. Thus, instance facets relate clothing instances 307(b and c) to concept 121. Of course, an instance may have instance facets connecting it to more than one concept and even to concepts belonging to different models. Generally, the item represented by an instance has another representation, termed an object, in the computer system. What kind of object an instance represents will depend on the application for which the invention is being used. For example, the clothing instances might represent database identifiers of rows describing products in a database table describing a clothing company's products or they might be URLs of WEB pages describing the products.

Propagators may work on instances as well as concepts. For example, a propagator may be defined for the taxonomy model type which retrieves all of the instances associated with a concept and its subclasses. It does so by first following the instance facets for the concept and retrieving all of the concept's instances. Then it follows subclass facet 107 from the concept to its subclasses, their subclasses, and so on down to concepts which have no subclasses. At each concept, the propagator retrieves the instances associated with the concept. Thus, in FIG. 3, when the propagator is applied to concept 115, it will retrieve the clothing instances 307 labeled a,b,c,d in collection 306.

One agent instance is shown in collection 306: the instance for refinement agent 308. Refinement agent 308 is executed when a concept representing a new subclass is added to model 209. For example, in model 209 as shown in FIG. 1, the concept footwear 115 has two subclasses: sandals 121 and insulated boots 123. Instances which belong to neither of those subclasses belong to footwear. One such instance, 307(a), is shown in FIG. 3. The instance represents gardening clogs. Now, the user of the model is planning to sell more kinds of clogs and consequently decides to add the concept clogs as a subclass of footwear. When that is done, instance 307(a) should become an instance of clogs rather than an instance of footwear. This process of moving an instance into the proper subclass concept is termed refinement, and refinement agent instance 308 automatically does refinement whenever a subclass concept is added to model 209.

In FIG. 3, refinement agent instance 308 is shown attached to clothing concept 111 and to footwear concept 115. Clothing concept 111 is the broadest concept in the model and is termed the root concept of the model. Of course, every model of type taxonomy has a root concept. In models of the taxonomy type, an agent attached to a concept propagates along subclass facet 107; thus, any concept which is a subclass inherits the agent. Consequently, each concept in model 209 has its own copy of refinement agent instance 308. In FIG. 3, only the copies for clothing 111 and footwear 115 are shown. Since each concept has its own copy of refinement agent instance 308, execution of the agents can be done in parallel.

When the user adds the new subclass clogs to footwear 115, that event causes refinement agent instance 308(k) to execute. The program follows the subclass facet to the new subclass concept clogs and examines it to determine whether any of the item instances that are related to it are also related to footwear 115. One such item instance, garden clogs, is, and the program rearranges the instance facets 309 so that there is now an instance facet relating clogs to garden clogs, but no longer an instance facet relating footwear to garden clogs. As can be seen from the foregoing, an agent, while user-defined, operates within the context of the environment provided by the model and takes advantages of the operations defined for the model's type.

Figure 4:
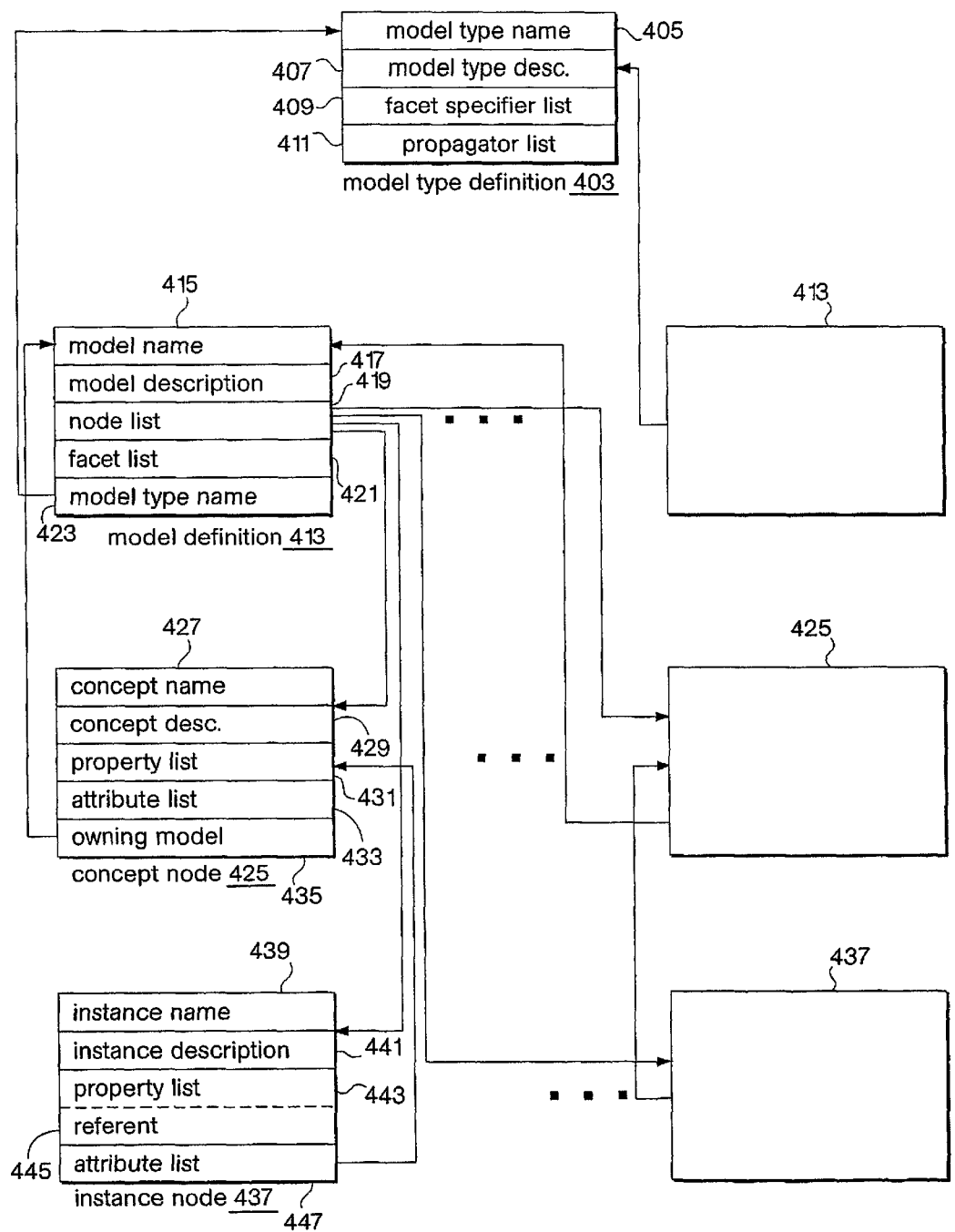
FIG. 4 shows the structures that represent model types, models, concepts, and instances in a preferred embodiment.

Representing Models, Concepts and Instances: FIG. 4

FIG. 4 shows at 401 how the representations of model types, models, concepts, and instances are structured in a preferred embodiment. In overview, as shown by the arrows in FIG. 4, each model definition 413 refers to a model type definition for its model type and to a set of node structures. Some of the node structures represent concepts belonging to the model and others represent instances of the concepts. Each concept node 425 refers to its model and each instance node 437 refers to the concepts the node is instances of. There may be many models of a given model type, a given model may have many concepts, a given concept may have many instances and a given instance may be an instance of many concepts. A model type definition may thus be located from any model definition of its type, a model definition may be located from any of its concepts, and a concept may be located from any of its instances.

Continuing in more detail, model type definition 403 includes the model type's name 405, a description 407 of the model type, a facet specifier list 409 that specifies the kinds of facets that models of the type have, and a propagator list 411 that specifies the propagators for models of the type.

Model definition 413 includes the model's name and description at 415 and 417, a list 419 of the concept and instance nodes in the model, a facet list 421 showing how the model's nodes are related by each facet of the model, and a model type name 423, which refers back to the model type definition 403 for the model.

Concept node 425 includes the concept's name and description at 427 and 429, a property list 431, which is a list of user-defined properties of the concept, and attribute list 433, which is a list of attributes for the concept. Each attribute specifies the name of a facet to which the concept node belongs and the name of the node which is the next neighbor of the concept node in the facet. The facets, and correspondingly, the attributes may be subdivided into model facets, which specify facets whose vertices are made up only of concepts of the model, and instance facets, which specify facets connecting concepts and instances. What kinds of model facets a model has is determined by its model type; in a preferred embodiment, there are three kinds of instance facets that run from the concept to an instance:

- item facets, which connect a concept to an item instance representing an item that belongs to the concept;
- exhibitor facets, which connect a concept to an item instance representing an item that possesses a property specified by the concept; and
- action facets, which connect a concept to an agent instance.

Exhibitor facets are used to deal with concepts like color. A blue clog, for example, exhibits the property of being blue and would therefore be connected to a concept representing the color blue by an exhibitor facet. Owning model 435, finally, refers to model definition 413 for the model the concept belongs to.

Instance node 439, finally, has an instance name 439, an instance description 441, and a property list 443 for the instance. Included in property list 443 is referent 445, which specifies how to locate the object represented by instance node 439. What the referent is depends on what kind of object the instance node represents. For example, if the instance node represents a Web page, the referent will be the page's URL; if it represents an agent, it may be a pathname for the agent's code; if it represents another model, the referent will be the model's name. Attribute list 447, finally, specifies the instance facets that run from the instance to the concepts it belongs to. There is one such facet corresponding to each of the instance facets running from the concept to the instance. Each of these facets is termed the dual of the corresponding facet. Thus, the item of facet is the dual of the item facet; exhibitor of is the dual of the exhibitor facet; and action of is the dual of the action facet.

Applying all of the foregoing to concept 115 of model 209, we see that concept node 425 for that concept has model attributes for the subclass facet for concepts 121 and 123 and for the is a facet for itself and for concept 111, an item instance attribute for clothing instance 307(*a*), and an action instance attribute for refinement agent instance 308(*k*). Instance node 437 for clothing instance 307(*a*) has an item of instance attribute for concept 115 and the instance node for refinement agent instance 308(*k*) has an action of attribute for concept 115.

In a preferred embodiment, the structures that make up the components of a model are all linked by name, and hash functions and hash tables are used to relate names in the structures to the locations of the structures in memory. For example, to find a concept instance, the preferred embodiment takes the name and presents it to a hash function, which hashes the name to obtain an index of an entry in a hash table and uses the index to find the entry for the name in the hash table; that entry contains a pointer to the location of the concept instance. In other embodiments, other techniques such as pointers might be used to link the components of the structures 401 that represent a model.

Figure 5:
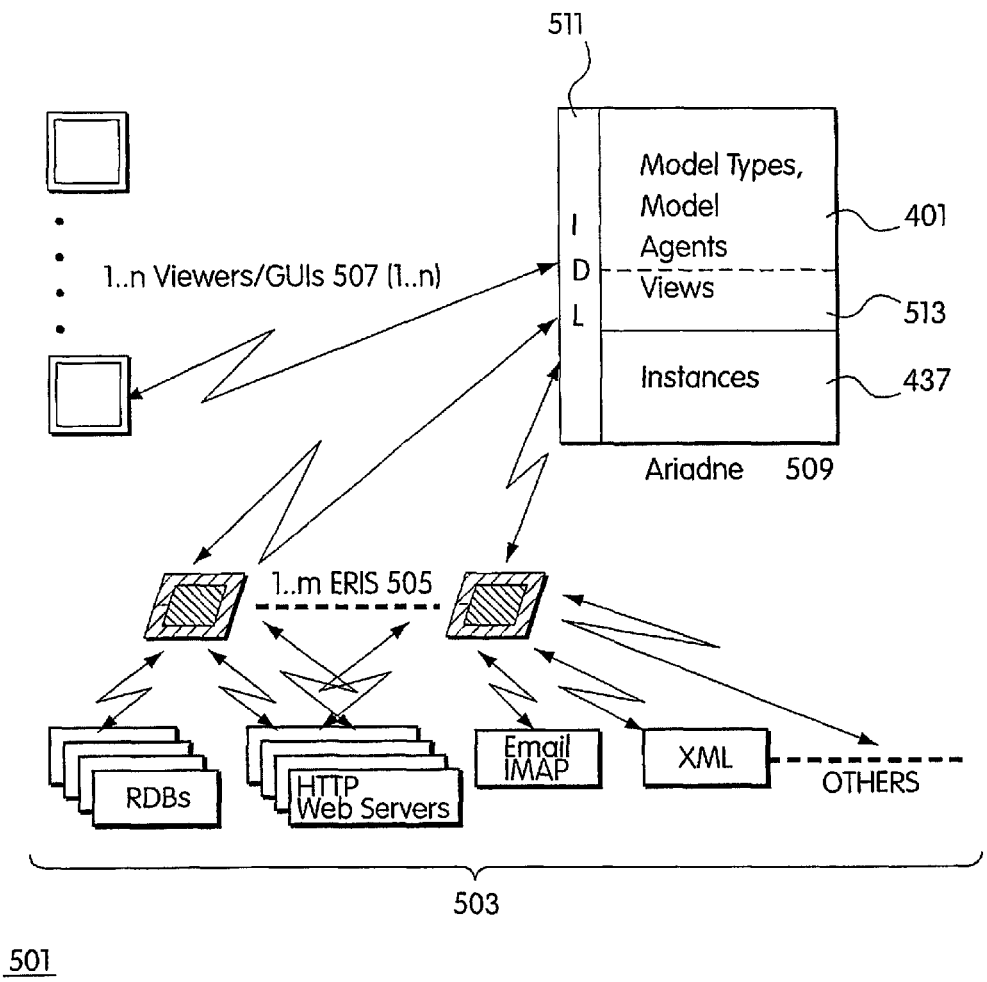
FIG. 5 is an overview of a system in which models and model types are implemented.

A System that Uses Models to Organize Information: FIG. 5

FIG. 5 is an overview of a system 501 that uses models to organize information. The system, called Ariadne, has three major components:

- server 509 maintains the data structures 401 that implement model types, models, and instances, together with views 513, which provide logical descriptions of models and their parts, but do not specify how the model will appear in a specific GUI.
- a number of viewers 507, which present the contents of the views as required for particular graphical user interfaces (GUIs); and
- ERIS (external resource interface system) 505, which provides access to the systems 503 that contain the objects represented by instances 407.

Server 509 may be implemented on any kind of computer system, and viewers 507 may be monitors, Web browsers, PC's or other systems that have either local or remote access to the computer system upon which server 509 is implemented. As shown in FIG. 5, the outside systems accessed via ERIS 505 may include relational database systems, with the objects being records or queries, Web servers, with the objects being Web pages, email systems, with the objects being email messages, and systems that use XML as their interface to other systems. The viewers 507 and the components of ERIS 505 interact with the model types, models, agents, views, and instances by way of interfaces 511 defined using Interface Definition Language (IDL).

An example of how system 501 functions is the following: A user of a viewer 507(*i*) is interacting with clothing model 209 via a graphical user interface and wishes to see all of the instances of footwear that are currently available in collection 306 of clothing model 209. The user specifies footwear concept 115 and a "display instances" operation. This operation specification arrives via IDL 511 in server 509, and the propagator for the taxonomy model type which retrieves instances retrieves the instances that are related to concepts footwear 115, sandals 121, and insulated boots 103. Ariadne server 509 then typically makes a list of the instances represented by the objects for display in viewer 507($i$). If the user of the viewer selects one or more of the instances from the list, Ariadne server 509 provides the referents 445 for the objects represented by the selected instances to ERIS 505, which retrieves the objects referred to by the referents and returns them to Ariadne, which then makes a display using the retrieved objects and sends the display to viewer 507($i$). For example, if the clothing instances represent Web pages containing catalog descriptions of the items, when the user of viewer 501 selects an item from the list, Ariadne server 509 will provide the URL for the item's web page to ERIS 505, ERIS 505 will fetch the Web pages, and Ariadne 509 will provide them to viewer 507($i$). Ariadne server 509 also provides views 513 which permit a user at viewer 507($i$) to define, examine, and modify models. The user interfaces for doing so will be explained in detail later on.

Figure 6:
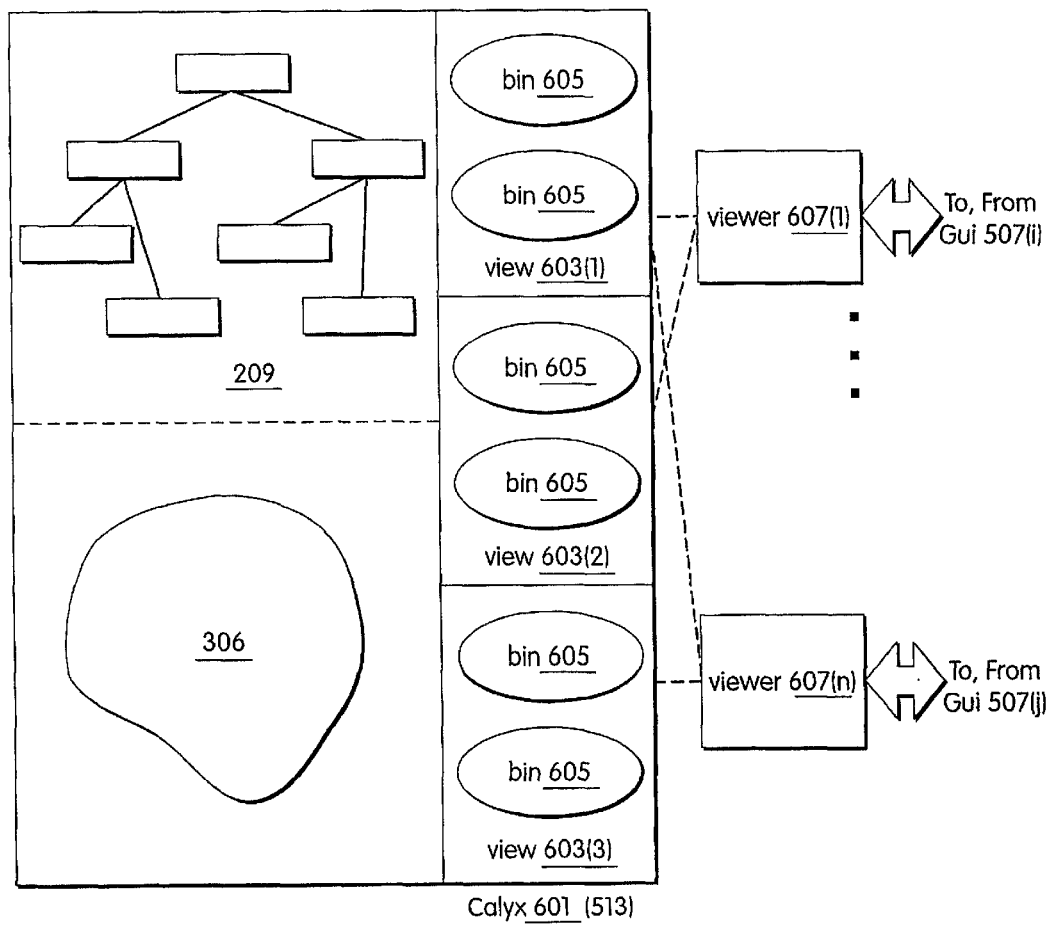
FIG. 6 is an overview of views and viewers in the system of FIG. 5.

Details of Views 513: FIG. 6

FIG. 6 shows details of the implementation of views 513 in a preferred embodiment. Models may have multiple views and views may have multiple presentations. The implementation supports different presentations of the same model concurrently, collaborative modeling and real time knowledge sharing, and independent yet sharable knowledge explorations.

In Ariadne, views are implemented in a subsystem known as Calyx. Calyx 601 is a CORBA server which exports via IDL specifications an abstract interface for views. Calyx 601 could also be any other distributed middleware server (for example, proprietary RPCs or DCE or possibly DCOM). A view 603 is a collection of bins 605 of information about the target source: A model or a world. Bins hold information such as the current objects being shown, whether the attributes of an object along any given facet are expanded, what facet a bin is looking at, etc. The typical representation 601 of a view is a structure containing (among other things) a container of bins 605.

All views and bins (as well as any other externally accessible resource) are referenced by opaque IDs which are presented to any viewer 607 logging into Ariadne. A viewer 607 is a active object through which the abstract information is displayed. Each viewer takes the abstract information maintained by Calyx in a view 601 and presents it in a manner which is consistent with the interface requirements and look and feel of a given GUI. For example, a taxonomy might be represented by a graph, an outline, or simply as an indented list of text and the viewer will use whatever resources are provided by its GUT to make the representation. For example, an outline might be presented by a Java Swing tree widget or an MFC tree widget.

As may be seen from the dashed lines in FIG. 6, a view 601 may be shared by a number of viewers 607. Calyx ensures that all viewers 607 that use a given view 6021($i$) are synchronized to the most recent changes in view 602($i$). When a viewer 607($j$) requests Calyx to update or otherwise change part of the view (say, expand a node in a bin), Calyx performs this operation for viewer 607($i$) and then asynchronously sends the update information to all other viewers actively using the view in question. These requests by Calyx to such viewers are client requests to server portions in those viewers. Hence, Calyx is a client and the viewers must implement a server interface for these asynchronous updates.

Calyx also supports (via the model and world infrastructure) various operations on the contents of bins. Specifically, various set operations (union, set difference, intersection, etc.) may be applied to arbitrary sets of bins. Additional operations may be defined by the user. The effect of the set operations is to apply the operation on the sets of information represented in the bin to produce a new bin (called a composition bin) with the computed resulting information. This is then propagated to all connected viewers. Further, bins may be combined in this way to create constraint networks of composition bins. If any bin in the network is changed (manually or via automated updates) the effect is propagated throughout the entire affected subnetwork in which the bin is connected. These propagated results are sent to all viewers via the asynchronous operations described above.

Separation of Levels of Information in the Implementation: FIGS. 3–6

An important characteristic of Ariadne is the manner in which complexity is reduced and flexibility increased by separating various levels of information from each other. One of these is the separation of model types from models, as seen in the separation of model type definition 403 from model definition 413 in FIG. 4. Another is the separation of models from instances, as seen in FIGS. 3 and 4; this permits multiple models to be built independently of each other and yet work over the same world. It also permits models to be reused in different worlds. Yet another is the separation of an instance from the object that it represents, so that the instance serves as a proxy for the object, as seen in with regard to referent property 445 in FIG. 4 and the use of ERIS interface 505 to retrieve objects represented by referents from a number of different information sources 503. Then there is the agent/model separation: agents run in the context of models, but they are defined in terms of model types, not the individual models. For example, the refine agent will work with any model that has the taxonomy type. Finally, as seen in FIGS. 5 and 6, views 601 are separated from models and worlds and viewers 607 are separated from views 601.

The User Interface for Building, Modifying, and Displaying Models: FIGS. 7–12

A particular advantage of model types is that they greatly simplify the construction and modification of models. They do so because the part of Ariadne which constructs models can use the information in the model type to automatically place concepts in the proper facets and in the proper locations in those facets and to propagate information provided by the user to the concepts that require it. One example of such propagation is the propagation of the refinement agent from the root of a model of the taxonomy type via the subclass facet to all of the concepts in the model.

Figure 7:
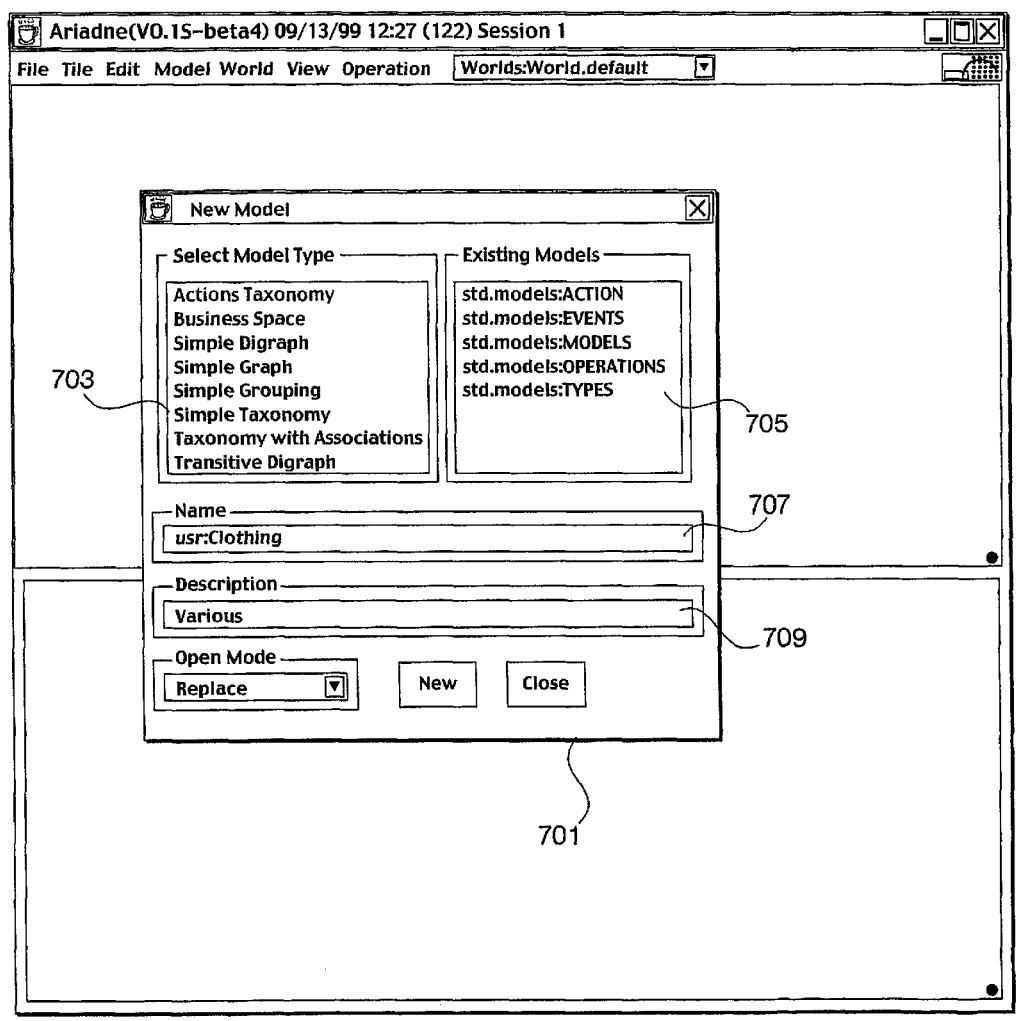
FIG. 7 shows a user interface for defining a new model.

FIG. 7 shows the dialog box 701 used in a preferred embodiment to create a new model. At 703 there appears a list of the presently-available model types; the user has selected simple taxonomy, indicating that the new model is to have the simple taxonomy model type; in the name box, the user has input "usr:Clothing", indicating that that is to be the name of the new model; at 709, the user may input the description. The result of these inputs is of course the construction of a model definition 413 for the new model, with model name 415 being "usr:Clothing" and model type name 423 being "Simple Taxonomy". List 705 gives an example of what can be done with models. In Ariadne, models themselves are instances in a model whose concepts are model types; one can thus simply select an already-made model from that model. In instance node 437 for an instance representing a model, referent 445 simply specifies the location of the model's model definition 413. The action model similarly treats agents as instances of a model whose concepts are the model types the agents are written for.

Figure 8:
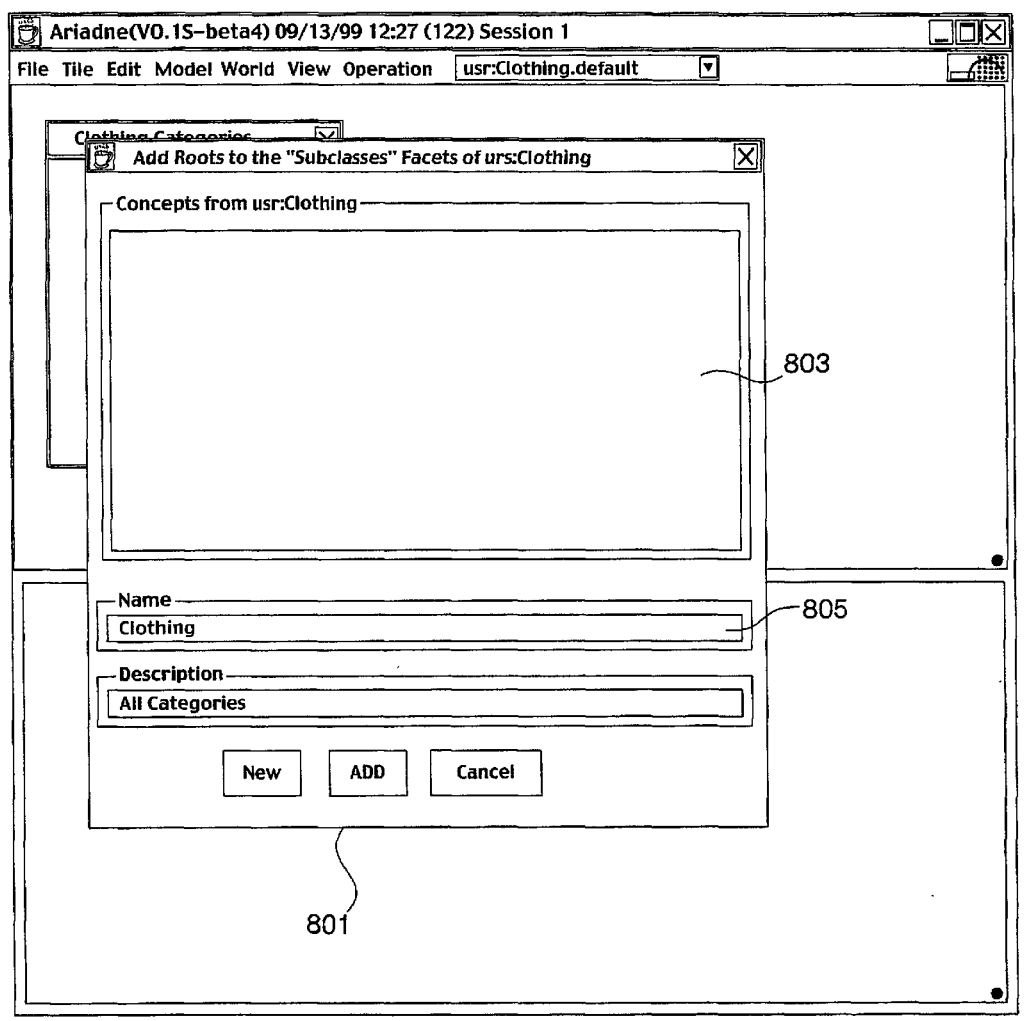
FIG. 8 shows a user interface for defining a root concept.

FIG. 8 shows the dialog box 801 used to add a root concept to the subclasses facet of the new model "Clothing". At 803 would normally appear the concepts that are presently in the model; the field is empty, as the model as yet has no concepts. At 805, the user writes the name of the root concept, and as before, the user may also add a description. The result of these inputs is the creation of a concept node 425 with the name "Clothing" in field 427 and the model name "usr:Clothing" in field 435. Since "Clothing" is a root concept and there are no other nodes, the taxonomy type requires that there be as yet no subclass attributes in attribute list 433, but a single is a attribute for "Clothing" itself, and Ariadne automatically adds these to "Clothing"'s concept node 425.

Figure 9:
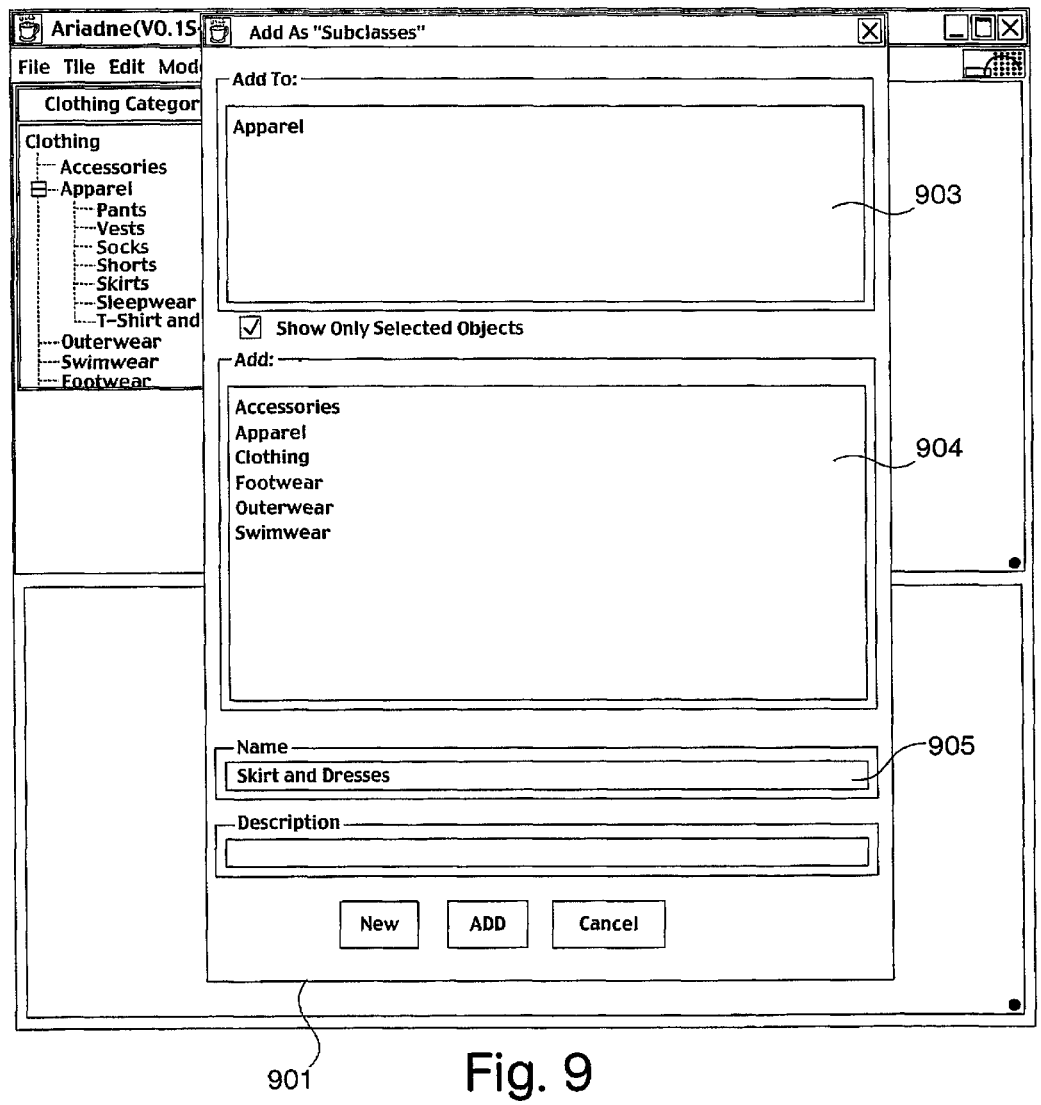
FIG. 9 shows a user interface for adding a subclass concept to a model of the taxonomy type.

FIG. 9 shows the dialog box 901 used to add subclasses to an existing taxonomy model. Here, the model already has as subclasses of the root concept clothing the concepts accessories, apparel, swimwear, and footwear, and further subclasses are being added to the apparel subclass. At 903, the name apparel of the concept to which subclasses is being added appears; at 904, names of already existing concepts appear; since only the first level of concepts have as yet been defined, the names are those of concepts at the same level as apparel; at 905, finally, is a field for adding a newly-made concept.

A user may add a subclass either by selecting from among concepts listed in 904 or by using field 905 to add a newly-made subclass. For each newly-made subclass concept that is added, Ariadne creates a concept node 425 with the name of the concept at 427 and the name of the model at 435; for each concept being added as a subclass, Ariadne adds attributes in attribute list 433 for the is a facet specifying the new concept node itself and the concept node for the apparel concept. Ariadne further creates an attribute in attribute list 433 in the concept node for the apparel concept for the subclass facet which specifies the new concept node. Thus, when all of the subclasses have been added, they all belong to the subclass and is a facets in the manner required for the taxonomy model type. It should be pointed out here that if the user attempts to select one of the concepts listed in 904 to be added to apparel, Ariadne will determine from the model type that this is not possible in the taxonomy model type (in a taxonomy, a concept at one level of the taxonomy may not be a subclass of another concept at the same level) and will not add the concept but will indicate an error. In other embodiments, Ariadne may simply not display concepts that cannot be added to the concept selected at 903.

Figure 10:
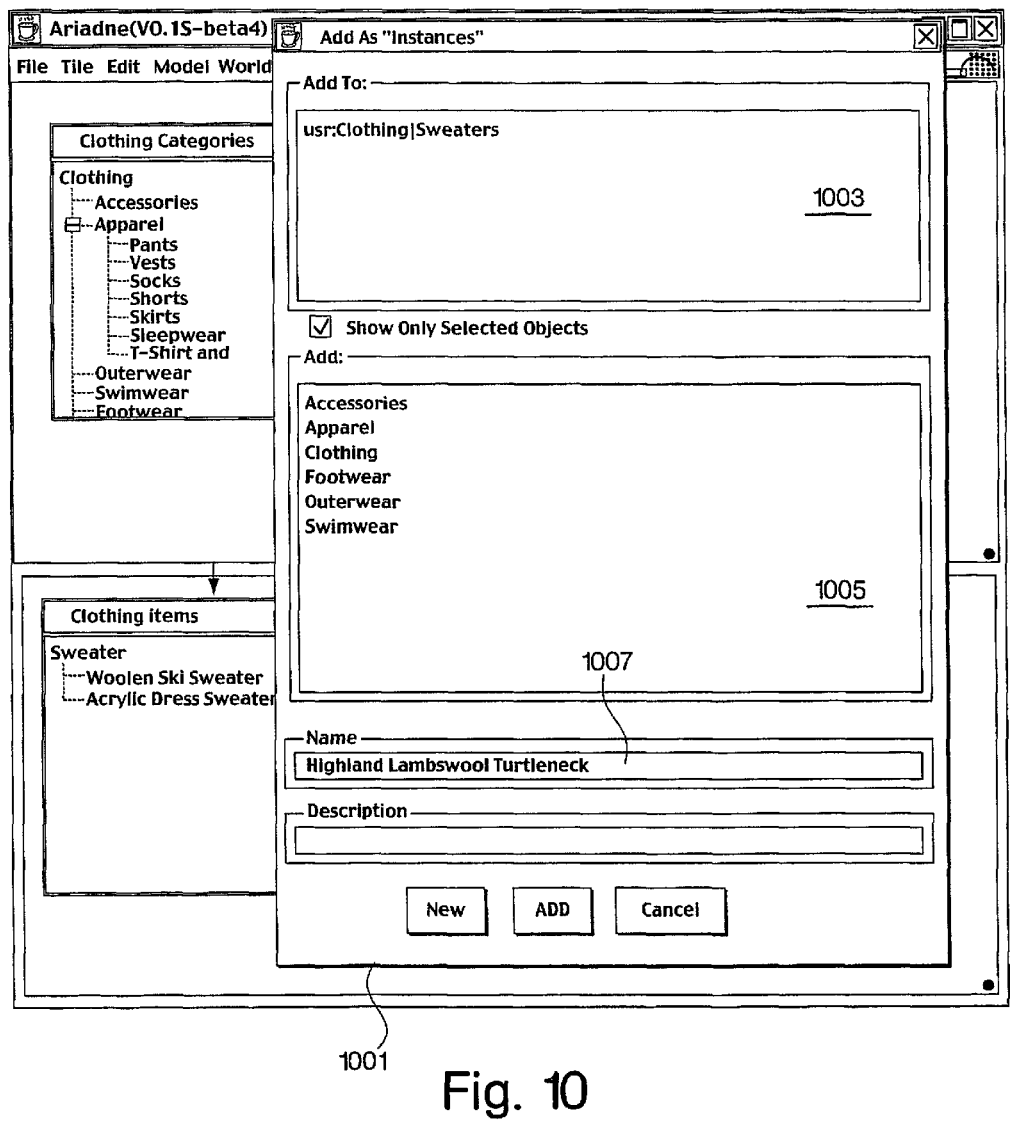
FIG. 10 shows a user interface for adding an instance to a concept of a model.

FIG. 10 shows dialog box 1001 used to relate instances to a concept. Dialog box 1001 has the same form as dialog box 901, with area 903 containing the name of the concept to which the instances are being related, area 905 containing the names of instances that are available to be added to the concept, and field 1007, which can be used to add a newly-made instance. When a newly-made instance is added, an instance node 437 is created for the instance, with the instance's name at 439 and any description provided by the user at 441. For a newly-made or previously-existing instance, an attribute for the item of facet that indicates the concept sweaters is added to the instance node's attribute list 447, and one for the item facet that indicates the instance is added to the concept node's attribute list 433. Similar dialog boxes are used to add agents and items that are exhibitors, with corresponding modifications in the attribute lists of the concept and instance nodes. Ariadne also has a copying interface that can be used to select instances belonging to a concept in one model to become instances of a concept in another. The attribute lists 433 off the instance nodes for the copied instances are modified to add attributes for the instance of facet specifying the concept, and the other concept's attribute list 433 is modified to include attributes for the instance facet for the newly added instances.

Figure 11:
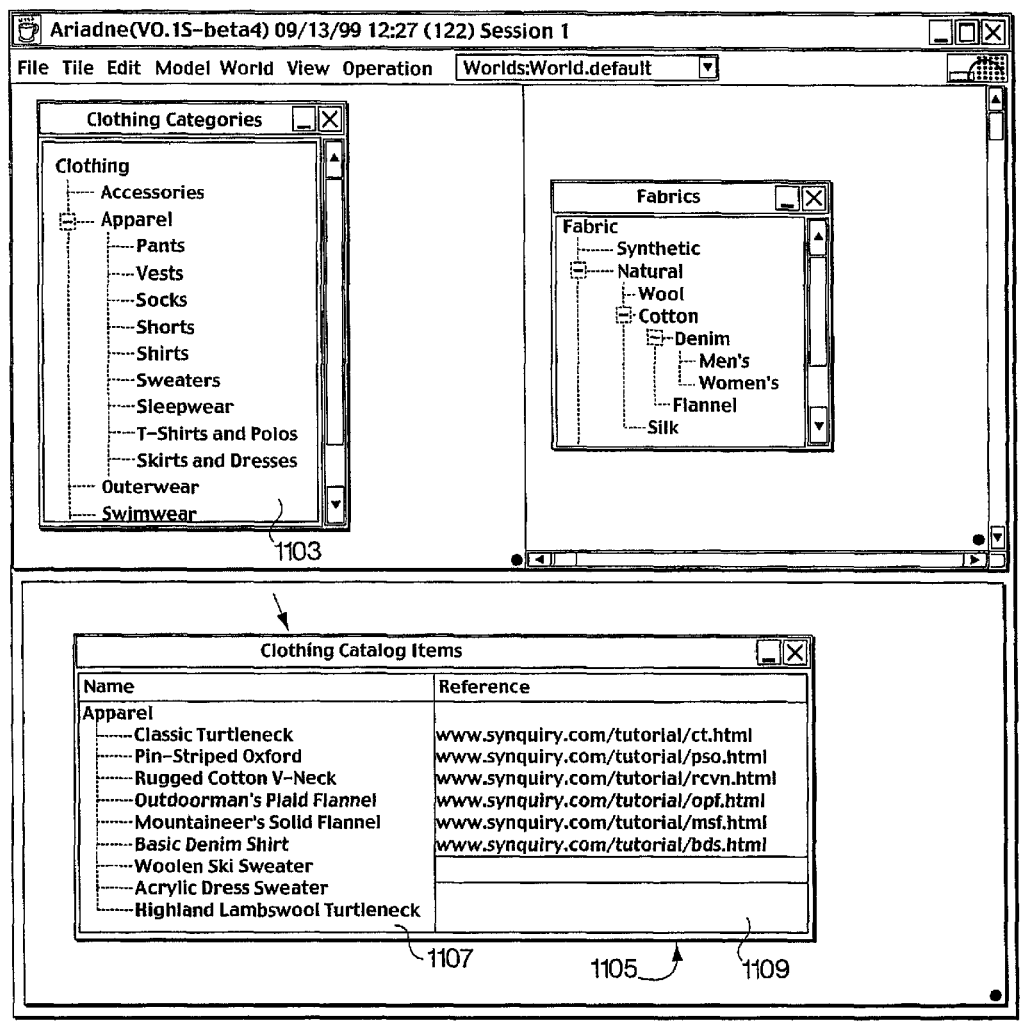
FIG. 11 shows a user interface for adding a referent to an instance.

FIG. 11 shows how referent fields 445 are set in instance nodes 437. Window 111 has three subwindows: two show models that apply to the clothing world: "clothing categories" and "fabrics". Both models belong to the taxonomy type, and thus both can be displayed as outlines, as shown at 1103. The user wishes to add referents, in this case the URLs of Web pages that show the items represented by the instances, to the instances that belong to the concept "apparel". In terms of facets, that is all of the instances which have an is a relationship to "apparel", that is, the instances that are related to "apparel" and all of its subclasses. To perform this operation the user selects "apparel" in outline 1103; Ariadne then uses a propagator for the taxonomy model type to generate the list seen at 1107, which is the list of all of the instances that belong to "apparel" and its subclasses. To assign an URL to an instance, the user writes the URL opposite the instance in field 1109. The URL for a given instance goes into referent 445 in node 437 for the instance.

Figure 12:
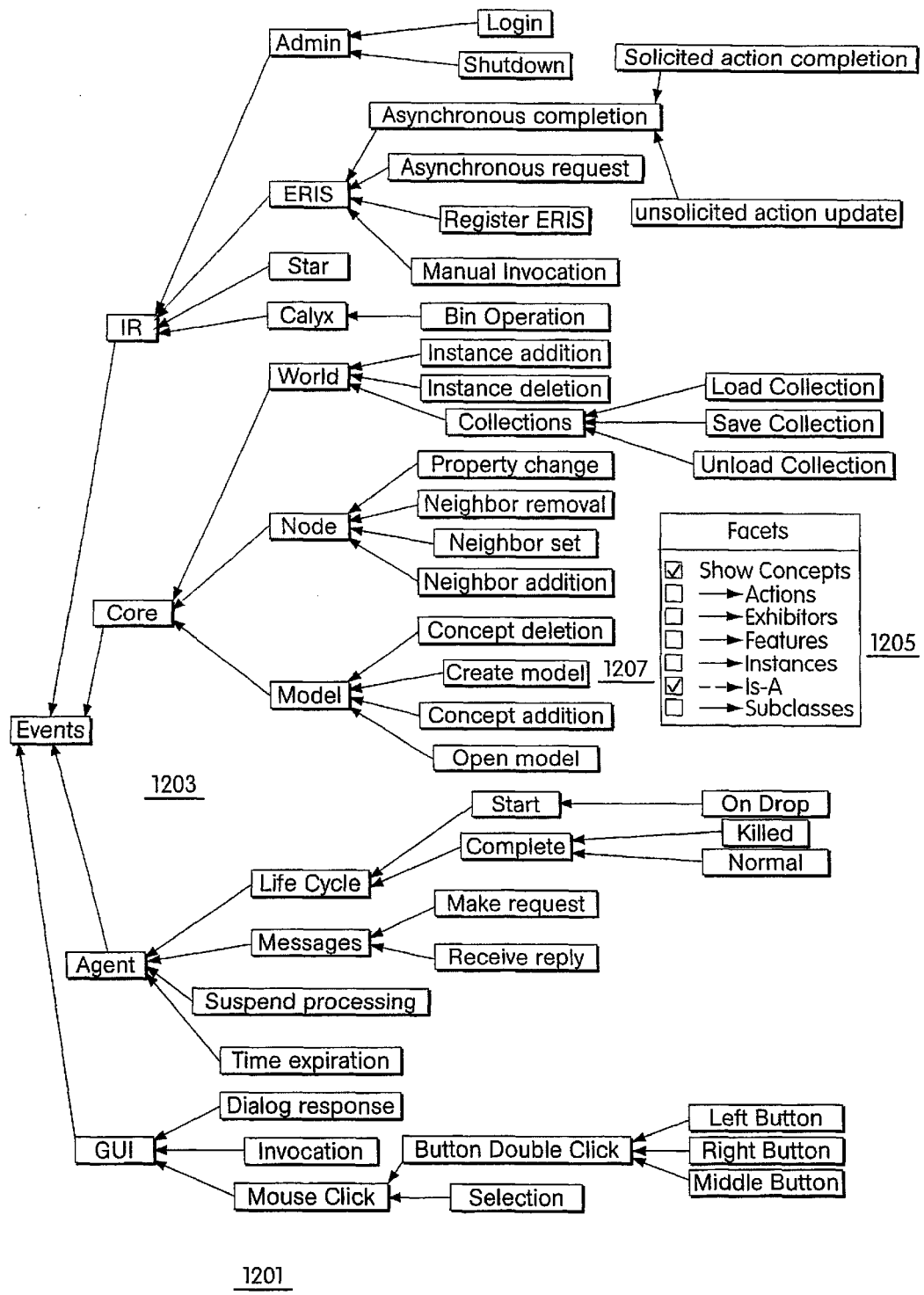
FIG. 12 shows a user interface for displaying a model.

FIG. 12 shows how Ariadne displays a model. Model 1201 is a taxonomy of the events handled by Ariadne. The boxes are the model's concepts and the arcs 1203 are the arcs of one of the facets, in this case, the is a facet. Selection of facets to be viewed is controlled by check box 1205; as seen there, model 1201 is to be displayed showing its concepts and its is a facets. More than one facet may be selected, in which case, the arcs for each selected facet are displayed simultaneously.

Conceptual Factoring and Unification

This document describes a general graph transformation capability which we call conceptual factoring and unification (CFU). The CFU transform operates on an input model or set of models with highly repetitive or redundant substructure; these repetitive regions are rooted at concepts which are identified by the user in initiating the transform. The transform pulls the common subtrees of models into separate factored models. One model (the composite model or C) represents a kind of normalized template for common parts of the subtrees; the other model (the variability model or V) represents the axes of variability covered by the substructures as a set.

The terms factoring and unification suggest the dual nature of the transform. On the one hand, it requires splitting or factoring original input model(s) into components representing common and variant aspects of the collections respectively. On the other hand, in particular to create the composite model, it requires comparison and synthesis (or unification) of similar model structures. Furthermore, since models to which the CFU transform may be profitably applied typically categorize analogous but non-overlapping sets of data, the result of the transform is a set of models that provide the ability to treat disparate collections in a unified way.

The CFU transform is implemented as a procedure which begins with user establishment of the roots of the composite and variability models, continues with user selection of portions of input models which may be unified in the composite model, then employs algorithmic determination of whether concepts are candidates for unification in the composite model, and thereupon uses interactive user verification and/or modification of the results of the algorithmic selection of candidates for unification to allocate concepts to the composite and/or the variability models.

Figure 13:
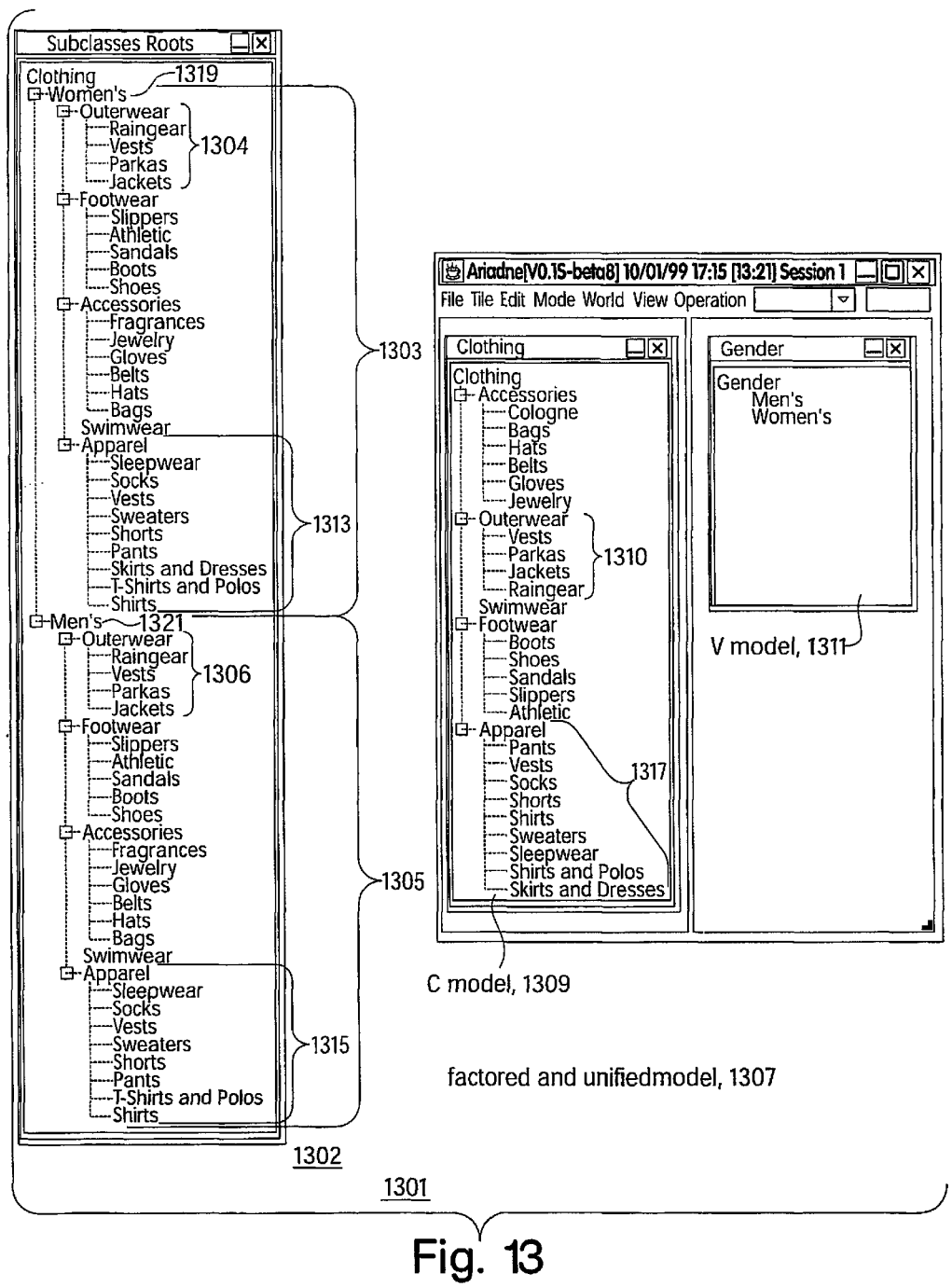
FIG. 13 shows an example CFU transform.

An Example CFU Transformation: FIG. 13

FIG. 13 shows a simple CFU transformation 1301. The starting point is model 1302, which represents the e-catalog of a clothing merchant. In the following, models which are the starting points of CFU transformations will be termed source models. The concepts in model 1302 represent categories of clothing. Model 1302 has the taxonomy model type, with clothing as the highest class in the hierarchy of concepts. There are two major subcategories: Women's and Men's, each of which has a subtree of categories. The Women's subtree is labeled 1303 and the Men's subtree is labeled 1305. As one would expect from the general similarity between men's and women's clothing, the categories in the subtrees are closely related and often identical. For example, Outerwear category 1304 in Women's subtree 1303 has the subcategories Raingear, Vests, Parkas, and Jackets, as does Outerwear category 1306 in Men's subtree 1305.

The result of the transform is constellation 1307, which has two parts, a common factored (C) model 1309 and a variability (V) model 1311. C model 1309 is a Clothing taxonomy model that does not have the Women's and Men's subtrees of the original model 1302, but does have one of every other subcategory of the original model 1302. Thus, instead of two Outerwear subtrees 1304 and 1306, there is a single Outerwear subtree 1310 that contains the categories that belonged to each of subtrees 1304 and 1306. Where two subtrees of model 1302 have different subcategories, C model 1309 includes all of the subcategories. Thus, Apparel subtree 1313 in Women's subtree 1303 and Apparel subtree 1315 in Men's subtree 1305 are identical except that the Women's Apparel subtree 1313 has an additional subcategory, namely Skirts and Dresses. Apparel subtree 1317 in C model 1309 includes Skirts and Dresses as well as the other subcategories of Apparel subtrees 1313 and 1315.

The fact that there are different kinds of clothing for men and women in most of the categories in C model 1309 is captured by V model 1311. V model 1311 is a taxonomy model that has a topmost category Gender and two subcategories: Men's and Women's. Thus, after applying CFU transform 1301, C model 1309 includes specific clothing categories like Shoes and Gloves, and V model 1311 has concepts for the primary differentiator in the inventory, in this case, the categories Men's and Women's. Not shown in factored and unified model 1307 are facets that connect the instances that represent the actual items of clothing that belong to each category to the C and V models. Each instance is connected by an item facet to the proper category in C model 1309 and by another item facet to the proper category in V model 1311. Consequently, an instance for a pair of men's shorts has one item facet to the category shorts in Apparel 1317 of C model 1309 and another item facet to the category Men's in V model 1311.

Note that the concept Men's/Shoes of model 1302 appears nowhere in C model 1309 and V model 1311, but we can still obtain the original sets of instances that were associated with this concept by making queries that use concepts selected from both the C model and the V model. For example, to obtain the instances associated with Men's/Shoes in model 1309, one selects instances that belong to the intersection of the set of instances belonging to Shoes in C model 1309 and the set of instances belonging to Men's in V model 1311. This intersection is of course the set of men's shoes. Not only can we make any query that was possible in model 1302, we can also make simple queries on concepts in the C and V models that return result sets not directly obtainable in the original model. For example, the instances obtained from Shoes include a mix of instances that was obtainable from model 1302 only by querying the Men's and Women's sub-trees separately. This ability to access two originally separate collections of content via a single model is one powerful benefit of the CFU technique.

The CFU technique can also be used in unifying independently developed taxonomies; although in these cases differences between the taxonomies are likely to be noisier and more arbitrary. Suppose we are trying to create a single reseller's or comparison shopping guide's index to two different clothing manufacturers, M. M. Legume and Sky-Front. Suppose we are looking at the men's clothes sections of both catalogues. We find "Men's Shirts" and "Shirts for Men"—are these the same concept? In one sense, they are not, because different instances belong to each concept. In another sense, they are because the two concepts are analogous. As seen from the example of FIG. 13, what CFU is concerned with is analogous concepts. Because that is the case, CFU employs both automatic processing of concepts and human input to determine whether sets of concepts that appear after the automatic processing to be analogous and therefore candidates for unification really can be unified and also to determine whether sets of concepts that do not appear to be analogous nevertheless can be unified.

Figure 14:
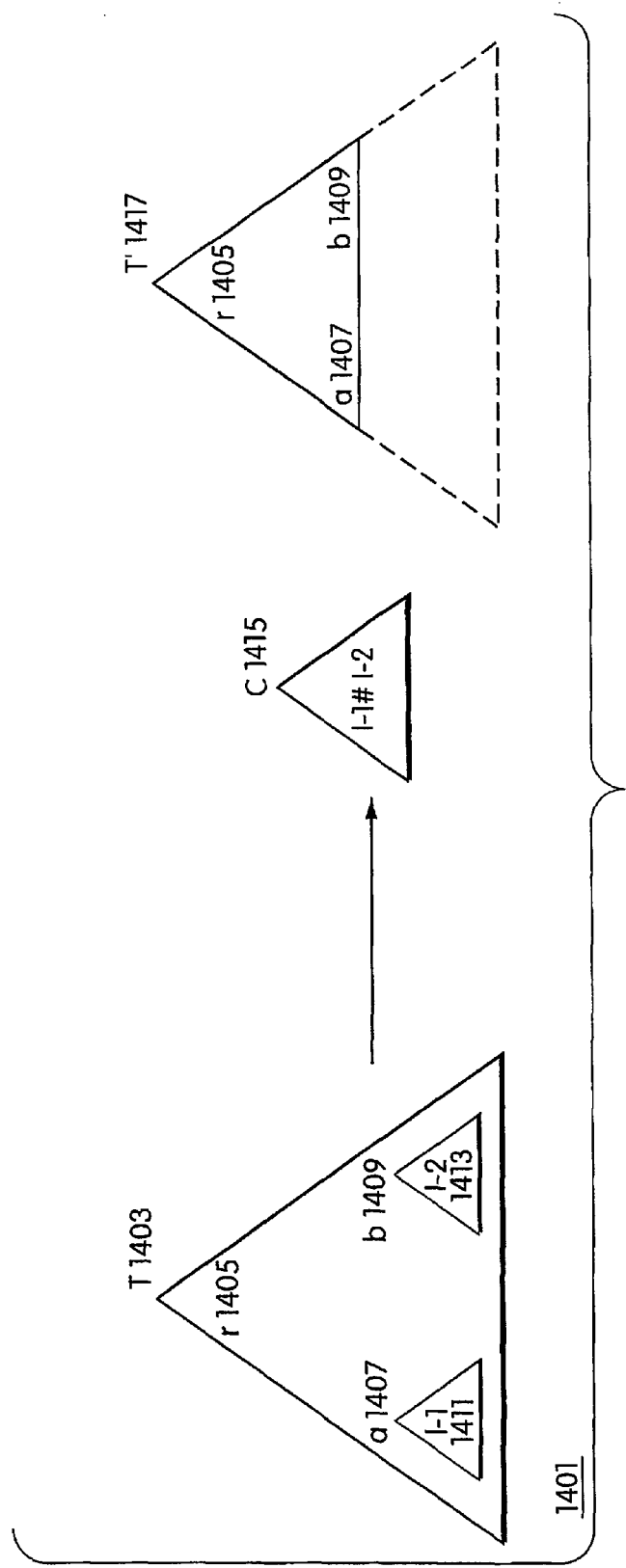
FIG. 14 is a conceptual diagram of the simplest CFU transform.
Figure 15:
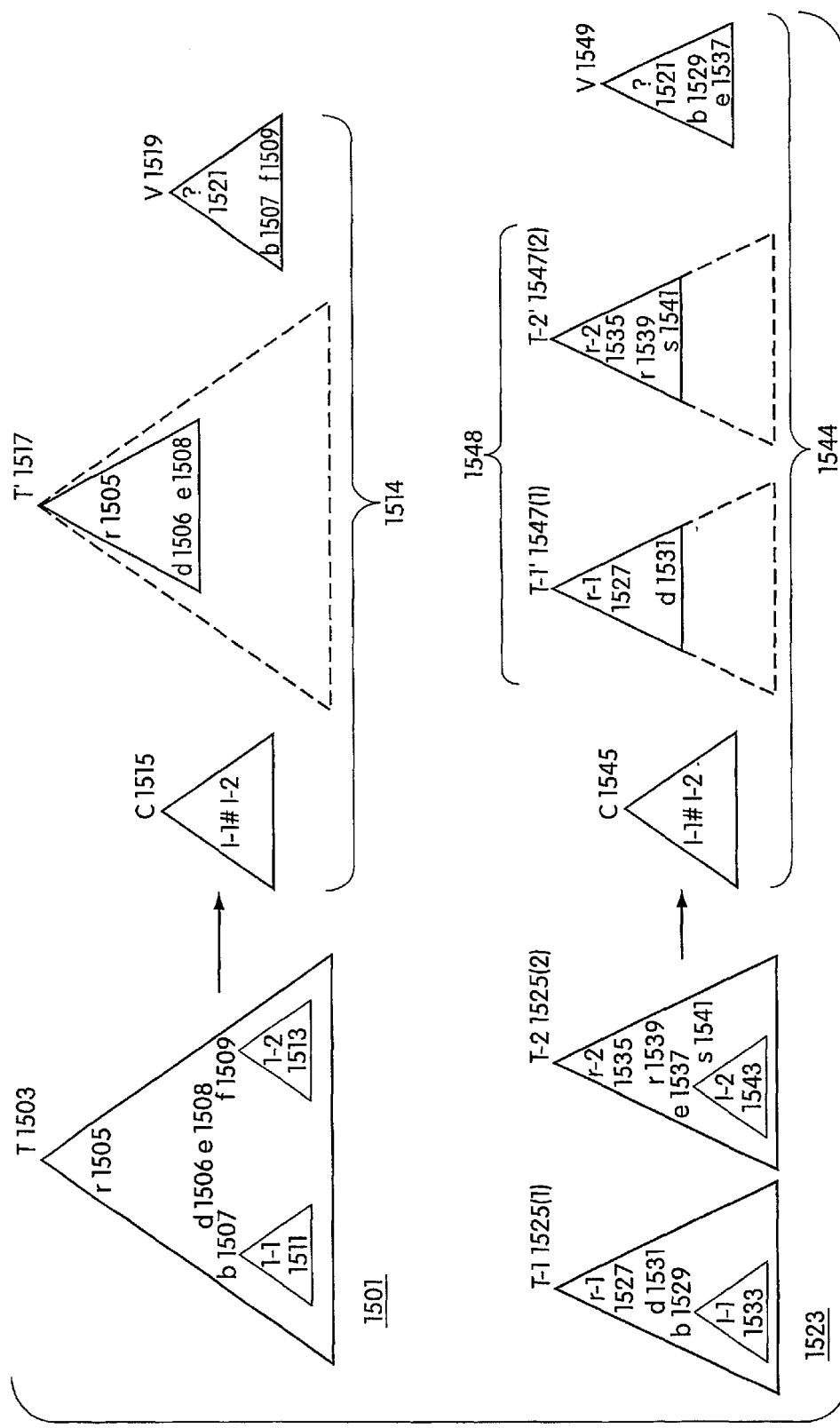
FIG. 15 is a conceptual diagram of two more complex CFU transforms.

CFU Concept of Operations: FIGS. 14 and 15

Terminology

The reader is reminded of the following terminology for the Ariadne system. Details may be found in the discussion of the Ariadne system above. Each Ariadne model is associated with some set of instances in a collection called the world. Included in the instances associated with the model are item instances representing items that are related to the concepts in the model. The set of item instances associated with a concept by means of a particular type of facet are called the concept's extent with regard to that facet; the extent of a model for a particular facet type is the union of the extent for the particular facet type of all concepts in that model. An extensional interpretation of a model's semantics interprets the model in terms of the item instances classified under its concepts. An extensional interpretation of the model's semantics interprets the model in terms of the relationships between the concepts that are defined by the model's facets and/or agents. As is apparent from the foregoing, a concept may also be interpreted intensionally or extensionally. For example, if two concepts in the same model are linked to the same set of instances, the concepts are extensionally equivalent. If two concepts have similar facets connecting them to the same or similar other concepts and are associated with the same agents, the two concepts may be extensionally analogous.

In Ariadne, several different models may categorize the same set of objects. When this is the case, it is often useful to identify one of the models as the primary category system for the objects, and to identify other models as descriptions of particular aspects of the objects. We refer to the category model as a concept model for the collection; the others are called feature models. The set of models that, taken together, describe a certain collection of objects are referred to as a model constellation. In FIG. 13, C model 1309 and V model 1311 form a model constellation in which C model 1309 is the concept model and V model 1311 is a feature model.

In addition to being related by sharing a set of objects, a concept model and a feature model may be related by feature facets that connect concepts of the concept model to concepts of a feature model associated with the concept model in the model constellation. For purposes of the present discussion, a feature facet is any facet created during the execution of the CFU transform which connects concepts in the C model to concepts in the V model, such that something of the intended semantics of the transform is enforced on subsequent changes to the models, either through the basic in-built semantics of the model type(s) chosen for models C and V, or via additional "semantics enforcing" agents which are written and attached (directly or via inheritance from root or other upper concepts) to those models. For example, a feature facet could be introduced to either express (via indications provided to a human interacting with the system at a later time) or enforce the fact that any instance classified as belonging to a particular concept in the C model must also be classified to a particular concept in the V model.

CFU Operations

In the discussion of CFU operations, the following scenario will serve as an example: The user is an internal catalog designer for the online sales website of a clothing merchandiser. Using the techniques described in Software composition using graph types, graphs, and agents, supra, the clothing merchandiser's catalog has been converted into a single Ariadne model of the taxonomy type. The taxonomy model has considerable internal redundancy and a large number of products have been classified according to the model. An analyst looks at the model and decided that factoring is a good strategy. The model has a large number of instances associated with the various concepts, but no agents or constraints yet defined on the concepts beyond those that are part of the taxonomy type definition. What is desired as an output is a constellation of models that permit indexing of instances in a way that is consistent with a well-formed Ariadne model architecture. The constellation of models should capture common concepts more clearly than the original taxonomy model, should lose no information from the original taxonomy model, and should permit more ways of accessing the instances than were possible with the original taxonomy model.

Simplest Form of CFU: FIG. 14

This general operation or transform 1401 is depicted in its simplest form in the schematic shown in FIG. 14. The source model is T 1403. T 1403 is a single legacy taxonomy that has a root r 1405 and two highly-similar subtrees $I_1$ 1411, which is under concept a 1407, and $I_2$, which is under concept b 1409. The result after application of the CFU transform is composite model C 1415 and model T' 1417. Composite model C 1415 contains a synthesized composite $I_1 \# I_2$ of subtrees 1411 and 1413 that has been factored out from model T 1403 and model T' 1417 is a copy of the original model T 1403 that contains the concepts of T 1403 which could not be factored out. In the following, models like T4 1403 will be termed remainder models. As will be explained in more detail later, the user of the CFU techniques decides what is to be done with the concepts of the remainder model: whether they are to be added to the concepts in composite model C 1415, incorporated into a variability model like V model 1311, or simply discarded from the model constellation that results from application of the CFU techniques to T 1403. An important aspect of the CFU technique is that it is functional, that is, application of the technique to source model T 1403 does not change source model T 1403.

CFU that Produces a Constellation of Models Including a Variability Model: FIG. 15

Transform 1501 shows how the CFU technique may be used to transform a single taxonomy model T 1503 into a constellation 1514 of taxonomy models including a composite model C 1515, model T' 1517, and a variability model V 1519. Transform 1301 of FIG. 13 is thus an example of transform 1501. As in FIG. 14, composite model C 1515 is a taxonomy model that combines the concepts of subtree I-1 1511 and subtree I-2 1513. Variability model V 1519 contains the concepts b 1507 and f 1509 that are the roots of subtree I-1 1511 and subtree I-2 1513. These concepts indicate why subtrees 1511 and 1513 are not a single subtree in model T 1503. The user may have to provide a concept? 1521 that serves as a root for concepts b and f. In transform 1301, the provided concept is gender. Model T' 1517 is the remainder model that contains the concepts of model T 1503 that remain after the removal of subtrees I-1 1511, I-2 1513, and their roots b 1507 and f 1509.

Transform 1523 shows how the CFU technique may be used to transform more than one source taxonomy model (here, models T-1 1525(1) and T-2 1525(2) into a constellation 1544 of taxonomy models including composite model C 1545, variability model V 1549, and two remainder models 1548. The subtrees I-1 1533 and I-2 1543 whose concepts are combined in composite model 1545 now come from different source taxonomy models; similarly, the concepts in variability model V 1549 also come from different source taxonomy models. There is finally now a remainder model corresponding to each of the source taxonomy models; T-1' 1547(1) corresponds to T-1 1525(1) and T-2' 1547(2) corresponds to T-2 1425(2).

The C and V models of constellations 1514 and 1544 may be related in different ways. The simplest way in which they may be related is through the instances that belong to the concepts that are combined in the composite model. Each instance will at least have item and/or exhibitor facets that connect the instance not only to a concept in the composite model, but also to a concept in the variability model. If the C and V models are also related to each other as concept models (C) and feature models (V), there will be feature facets connecting concepts in the C models to concepts in the V models.

It should be noted here that in the current embodiments, CFU may be applied to more than two input subtrees; and that in other embodiments these subtrees may come from either subtrees of one input taxonomy model or from multiple input models in various combinations. In fact, the benefits of working with the "factored" model constellation increase with the number of input models/subtrees to which the transform is applied; since there will always be only two primary models, the C and V models, resulting as output. It should also be noted that in other embodiments, CFU may be applied to models having other than the taxonomy model type. Among these other cases are the following:

input taxonomies that allow items to be classified under multiple categories rather than enforcing a single category;

input taxonomies that allow "multiple inheritance" links such that categories may be children of more than one parent category;

models that represent part/whole or structural models of similar configurations.

The minimum requirement for application of the CFU transform to a set of source models is a facet type defined for the model type of each source model which allows a hierarchical walk through relevant concepts of the analogous models. As is apparent from this requirement, the model to which the transform is applied need not have instances. Of course, in all such cases, the relationships between the structures of the C model and the structures of the V model will depend on the types of those models, as will the rules for determining whether one structure is analogous to another.

Much of the work of the CFU transform is deciding which of the constellation of output models the concepts of the source models should be allocated to. While related information such as the names/labels associated with concepts being allocated provides some help (for example, both men's and women's shoes are called shoes), there are many situations where concepts which have different names are in fact similar (for example, cologne and perfume) and concepts that have similar names are in fact different in significant ways. It will thus in general not be possible to completely automate a transform from a given set of source models to a given constellation; as will be explained in detail in the following, a key aspect of the CFU techniques described herein is the manner in which these techniques elicit information and record decisions about allocation of concepts from the user.

Generalizations

Because of the principle of having agents and transforms be as functional as possible, the default behavior of the CFU transform is not to transform source models directly into a constellation of composite, variability, and remainder models, but to end up with both unchanged source models and the constellation resulting from the transformation. In some cases, facets may need to be created in the source models during the transformation links, either to keep track of state and positional information during the transformation, to make backward traceability of a transformation possible, or where the transformation has been performed iteratively, first on the source models and then on the remainder models resulting from each iteration of the transformation.

In the most general case, the input models will be the following:

$I_1$ through $I_m$: The original m subtrees submitted to the transform.

$T_1$ through $T_n$: The original n source models containing the subtrees. Note that $m \geq n$.

After completion of the transform, input models are unchanged, and we will have the following constellation:

C. The composite model drawn from comparison and unification of $I_1$ through $I_m$. Most concepts within C will be associated with one or more analogous concepts from some of $I_1$ through $I_m$ and will have attached all instances associated with those concepts.

V. The variability model, which represents the differences in the input subtrees. V contains, at minimum, one concept for each of the m input subtrees $I_1$ through $I_m$. This could be implemented by leaving leaf concepts in $T_i'$ (the transformed versions of the original model(s) $T_1$ through $T_n$ as described below). However, a unified new model will be more useful in the case of multiple models as inputs, since otherwise roots of the subtrees would not appear in a single model. In any case, a primary purpose of factoring out V is to ease re-organization of single taxonomies from factored models as an output (e.g., fold taxonomy to break out Clothing prior to men's, women's etc.).

$T_1'$ though $T_n'$. The resulting remainder model(s), copies of the original model(s) sans the factored-out repetitive concept structure; that is, with concepts removed that can now be generated through cross-queries of C and V.

Figure 17:
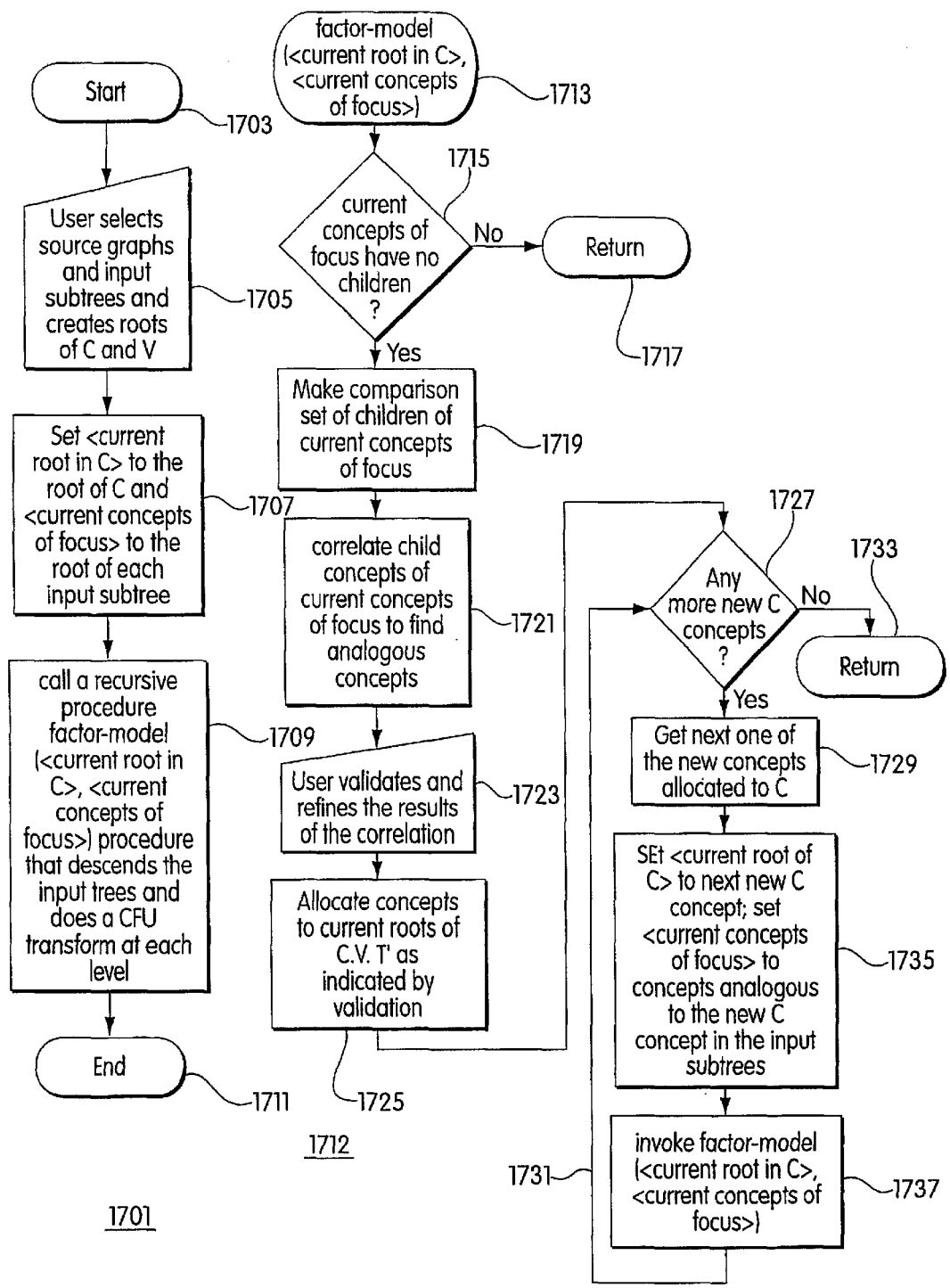
FIG. 17 is a high-level flowchart of a procedure for making a CFU transform.

Overview of a CFU Procedure: FIG. 17

The CFU transform may be done in any system which provides an environment for manipulating graphs as required for the transform. Techniques for doing the CFU transform in such systems are termed herein CFU procedures. At the very highest level, all CFU procedures involve the phases described below. FIG. 17 shows a high-level flowchart 1701 for a CFU procedure. Processing steps in the flowchart are related to the phases by the reference numbers in the flowchart. The flowchart will be explained in more detail below.

Initialization. This involves getting access to the source metadata in a form suitable for further processing; selecting the source trees and the input subtrees to be factored; identifying and if necessary creating the appropriate constellation of models to hold the results; and setting up parameters and defaults for the behavior of the procedure (flowchart 1705).

Making a comparison set. In this phase, the system makes a comparison set of concepts below a current concept of focus in each subtree. The first concept of focus is the root of each input subtree (flowchart 1707, 1719).

Correlation. In this phase, the system establishes correlations between concepts in the current comparison set that may be analogous. The correlations can be established using a variety of different techniques. In a sense, the result of the correlation represents the system's best theory of analogies between concepts of the current comparison set (flowchart 1721).

Validation and Elicitation. The system next solicits user input to confirm or modify the results of the correlation. In some instances this involves eliciting new semantic information about the concepts from the user (flowchart 1723).

Allocation. Once the user has interpreted the correlations for a current comparison set are available, the system can allocate the concepts of the comparison set to the C, V, or T' models of the output constellation. While doing this, the system can also set up the facets require for the proper interrelationship of the models of the output constellation to each other and to the instances belonging to the models of the output constellation (flowchart 1725).

The foregoing phases take place in the context provided by the input subtrees whose concepts are being analyzed and by the C and V models being produced by the factoring process. The phases of making a comparison set, establishing correlations, soliciting user input, and allocating the concepts of the comparison happen at every level of the input subtrees. In the preferred embodiment, a recursive procedure factor-model traverses the input subtrees in a depth-first fashion. At each level, correlations are established for all of the sibling concepts of the level before descending to the next level. Thus, in the input trees 1303 and 1305 of model 1302, the concepts Outerwear, Footwear, Accessories, Swimwear, and Apparel of tree 1303 are correlated with the concepts from the same level of tree 1305. At the next level, the concepts belonging to Outerwear in both trees are correlated, then the concepts that are the children of Footwear in both trees, and so on, until the child concepts belonging to all of the first-level concepts have been correlated.

Continuing in more detail with the flowchart of FIG. 17, in the first part 1701 of the flowchart, block 1705 performs initialization; the user selects the source graphs and the input subtrees from those graphs and also establishes the roots for the C and V models. Block 1707 sets up the first recursion of the procedure factor-model. The procedure is invoked at 1709 with the root of C and the root of each of the subtrees, or in FIG. 1301, the concepts Women's and Men's. The CFU procedure terminates when factor-model returns from its recursions.

factor-model is shown in detail at 1712. As shown at 1713, factor-model is invoked for the next level of the tree with two arguments: <current root in C> and <current concepts of focus>. <current root in C> is a concept which was added to C at the current level. This concept will be the root for the child nodes that will be added to C at the next level. In the first recursion, <current root in C> is the root of C, which the user has given the name Clothing. <current concepts of focus> are concepts in the current level of the input subtrees which have been validated by the user as analogous to the concept in C that is the <current root in C>. For the first recursion only, the <current concepts of focus> are Men's and Women's.

factor-model first tests whether the <current concepts of focus> have any child concepts. If they do not, they are leaf concepts, the bottom of a part of the input trees has been reached, and the recursion returns (1715,1717). If the current concepts of focus do have children, the children all become members of a comparison set (1719). The members of the comparison set are then correlated to find analogous concepts (1721). One technique for correlation is matching concept names; when this technique is applied to the first level of trees 1303 and 1305, the concept names of the subtrees match exactly. The user then verifies that the concepts with matching names are in fact analogous, and refines the correlation if necessary (1723). Once the user is finished refining the correlation, factor-model uses the correlation to allocate the concepts at the level it is working on. In model 1302, the concepts Outerwear, Footwear, Accessories, Swimwear, and Apparel are allocated to the second level of C model 1309.

At the next level, factor-model must be invoked for each of the new concepts that has been added to C at this level. This iterative invocation is shown in loop 1731. When there are no more new concepts in C at this level, factor-model returns. For the selected new concept in C (1729), the selected new concept becomes <current root of C> and the concepts in the input trees which are analogous to the new concept in C that is now <current root of C> become the <current concepts of focus> (1735). Thus, if the new concept in C 1309 that is the <current root of C> is Accessories, the <current concepts of focus> are the concept Accessories in input tree 1303 and the concept Accessories in input tree 1305. Then factor-model is invoked with the new values for <current root of C> and <current concepts of focus>. In that recursion, factor-model will correlate the concepts in input tree 1303 that are dependent from the concept Accessories with the concepts in input tree 1305 that are dependent from the concept Accessories and with the assistance of the user, validate the correlations and allocate the concepts to C, V, and T. The concepts that are the children of each of the other concepts in the first levels of the input models 1303 and 1305 will be correlated, validated, and allocated in the same fashion. The process described above continues level by level until all of the input subtrees' concepts have been correlated, validated, and allocated. It should be noted here that the matches by which the concepts belonging to C and their relationships to each other are determined must be done level-by-level, but in other embodiments, they may be done breadth first instead of depth first.

Figure 16:
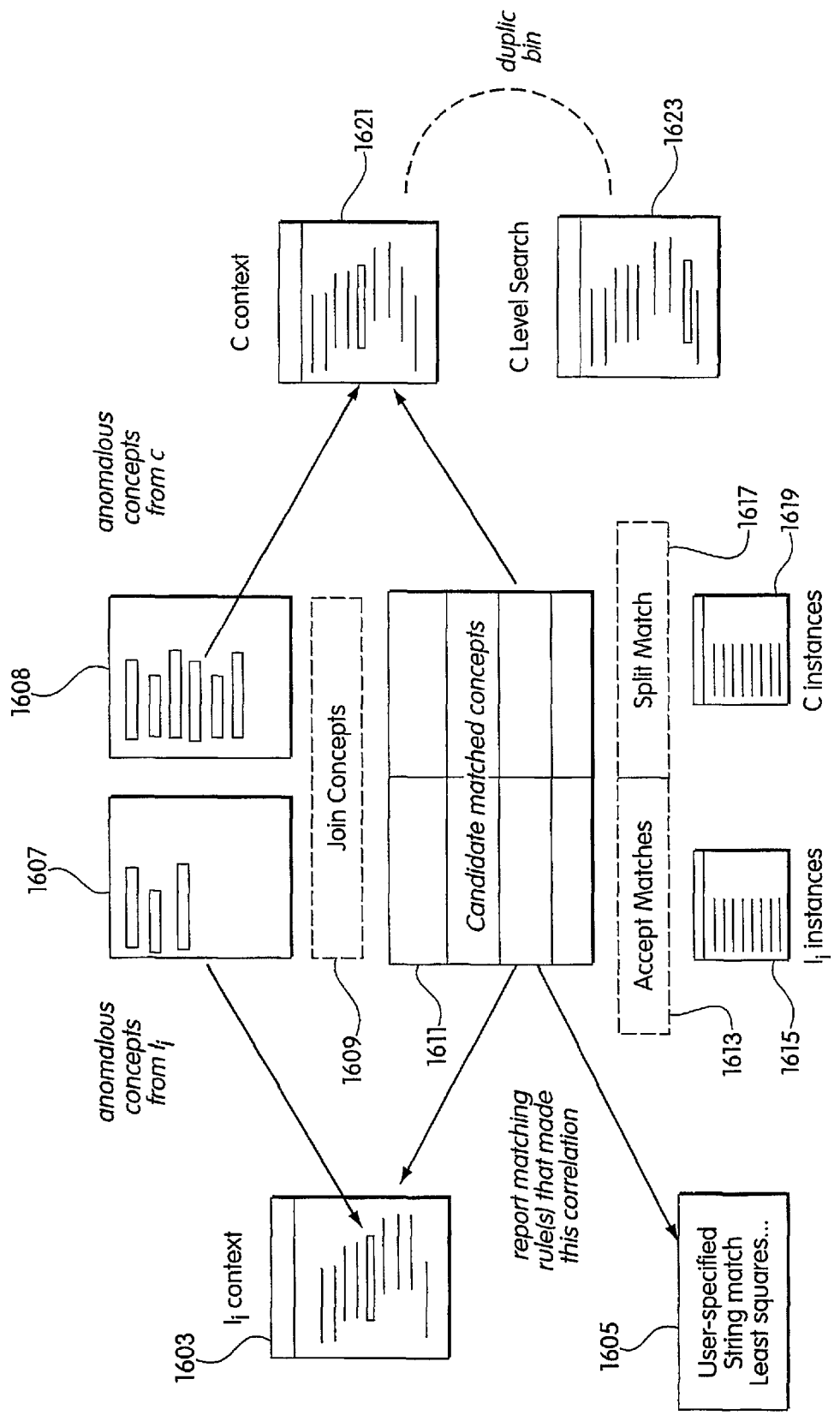
FIG. 16 is a diagram of a graphical user interface for matching concepts.

User Interface for Verification and Refinement: FIG. 16

As indicated in the foregoing discussion and in FIG. 17, once the system has found the best overall set of matches of concepts in the current comparison set, the user must review what the system has found. The system presents the user with its best overall set of matches and sets of anomalous concepts, that is, concepts for which no matches resulted from the present recursion and earlier recursions. The user may validate a match found by the system, may override a match found by the system, and may make matches other than those specified by the system, including matches between concepts belonging to the current comparison set, matches between concepts in that set and anomalous concepts, and matches between anomalous concepts.

FIG. 16 shows a graphical user interface 1601 for user validation and refinement. Control of the interface is by selection of elements and manipulation of buttons. At 1611, there is a list of pairs of candidate matched concepts. One member of each pair is from the current comparison set of concepts; the other member is from the commonality model C. If the user finds that a pair is not a proper match, the user selects the pair in list 1611 and clicks on split match button 1617. At that point, the system adds the concept from the current comparison set to the list 1607 of anomalous concepts from this level of $I_i$ (the input subtree currently being analyzed); if the concept from C has no other match at this level, it is added to the list 1608 of anomalous concepts from C. Conversely, if the user indicates that a concept in list 1607 matches a concept in list 1608 by selecting the two concepts and clicking on join concepts button 1609, the system adds the selected pair to list of matching pairs 1611. When the user is satisfied that list of matching pairs 1611 correctly shows all of the matching pairs from the concepts from $I_i$ and C being displayed in interface 1601, the user clicks on accept matches button 1613, and the matching concepts are removed from T' and incorporated into C. Anomalous concepts in list 1608 remain in C.

To aid the user in making a decision, graphical user interface 1601 provides the user with a variety of context information. A reporting window 1605 indicates the rationale for each pairing in list 1611. When a user selects a pair in list 1611, the rationale for the pairing appears in window 1605. Rationales in a preferred embodiment include specification of the match by the user, a match based the values of a property of the two concepts, or a match based on similarities in the facet structures of the concepts.

The user is also provided with the context of each member of a selected matched pair in the model to which it belongs. The context for $I_i$ appears in window 1603 and the context for C appears in window 1621. The context in the window is fisheyed, that is, when a pair of concepts is selected in list 1611, the views in windows 1603 and 1621 change to show the concept from the selected pair, its siblings, its parent and ancestors to the root of $I_i$, and perhaps its children. The concept of focus is highlighted. Windows 1603 and 1621 respond in the same fashion when an anomalous concept is selected from list 1607 or 1608. Instances windows 1615 and 1619 indicate the instances that have item facets connecting them to the concepts selected in list of pairs 1611, list of anomalous concepts 1607, or list of anomalous concepts 1608. Control of what portions of interface 1601 are displayed is by means of a command bar (not shown) in the graphical user interface. C Level Search 1623 is a window which allows the user to explore dynamically elsewhere within the C model in order to find possible matches for anomalous concepts.

Not shown in FIG. 16 is a window which permits the user to assign a name by which the concept which is represented by a matched pair will be known in model C. Naming rules for matched pairs may follow heuristics such as these:

If the concept in $I_i$ is a clean match to a concept already in C, the assignment is made automatically, with reporting or confirmation based on the strength and priority settings of matching rules applied.

If the concept in $I_i$ is not a clean match, the user has the option of keeping the current concept name in C, renaming with the concept name from $I_i$, or providing a new name for the concept in C.

Once the preferred name is selected, the user has the option of converting the unused concept name(s) in $I_i$ and/or C to Synonym properties associated with the concept in C. Obviously, only names different from the preferred name or names already in the synonym list are worth storing as new synonyms. For example, the user could match syntactically different terms like shirts and blouses.

Users can be prompted to flag a value of a synonym property as a substring to be checked via a synonym match rule in a list of matching rules maintained by the system. For example, the user might discover Men's and Guy's concepts at a certain point and make Guy's a synonym of Men's. Adding a synonym in this fashion refines the matching process.

Ways of Correlating Concepts

The correlation phase of the CFU procedure selects candidate pairs of matching concepts.

There are a number of different techniques that can be used to determine whether one concept matches another. The CFU procedure can employ any and all of these techniques. The techniques include the following:

Textual or syntactic analysis

Hierarchical structure

Synonyms (including those dynamically generated from earlier matches)

User elicitation

Domain models

Extensional evidence (Instances)

Intensional evidence (Feature Links)

Extra-model information [e.g., agent attachments, properties, ERIS call-outs]

Textual or syntactic analysis. Perhaps the most basic way of making correlations is by similarities in names. For much example metadata that we have examined there are often exact matches in names. In other cases differences are minor, involving word-stemming or case distinctions. (Matching techniques from search technologies could be applied here, although this is pairwise comparison rather than matching on one privileged search string.) We can consider these textual or syntactic techniques to be concept-to-concept matching techniques.

In addition to deriving clues about basic one-to-one correspondence among concepts, we can detect certain kinds of anomalies or other structural variations in the models by looking for constructs like additive word phrases (Men's Clothes, Men's Casual Clothes) or compound phrases (Hats, Hats and Gloves).

It is important to stress that the primary textual material being searched is the concept name-space, not arbitrary documentary text. Since concepts within taxonomies have already been named with some attempt at consistency and descriptiveness, these names can form an excellent corpus of semantically significant source material. Also, because the matching is being done within the context provided by the subtrees and the C and V models, some contextual scoping has already been applied in limiting the sets of terms on which match-testing is being performed.

Alternative Implementation: Matching Rule Checklists. One possible approach to concept-to-concept textual matching is to use a checklist of primitive matching rules. Each rule takes as input two concept names, drawn from two of the subtrees to be matched. Each rule applies a specific technique for determining whether or how well the concept names match. Results could be expressed as a Boolean or as a metric.

Some method for selecting the maximum confidence matching rule for a given pair must be specified. The behavior of the overall transform can be conditioned to a great extent by allowing a fall-through semantics for these checklists of various rules. With these semantics, once a rule is found that applies to a pair of concept names, it can be assumed to offer the strongest evidence for correlation and no further rules need to be checked. When rules return metrics rather than Boolean results, the fall-through condition could be triggered by some minimum threshold. Alternatively, sets of rules could be tested, the resulting metrics either combined in some way or the maximal value taken. There may also be advantages to separating rules into sub-lists that trigger different behavior in terms of the interaction with the user. Some typical categories of this kind might include the following:

If the rule matches, apply automatically (and silently).

Apply and report (useful mostly for debugging purposes; otherwise simplifies to case below).

Apply and report for confirmation (as in current interface; user must take action to undo the match).

Do not apply but report as suggestion (for very low confidence rules).

Ignore the rule (allows rules to stay in the repertoire but to be easily de-activated).

In the latter two cases, the rules start to take on the character of explanation aids.

Starting Set of Matching Rules. Here we suggest a starter set of simple rules which can be applied without requiring call-outs to sophisticated natural language processing:

First, to find exact correlations:

An exact match of the text strings triggers a strongly probable match.

Depending on the original metadata import scheme and restrictions on name uniqueness imposed by the supporting modeling system, there may be conventions for uniquifying (or de-redundizing) names upon input (e.g., clothing and clothing1). If these conventions are known to the matching procedure, they can be reversed in order to match these strings with a high degree of confidence.

The sum of squares of matching substrings metric used in a prototype turns out to provide a relatively robust extension of plain text matching.

Certain syntactic transformations such as plurals can be matched as almost exact.

Synonym lists associated by concept. For example, the concept Men could have the synonym Guys added, either upon initial creation or as a result of previous matches. The text match used could then be the best score We can also count on some characteristics of category names such as clustering multiple names under a single category name (Hats and Gloves, for example). These are also significant syntactic clues for subset relations.

AND matches several syntactic connectors (and, &, ",", etc.)

A: (X AND Y) matches with B: (Y AND X); extended for multiple term lists. This matching rule assumes that while ordering of siblings may be arguably of semantic import in the input hierarchies themselves, ordering of sub-terms within a clustered concept name can be ignored during the match.

Adaptive Weighting of Matching Rules. Finding consistent patterns of differentiation across models or subtrees might allow particular matching rules to be applied with more confidence. For example, one modeler may have used plural names, another singular names, so a plural/single unifier rule might be exercised repeatedly in setting up correlations between those two models. An implementation can exploit this by dynamically adjusting the weighting and/or ordering of rules to be applied, based on initial weighting and number of times the rule was applied to an accepted match within the current subtrees.

Hierarchical structure. Because the matching of concepts occurs within the context provided by the models, the structural and positional information that the model provides about a concept can be bought to bear in deciding whether two concepts match. For example, when potentially matching concepts appear as members of sets of siblings within structurally analogous hierarchies, corresponding siblings probably represent matching concepts. Thus, if we had Man, Woman, Child as one set of siblings and Man, Woman, Kid as another, we have some evidence for correlating Child and Kid that derives solely from the structure and positions of the concepts in the tree. A variety of structural factors can be used in weighing the degree of confidence of a match in the context of two sibling sets:

The relative confidence level of the syntactic comparison function (e.g., perfect string match vs. substring match)

The closeness in number in the cardinality of the two sibling sets (e.g., a set of 4 concepts match more confidently to a set of 4 than a set of 6).

The number and weight the other concepts in the sibling sets (i.e., if all concepts match extremely well except one, this is stronger evidence for the match, despite the absence of textual cues).

The relative positions of the concepts being matched in the set.

The number of matches across all the sibling sets in the comparison set.

Additional structural information. Since concepts live within metadata structures, choices made at one level determine both the action of the CFU procedure and quite possibly results at lower levels. If there are subtrees below Kid and Child we must accept the correlation between them to recursively start conceptual factoring on their two subtrees. If the match of Kid with Child was correct, the subtrees should be highly consistent; if they are not, the match was probably not correct. Moreover, the further down the hierarchy we go, the more certain we should become of the quality of the match.

Alternative Implementation. The following technique is a preferred implementation for structurally weighting concept-to-concept matches in parallel within the context of the sibling sets:

Suppose we have two sets of sibling concepts $c^A_1$ through $c^A_i$, $c^B_1$ through $c^B_j$. If then, without loss of generality, choose i to be the index of the smaller sibling set.

Form an i×j matrix (note by construction there are equal or fewer rows than columns). The best matching score for each $c^A/c^B$ combination (as derived from applying some concept-to-concept matching approach like that described in the previous subsection) will be stored in the cells of this matrix.

Various weighting schemes can now be applied to the matrix, based on the aspect ratio of i to j (similar cardinality sets of siblings are more likely to be analogous), and positional matches (a match in the first term of each sibling list should count for more than a match between the first and third terms), etc. This can be done by a weight favoring the major diagonal (position 1,1 through i,j) and proximity thereto.

Once weight-adjusted scores for each combination are calculated, an overall set of correlations for the sets of siblings must be chosen. The current CFU prototype's algorithm uses a linear programming technique which prefers matches which are clearly better than the next best match.

Metrics for individual pairwise comparison can be defined independently of the positional adjustment matrix weighting scheme; the latter can be independent in turn from the linear programming or other rules which help select the optimal overall set of pairwise associations (with left-over anomalous concepts) for respective sets of siblings.

A Prototype Implementation of a CFU Procedure: FIGS. 18–21, 24

A prototype CFU procedure has been implemented and used on a number of real Ariadne models. The prototype includes an algorithm for matching sets of concepts to one another, and for asking the users for guidance when this match is not sufficient to complete the factoring. It has been used successfully to factor models as follows:

Factoring out repeated categories in an LLBean Web site index,

Factoring out repeated categories in a mock e-commerce portal that was created by us, using connections to four clothing retailers, Factoring out the common structure in a marketing document, where each page of the document describes another company.

Figure 18:
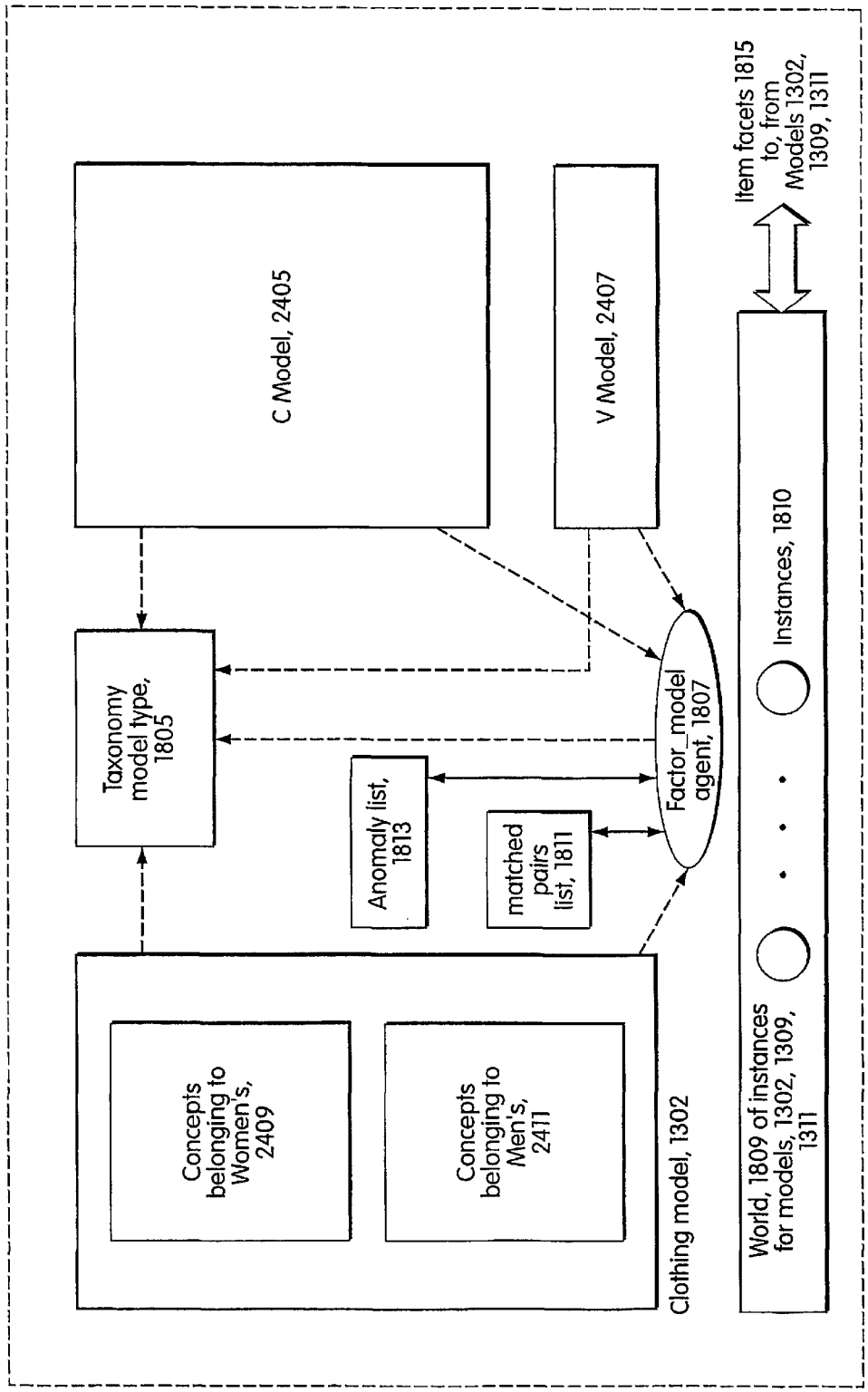
FIG. 18 is a block diagram of a system for making a CFU transform.

Overview of a Prototype CFU System: FIG. 18

FIG. 18 shows an overview of a prototype CFU system 1801 that is implemented in Ariadne system 1803. Prototype 1801 is being used in FIG. 18 to factor Clothing model 2402 of FIG. 24 into a constellation 2403 consisting of C model 2405 and V model 2407. The instances 1810 for the Clothing, V, and C models are contained in world 1809 and are related to the models by item facets 1815. In terms of the CFU transform, Clothing model 2402 is the T model, with the subtree of the concept Women's 2409 and the subtree of the concept Men's 2411 being employed as input subtrees $I_1$ and $I_2$ respectively. All of models 2401, 2505, and 2407 are models of the Taxonomy type, and are thus associated with taxonomy model type 1805, as indicated by the dashed arrows. Also associated with taxonomy model type 1805 is factor_models agent 1807, which performs the CFU transform on input models of the taxonomy type. While doing the transform, agent 1807 maintains a matched pairs list 1811 and an anomaly list 1813. Agent 1807 uses these lists to produce a graphical user interface for receiving user input concerning concept matches. The GUI is a simplified version of the GUI of FIG. 16 and will be shown in more detail below.

Figure 19:
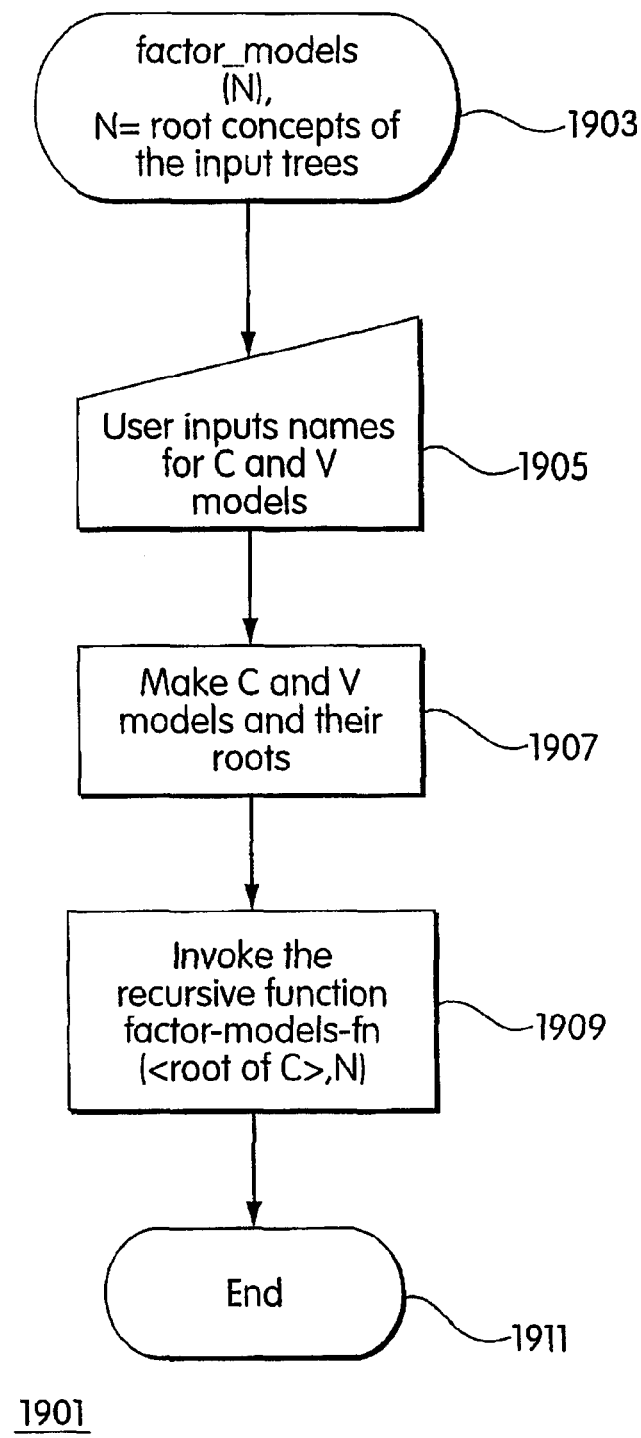
FIG. 19 is a flowchart of the factor_models agent in a preferred embodiment.

Details of Factor_Models Agent 1807: FIG. 19 factor_models is an Ariadne invocation agent; this means that it is invoked through the Ariadne invocation sequence. The invocation sequence is the following:

the user selects the agent factor_models from a bin 605 (FIG. 6) of Agents;

Next, the user selects a number of concepts as roots of the subtrees that are to be factored from Clothing model 2401;

Then, the user selects Invoke with the right mouse button to call factor_models on the selected concepts;

Finally, the agent prompts the user for the names of the models that will be C and V; the name of C is prompted with the query, "what do these things have in common?" while the name of V is prompted with the query "How do these things differ?"

As is clear from the foregoing, factor_models only supports a single input model T, but it may be used to unify and factor any number of subtrees in T.

FIG. 19 is a flowchart of factor_models. The algorithm is described in detail in the following.

1) factor-models is attached to a model of taxonomy type and is invoked with a set N of the concepts that are the roots of the input subtrees $I_1$ through $I_m$ (1903 in flowchart 1901.

2) The user responds to requests for the names of the C and V models (1905).

3) The procedure makes the models and their roots (1907)

4) Call the recursive procedure factor-models-fn (<root of C>, N) (1909). When factor-models-fn returns, the algorithm terminates (1911).

Figure 20:
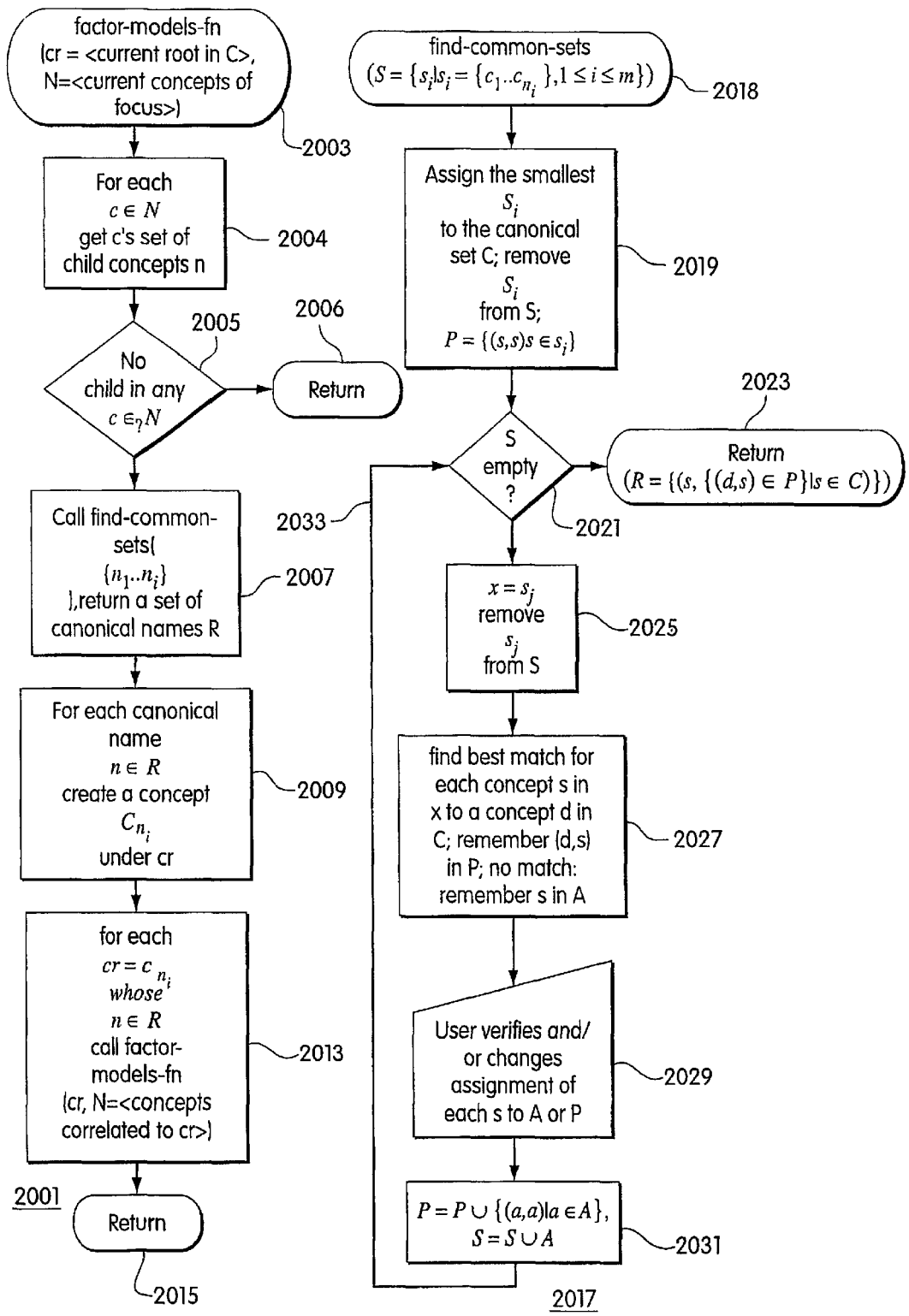
FIG. 20 is a flowchart of the recursive factor-models-fn function in a preferred embodiment.

FIG. 20 is a detailed flowchart of factor-models-fn procedure 2001. The algorithm for the function follows. The procedure is invoked with a current root concept cr in C and the set N of concepts whose subtrees are being unified (2003):

1) Get the set of child concepts n for each of the concepts c of N; if there are no child concepts for any c, the recursion is done; return (2004,2005,2006).

2) call a function find_common_sets with the set of sets of child concepts; this function does the correlation, user validation, and allocation (2007); it returns a set R of names of concepts to be rooted in cr.

3) The concepts corresponding to the names in R are created and added to C in 2011.

4) factor-models-fn is invoked for the next level of recursion at 2013; there is an invocation for each new concept cr added to C in 2011; in each invocation, N is the concepts in the subtrees that were correlated to cr in P.

Continuing with find-common-sets 2017, as shown at 2018, the procedure is invoked with a set of sets of concepts.

1) At 2019, the procedure is initialized; the smallest set of concepts $s_i$ is assigned to the canonical set of concept names C and is removed from S; the list P of matching pairs is initialized so that the matching pairs are all names from $s_i$.

2) Execute loop 2033 until there are no more sets of concepts in S (2021) and return R (2023). In the loop,
a) set x to the current set $s_j$ from S and remove $s_j$ from S (2025);
b) find the best match between each concept s in x and a concept d in the canonical set C; save the best match (d,s) in P; if there is no match, save s in A;
c) Receive input from the user verifying and/or changing assignments of s's to pairs (d,s) in P or to A.
d) Pairs consisting of unmatched concepts from A are unioned to P; the concepts in A are unioned to S.

Matching Concepts in Factor-Models-fn

The matching algorithm used in factor-models-fn is based on a simple similarity metric between strings. The metric is given by the formula:

$$dist(s_1, s_2) = \sum_c (l(c))^2$$

where c ranges over all the substrings that are common between $s_1$ and $s_2$, and l(s) is the length of the string s. This matching algorithm favors matches that are unambiguous, that is, where the best match is clearly better than the second-best match.

The algorithm is implemented in factor-models-fn as follows:

1) For the current d∈S, find the c∈C that maximizes dist(d,c). Find also the "runner up", that is the d'∈S, d'≠d that maximizes dist(d',c) for the remainder of C.

2) Calculate the best matching concept of C, b(c)=dist(d, c)−dist(d',c).

3) Select d∈S such that b(c) is maximized for concept c of C;

4) Add the pair d, c to the pair list P.

An Example of the Operation of Factor_Models: FIGS. 21–24

Figure 24:
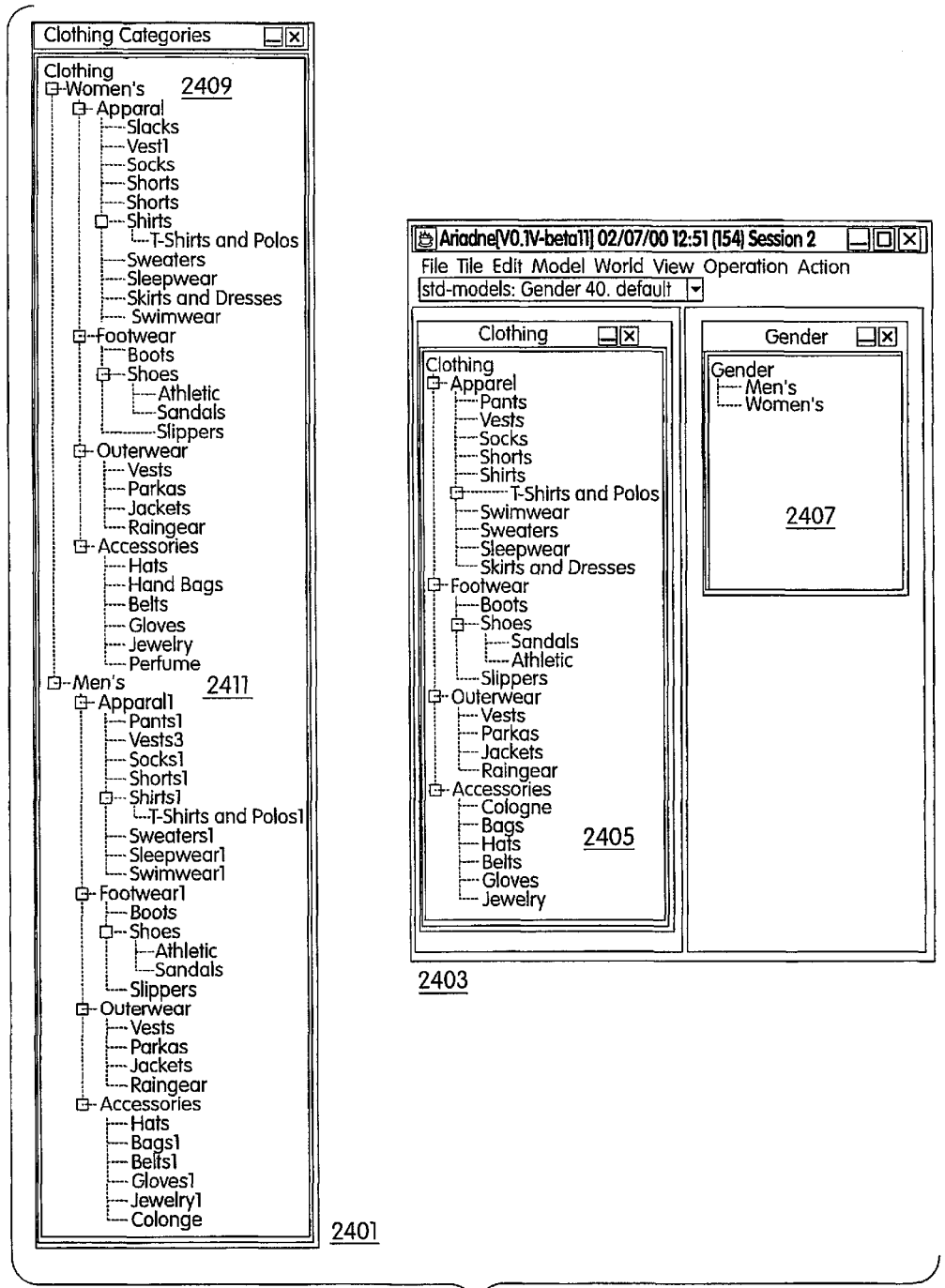
FIG. 24 shows an example of operation of the CFU transform.

Operation of factor_models is demonstrated with Clothing model 2401 of FIG. 24 as the source model. The user selects Women's and Men's as the leaf concepts in V. The subtrees of concepts whose roots are Women's and Men's are consequently $I_1$ and $I_2$ respectively. The concepts in $I_1$ and $I_2$ will be examined for matches beginning with the children of Women's and Men's; then the children of matching concepts will be examined for matches, and so on, until all levels of $I_1$ and $I_2$ below the root concepts have been examined for matches.

Since both Men's and Women's have the same number of child concepts, the child concepts of either can be chosen as the initial canonical set C; in this case, the child concepts of Men's are chosen to start. The subclasses of the initial C are then matched against the child concepts of Women's, which are what remains in S after the child concepts of Men's are removed to make the initial canonical set C.

Figure 21A:
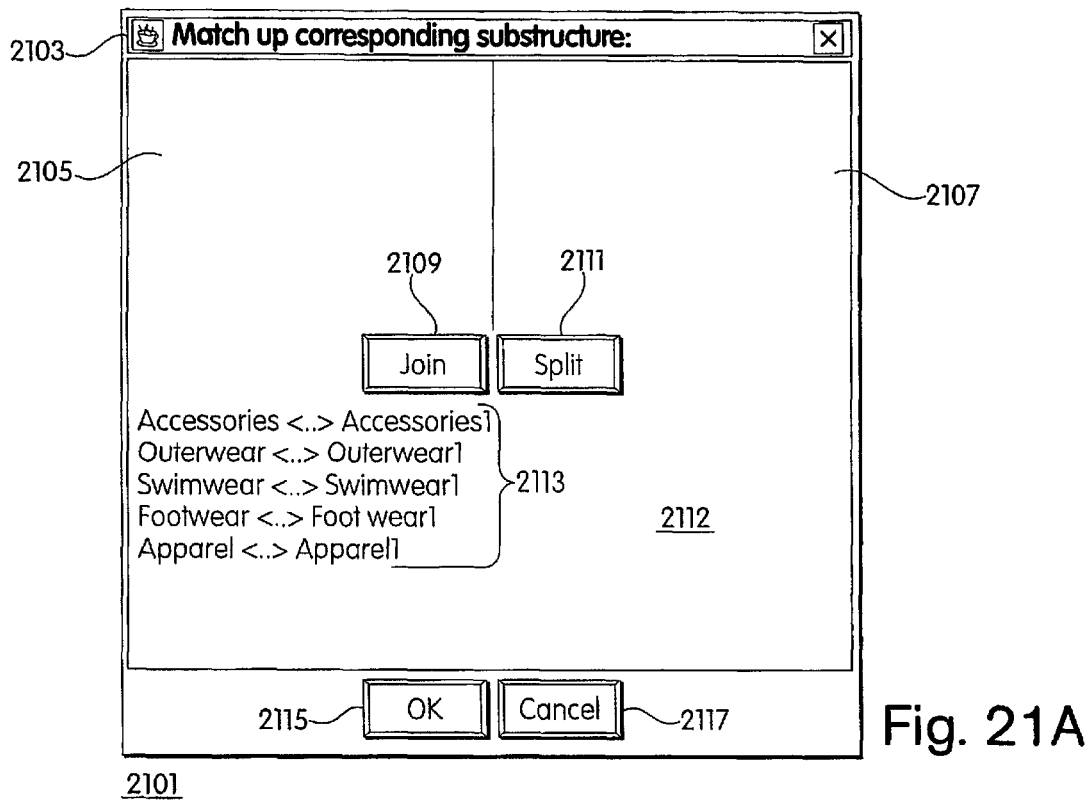
FIG. 21 shows a first two windows from the user interface employed in a preferred embodiment.
Figure 21B:
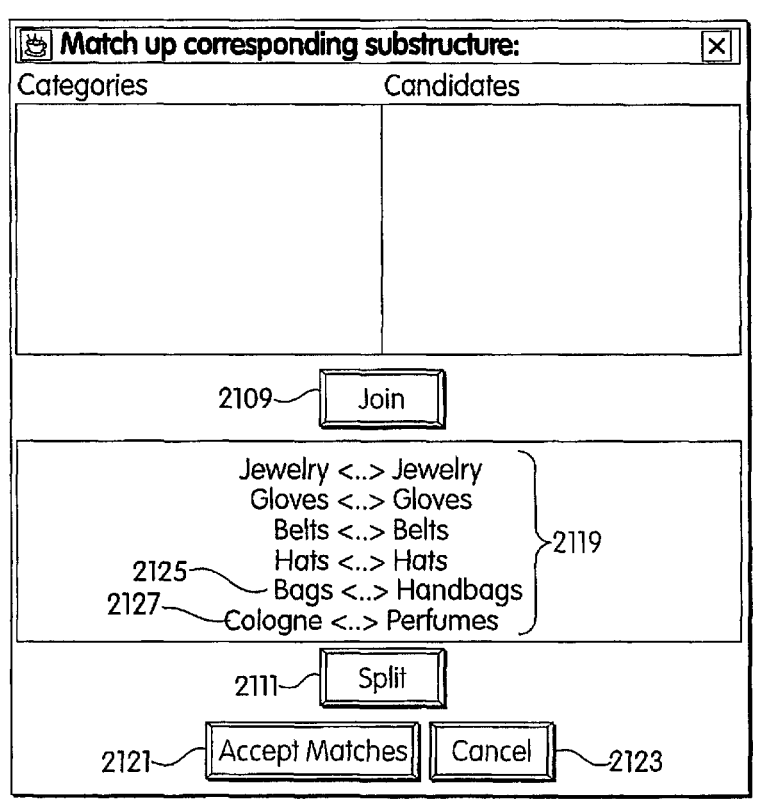

The result of the match is shown in window 2101 of FIG. 21. Window 2101 is the window in the prototype that corresponds to interface 1601 in FIG. 16. The prototype window includes only subwindows for displaying lists corresponding to lists 1607, 1608, and 1611. At 2105 are displayed any anomalous concepts from the current S; at 2107 are displayed any anomalous concepts from the current canonical set C. In window 2119 is displayed the current list 2113 of matching concepts P. In this case, all of the concepts of S and C match, so P includes them all and they all appear in list 2113, while windows 2105 and 2107 are empty. The user can accept the matches by clicking on OK button 2115. If the user is not satisfied with the matches, the user can select a matched pair and use split button 2111 to split it; the members of the split pair will appear in windows 2105 and 2107. Concepts in windows 2105 and 2107 may be selected and joined as a matched pair in 2113 by using join button 2109.

Once the user clicks on OK button 2115, concepts corresponding to the names in the canonical set C are allocated to composite model C 2407. factor_models then proceeds to the next level. The immediate children of the concepts in each of the matched pairs of the first level are matched; thus for the pair apparel (from Women's) and apparel1 from Men's), the concepts Slacks, Vests1, Socks, Shorts, Shirts, Sweaters, Sleepwear, Skirts and Dresses, and Swimwear from Women's are matched against Pants1, Vests3, Socks1, Shorts1, Shirts1, Sweaters1, Sleepwear1, and Swimwear from Men's. Here, the matching is not so easy. There is no concept in Men's that matches Slacks or Skirts and Dresses.

The window at 2118 shows what happens in such a case. When the algorithm reaches Accessories <--> Accessories1, there is no exact match for the concepts Handbags and Perfume from Women's or Bags and Cologne from Men's. The matching algorithm does pick up the similarity between Bags and Handbags and lists them as a matched pair at 2125 in matched pair list 2119; it also correctly matches Perfume and Cologne, simply because they are the two that are left after the other matches are found. The correct matching of Bags and Handbags and Cologne and Perfume is a good example of how the effectiveness of the matching algorithm is increased by the fact that it is applied within the structure provided by the models.

Figure 22A:
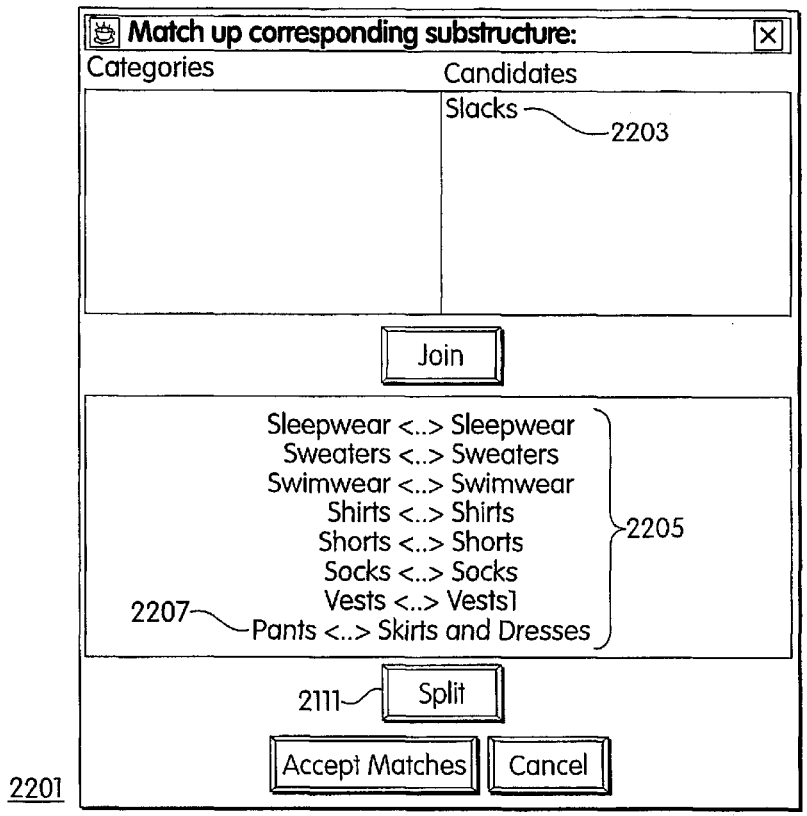
FIG. 22 shows a second two windows from the user interface.
Figure 22B:
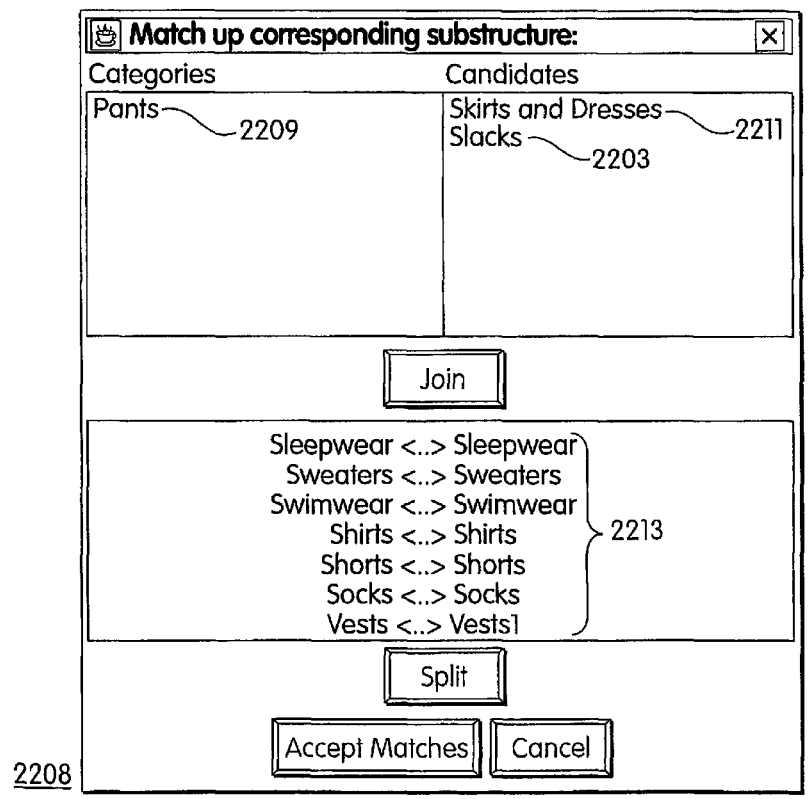

When the algorithm reaches Apparel <--> Apparel1, we see a situation where input from the user is necessary to get the semantically correct result. Here, the children with no matches are Slacks and Skirts and Dresses in Apparel and Pants in Apparel1. The matching algorithm can do nothing at all with Slacks and matches Skirts and Dresses with Pants on the basis of the match between the an in and the an in Pants. Window 2201 in FIG. 22 shows how all of this appears in the user interface. Subwindow 2107 now contains the unmatched candidate concept Slacks 2203. Matched pair list 2205 contains the erroneously matched pair Pants<-->Skirts and Dresses at 2207.

Figure 23:
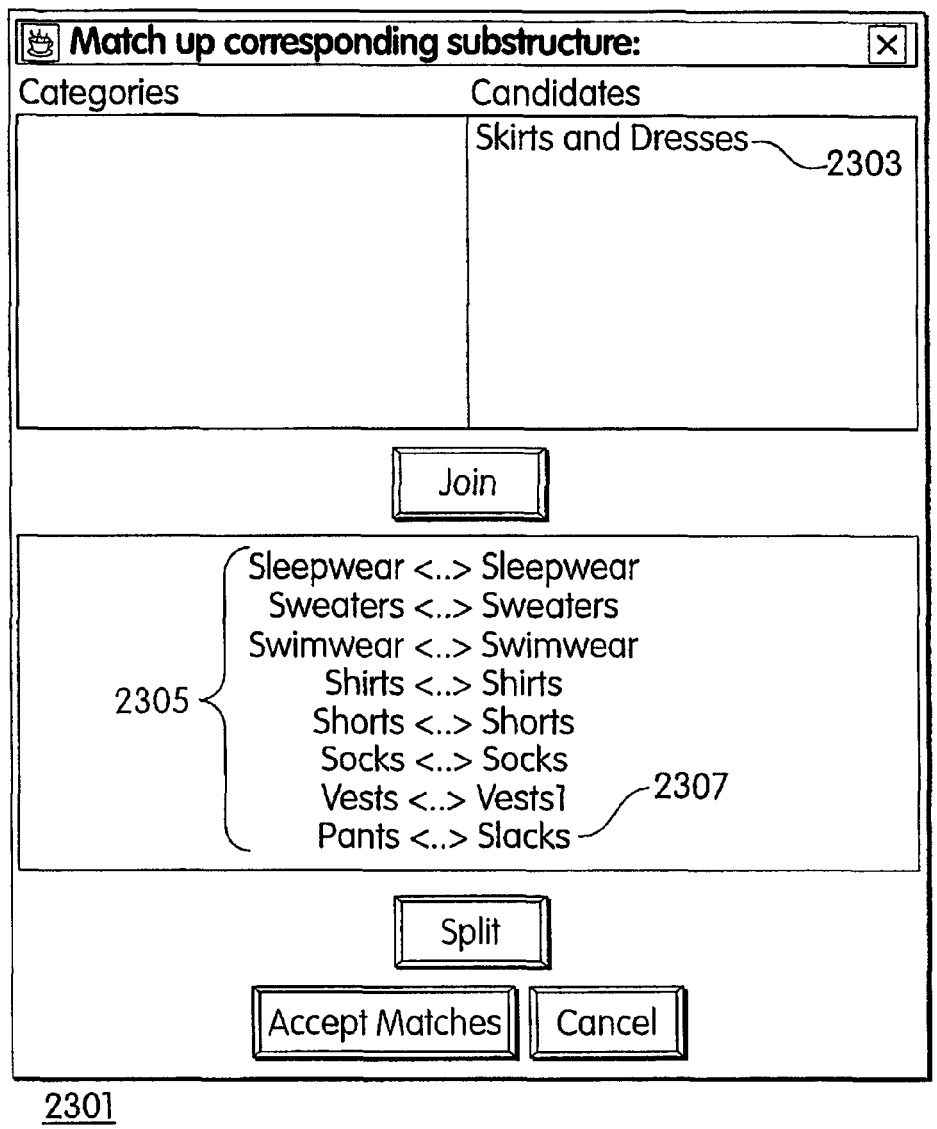
FIG. 23 shows another window from the user interface.

Windows 2208 in FIG. 22 and 2301 in FIG. 23 show how the user can use the interface to deal with this situation. In window 2208, the user has selected matched pair 2207 and pressed Split button 2111; as a result, pair 2207 is removed from list 2213 and Pants appears at 2209 in subwindow 2105, while Skirts and Dresses appears in addition to Slacks 2203 in subwindow 2107. The user of course recognizes the close semantic relationship between Pants 2209 and Slacks 2203, so the user selects these concepts and then clicks on Join button 2109. The result is shown in screen 2301. The new matched pair Pants<-->Slacks 2307 has been added to list 2305 and Skirts and Dresses 2303 remains in window 2107 as an anomalous term. As indicated above, the prototype adds Skirts and Dresses 2303 to the composite model C; in other embodiments, the user may be asked whether to assign the term to the list of anomalies A, the variability model V, the composite model C, or leave it in the remainder model.

FIG. 24 shows the resulting model constellation 2403, with composite Clothing model 2403 and variability model 2407. The names in model 2403 are simply the names from the canonical set. If changes are deemed necessary, they are made using the standard Ariadne name changing capabilities. In other embodiments, the user may have the option of specifying names for matched pairs.

As simple as the prototype embodiment is, it shows the power of the CFU techniques disclosed herein.

The algorithm shows the power of a mixed-initiative approach to factoring. The algorithm can walk down the trees in parallel, presenting the user with its best guess at each level as to how the matches should be made. The user can interrupt at any time to correct these matches; then the walk continues based upon these corrections. In fact, the algorithm can be tuned to be more intrusive (ask the user for confirmation of every match), or less obtrusive (only ask the user when there are leftover concepts, or some of the concepts match particularly poorly), as desired.

The algorithm shows how the context provided by the model can be used to leverage the power of even a simple string match. In the example of Cologne <--> Perfume, the algorithm finds a match between two analogous concepts, based not on surface similarity between their labels, nor upon a large and comprehensive thesaurus, nor even upon syntactic or morphological analysis of their labels, but simply on the context of the match, in which all the other items had reasonable superficial matches. In a situation in which the models being unified are very similar, (as is often the case in web catalogs), even such simple context-based matching can have a very powerful effect.

The algorithm automatically classifies any items from the original trees into the appropriate categories in the Commonality and Variability models (this capability is not shown in these examples). This means, among other things, that further factoring can be done on either of these models as appropriate.

As limited as the prototype is, it is useful for processing real-world web indices to create a more flexible multi-dimensional index. In many cases, issues about merging categories (i.e., matching two categories in one tree to a single category in another), level changing (i.e., matching a category at one level of one tree to a category at another level of another tree) and category naming can be managed by pre- or post-processing the trees. For example, a failed match between Insulated Vests and Vests can be repaired by inserting a new concept Vests in one tree before running the algorithm. While, strictly speaking, this violates the functional nature of the transform, it does give the user considerable control over the decisions being made about how to interpret the tree, and allows even a simple algorithm to process real-world data.

Other implementations can be made that do not have the limitations of the prototype. Among the limitations are:

This algorithm always treats an anomalous concept as a new category in the Commonality model; there is no provision for adding concepts to the Variability model or leaving them in a neutral Remainder model.

This algorithm provides no support for matching more than one item from one tree to a single item from another. So for example, it could not take any appropriate action should the canonical set include a concept Hats and Gloves and the set of concepts being matched to the canonical set include the separate concepts Hats and Gloves.

This algorithm looks for matches at a single level only; hence it cannot detect or treat any changes of levels. For example, if a first tree had a concept Vests with subconcepts Insulated and Uninsulated, the algorithm would not make a sensible match between the first tree and a second tree, where the intermediate concept Vests is omitted, and two categories called Insulated Vests and Uninsulated Vests appear at the same level as Vests in the first tree.

This algorithm does not take advantage of syntactic clues in matching concept names, e.g., the word and in Hats and Gloves.

The algorithm provides no option for the user to decide what name to use for a new concept in C. In the example above, the name Cologne was used in the final output; this has to do with the order in which the algorithm encountered the names. In another run, the concept might receive the name Perfume might be used for this concept. In no case will the algorithm allow for the introduction of a new name (e.g., Fragrance) as part of the factoring process.

The prototype does not include any capabilities for changing the level in C at which a concept is represented.

The prototype provides no capabilities for retracting bindings between concepts in the source model and concepts in the model constellation once they have been committed.

Procedure for Dealing with Subset Relations

In our discussion so far, we have presumed that it would be possible to match concepts in one branch of a taxonomy with concepts in another branch, as if the intent of the two concepts were comparable sets. We now consider the possibility that one of items to be matched refers to a subset of the items referred to by another item. We describe a detailed procedure for walking through the models checking for these relations.

Assume we have checked for direct correlations (matches) as in the descriptions above. Also assume possible tuning of the matching algorithms to anticipate subset relations. For each concept in $I_i$ we are basically going to decide one of the following paths:

The concept matches some sibling at the current level in C.

The concept is a super-category of one (or more) concepts already in C.

The concept is a sub-category of one of the concepts already in C.

The concept is an overlap with one (or more) of the concepts already in C.

Various hybrids of the super-category, sub-category or overlapping cases above.

Last but not least, we can decide the concept is truly anomalous at this point in the structure, and determine whether to allocate it to C, V or the remainder model.

Detailed descriptions of how to recognize each of these cases and how to process them are provided below.

Concept I is a Superset/Super-Category of Parent Concept C

In this case we introduce the concept as a sub-category of the current parent concept in C and make the other concepts children of the introduced concept.

Note that we don't need to compare I to the current parent in C, and certainly do not need to look for matches at any point higher than that parent. We are positioned here based on the "working theory" that our parent in $I_i$ matched with the parent concept in C. Even if there were a syntactic match, the current model state is effectively declaring that there is a semantic distinction to be respected. An apparent syntactic match with the parent, or one of its siblings (uncles) or their children (cousins) would conflict with the semantic assumptions of the taxonomic model type and our current position in the walk. We do not want to overrule this claim on the basis of matching criteria. So the concept in question cannot be more than a subset of the parent concept in C. This property of the walk has the virtue of continually driving us downward in the hierarchy of C.

Checking other siblings of C. There are, however, some special cases and issues to be considered. The concept in $I_i$ could be a super-category of more than one sibling concept in C. In this case it is important to continue checking all other siblings in C, to move any appropriate siblings under the newly introduced concept.

Interpreting superset as splitting vs. flattening. The superset relation could correspond to two different patterns: splitting or flattening. Suppose a is the concept in I which "splits" to two (or more) concepts b1, b2 in C. If concept a in I has children that correlate to b1, b2, then the pattern suggests flattening. If a does not have such children, then in effect a has been "replaced" with b1, b2 in C and the pattern suggests splitting. In either case, since the basic superset relation holds between a and b1, we need to check all siblings at that level in C before doing carryover.

Concept I is a Subset/Sub-Category of Parent Concept C

Let a be the concept in $I_i$ and b the concept in C. Matching heuristics suggest a is a subset/sub-category of b. In this case, we make a recursive call to re-invoke the correlation routine to match a against the current children of b (the presumed super-category within C). At this next level down we will make the same checks again: match directly, introduce as a parent, recurse down below some presumed super-category, or add as an anomalous "new concept," to be alllocated either to C or V at that point in processing. Once a has finally been dealt with, we must "pop the stack" and resume the walk at the next sibling in $I_i$.

Interpreting Subset as Merging or as Deepening. Suppose a1, a2 are both concepts in I which merge to b in C. We can handle a1 and a2 in separate passes of the iteration, since each independently will get driven down as sub-categories below b with a recursive invocation. Note that the subset relation could correspond to two possible patterns: merging or deepening. If b has no children that correspond to a1/a2, the scenario suggests a merge pattern. If b has children that correspond this is more suggestive of a deepening operation; we will discover this each time we drive a1 (respectively, a2) down for the recursive match.

Overlapping

In this case, our actions are a blend of what we do for superset and subset: we introduce a new "placeholder" concept, and place our concept along with the overlap concept as children of that new concept.

As in the superset transformation, we need to check other siblings in C. If a in I overlaps b1 in C, it can also overlap b2 in C. If a overlaps b1, b2, then we need to create a new concept in C for {a, b1, b2}, a added as a child of that concept, b1 and b2 both "deepened" to be children under the concept. If we assume b1 and b2 are disjoint, then this structure will work.

Note that overlapping is a symmetrical relation between models I and C, so we don't need two cases to consider. However, because of this fact, and because of the similarities in overlap vs. superset, this one case forces us to consider all siblings in I before we commit to the new structure; if we don't do this we will need lots of extra flags, etc., and more special-case processing later on. Thus an additional complexity is that we need to check other siblings in $I_i$ for overlap as well.

In fact, in the case of overlap we may have an arbitrary number of concepts in the sibling sets of $I_i$ and C that overlap in a "chained" manner. The outcome we would want would be a single "synthetic" concept which represents the union of all these connected overlapping concepts. Assuming we adopt a processing approach that results in separate synthetic unions of this sort being processed at different times during the correlation phase, we follow a rule that a synthetic category be merged with any synthetic category already in place.

Furthermore, we adopt a rule which says that, when matching siblings in a set, we do not attempt to match synthetic concepts but instead recurse down and match their children. (Since we do not generate successive synthetic concepts there will be at most one level of indirection here.)

By adopting these conventions for handling the "synthetic category" introduced for overlapping concepts, we solve the problem of having to process all the siblings in I in parallel. We can now proceed sibling by sibling, with the confidence that each will be checked appropriately.

Hybrids

We can also run into various hybrid situations, but not unlimited ones (otherwise they would violate the assumed semantics of the models). For example, a concept a in $I_i$ might have an overlap with concept b1 in C, and a subset or superset relation with another concept b2 in C.

Suppose a concept a in I overlaps b1 in C, and a is also a superset of b2 (with b1, b2 disjoint). In this case, we want to wind up with the following structure: Root ({a,b1} (a(b2),b1),); that is, b2 is moved down to be a sub-category of a even though a is added as a sub-category of the newly introduced {a,b1} category.

Suppose a overlaps b1, and a is a subset of b2. Then b1 would at least have to overlap b2; since these are in C we can choose a protocol which enforces such situations away (e.g., insist on single-link semantics for C). The same situation could happen symmetrically, i.e., a1 overlaps b, a2 a superset of b.

Anomalies

Last but not least, we can decide the concept is truly anomalous at this point in the structure, and determine whether to allocate it to C, V or the remainder model. If it is allocated to C, then a new concept is created in C corresponding to the concept in the input model, all the instances are copied over, and a link is created from the concept in $I_i$ to the new concept in C. The same procedure is followed for the other models.

One important difference must be supported when creating an anomalous concept in V. A feature facet must be created that links that concept to the current parent concept in C. This needs to be created whether or not the feature facet is enforced as an intensional constraint on instances created with the new C and V models. The other essential role of this facet link has to do with continuing the CFU algorithm's walk down the various input models.

Figure 25:
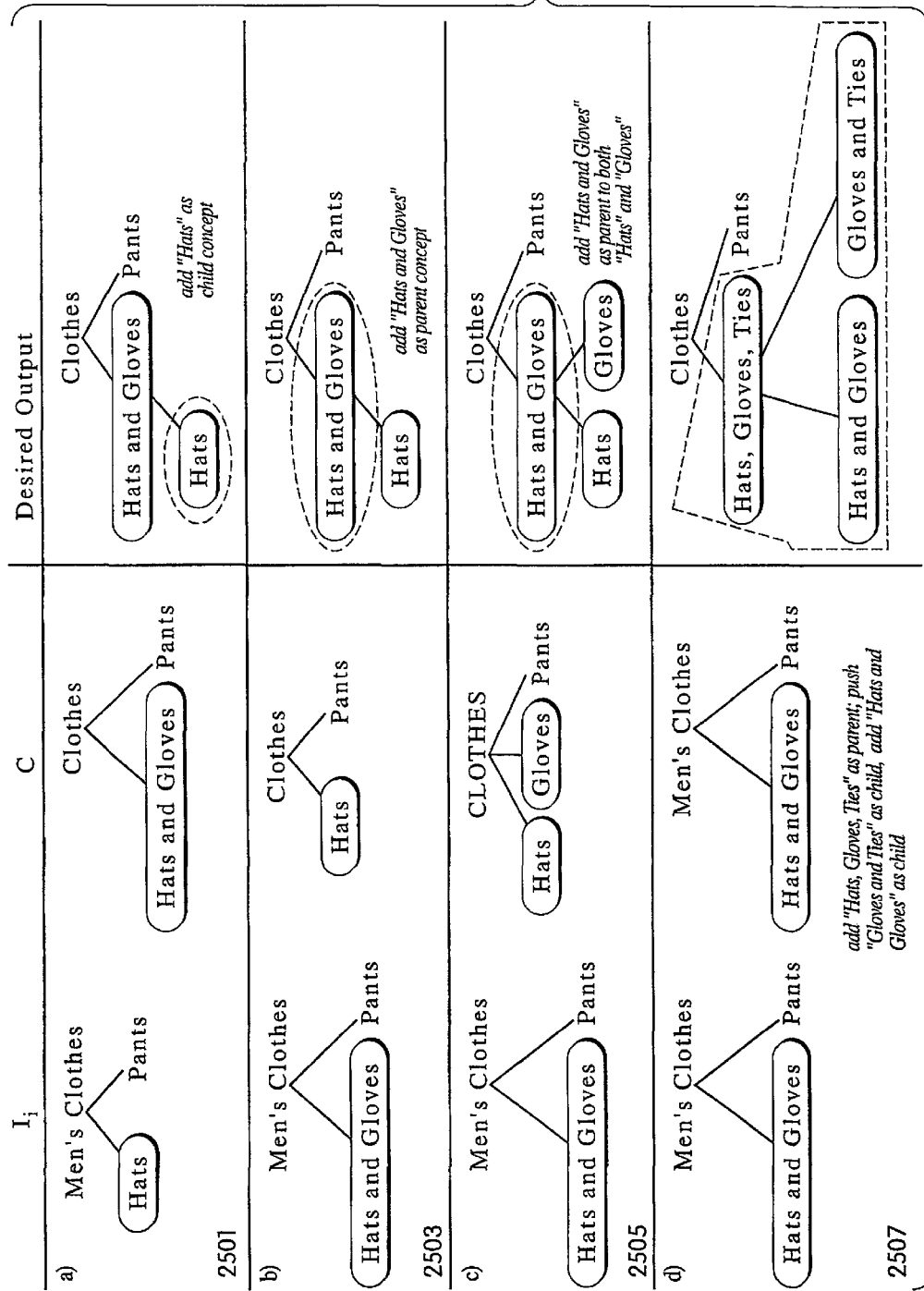
FIG. 25 shows CFU transforms involving correlations at different levels of the input trees.

Example: FIG. 25

FIG. 25 shows the desired output configurations for various types of input conditions where we can infer a subset or overlapping relationship between the incoming concept and a concept in C:

a) If the concept "Hats and Gloves" is in C and "Hats" in $I_i$: add or match the new concept "Hats" as a child of "Hats and Gloves", then return to the matching tour at the current sibling level (2501.

b) If we find "Hats and Gloves" in the input $I_i$ and "Hats" is already in C, introduce a new concept "Hats and Gloves" in C as a parent to "Hats"; demote "Hats" down from its current set of siblings to be a child of the new (or unified) concept "Hats and Gloves". The instances associated with "Hats" will remain as they are; the instances associated with "Hats and Gloves" in I will be carried over to the new concept but will not inherit to the child concept "Hats" (2503).

We assume there is no match for "Hats and Gloves" at the sibling level, or we would have already matched it. If inadvertently we introduce some overlapping terms in the siblings of C, we may have this detected either by an actual name clash (the same name used twice for concepts in C), or with overlapping extents.

c) When a superset relation is found as in case (b) above, we must try to rematch the same concept to the other siblings within C. Here, we move on to compare "Hats and Gloves" with "Gloves"; finding the subset relation, we match "Hats and Gloves" with the newly created "Hats and Gloves", and therefore attach "Gloves" to this concept via demotion (2505).

d) The final case to consider is where name syntax implies overlapping (rather than sub- or superset) relations between the concepts in $I_i$ and C. In this case the actions to perform are a composite of those required for the other cases. We introduce a new concept which is the union of the two overlapping sets (suggested by the name "Hats, Gloves, Ties"). This is the first case where we are forced to create a new concept which might be artificial in nature. We make the other two concepts children of this synthetic concept (2507).

Note that for each of the patterns above there will typically be some elicitation from the user required in order for the transformation to be posted to the composite model C.

Figure 26:
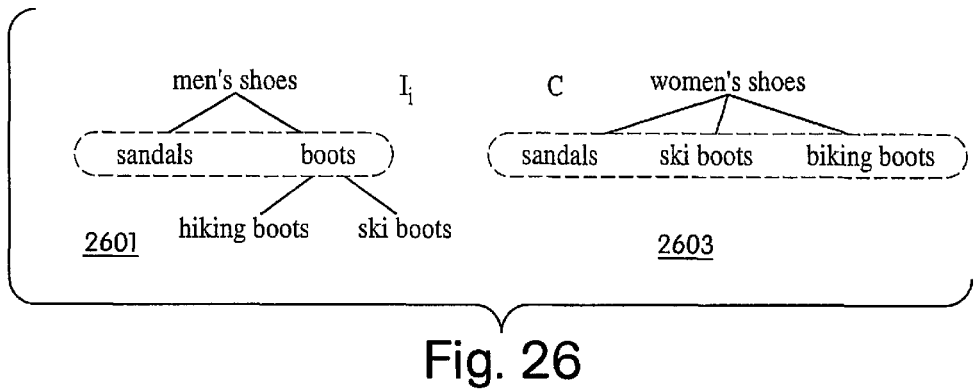
FIG. 26 shows another CFU transform involving correlations at different levels of the input trees.

Matching in Inverse Order with Inferred Superset Semantics: FIG. 26

The scenario above assumes that the composite model C is the one with more level structure. Since trees can arrive in arbitrary order, we get the other case simply by assuming a reversal of the input order for the trees. This is illustrated in FIG. 26. There are two relevant scenarios: one where there are syntactic or user-driven cues to identify the superset relation when it is first encountered; the other where this is not determined till later.

For the first case:

1) Assume "Women's Shoes" as depicted at 2603 is the current state of the composite model C, and "Men's Shoes" 2601 is the new input.

2) Sandals matches Sandals.

3) "Boots" is a candidate anomaly.

4) We now look for subset/overlap relations. "Boots" and "Ski Boots" gives a partial match (inverse of case above). That is, the match suggests "Boots" is a superset of "Ski Boots."This tells us that we are going to want to introduce "Boots" and demote "Ski Boots" below it. (We do not attempt to match "Boots" again to some sibling of "Ski Boots" in C.)

5) Since we have found a superset relation, we check the other siblings of "Ski Boots" for other possible superset relations. Continue to try to match "Boots", now to "Hiking Boots."We find syntactic evidence of a superset relation with "Hiking Boots." We now demote "Hiking Boots" to be a child of "Boots."

6) We are done with this level. Eventually we will move downward in the input subtrees until we come to process "Hiking Boots" and "Ski Boots" as the sibling set under "Men's Shoes/Boots". The match goes easily for the two children of "Boots" in C, since both were created in the earlier pass.

7) Elicitation. At various points in the sequence above we may choose to confirm or validate with the user. We can certainly validate the correctness of the guessed matches and subset relations (or even elicit these from the user.) In addition, we may want to offer the user the choice of overriding the model "style" that will be chosen be default.

When we ask for elicitation from the user, we can offer the user one of two choices: a) Add "Boots" as a new concept under "Women's Shoes" and demote "Ski Boots" from being a direct child of "Women's Shoes" to a child of "Boots." b) Prefer the "flattened" version where "Boots" goes away and "Ski boots" remains as is. In order for this to be a meaningful choice for the user to make, though, he or she will need to see the other children of "Men's Shoes/Boots" to recognize that this is a potential flattening operation as opposed to a splitting operation. Here the need for interface 1601 to provide a "fisheye" view of the relevant context is clear.

Alternative Scenario. In this scenario we presume there are no syntactic clues to guide the leveling search:

1) Assume "Women's Shoes" as depicted at 2603 is the current state of the composite, and "Men's Shoes" 2601 is the new input.
2) Once again, Sandals matches.
3) "Boots" is anomalous. We ignore the partial match of Boots to Ski Boots.
4) We add "Boots" to C as a new (direct) child concept of "Women's Shoes." Done with this round.
5) We now (eventually, in the walk of the various input subtrees) recurse down to children "Hiking Boots" and "Ski Boots" as under "Men's Shoes/Boots" in the input model.
6) There is currently nothing under "Boots" in the composite model C. So "Hiking Boots" will show up as anomalous and will be added in. (If there is a direct name duplication, a warning may be flagged; otherwise, the "false duplicate" will fall into the model C.)
7) Elicit intent from the user. We approach the same leveling choice from the other direction.
8) Repeat for Ski Boots.

Elicitation of Intent.

At the elicitation points called out above (Steps 6 and 7 respectively) we come to a critical junction in the transform. The procedure does not have a built-in default preference in these cases; we have it elicits a decision from the user.

The questions that determine the desired configuration hinge on these semantic questions:

Are all Ski Boots Boots? If the answer is yes, go with the "child" position for Ski Boots; if the answer is no, then the flattened version is preferable. By accepting the flattened version, we assert the possibility that some Ski Boots are not Boots.

Are all Boots either Ski or Hiking Boots? If the answer is Yes, the flattened version can be used; if the answer is No, the flattened version results in information loss. By accepting the flattened version, we also lose the direct concept Boots; if there are Boots that are not ski or hiking boots we will lose information about these items, because we will not be able to allocate them more specifically.

Figure 27:
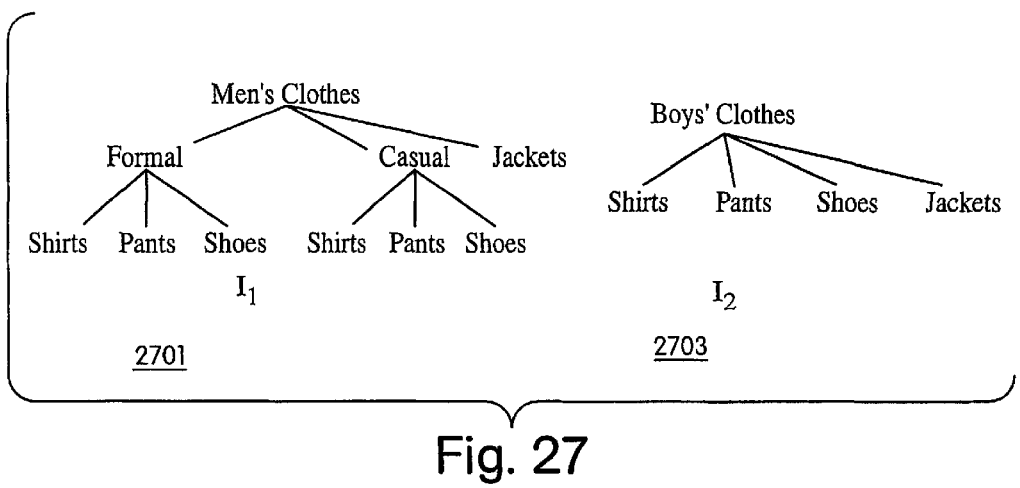
FIG. 27 shows a CFU transform involving multi-level factoring.
Figure 28:
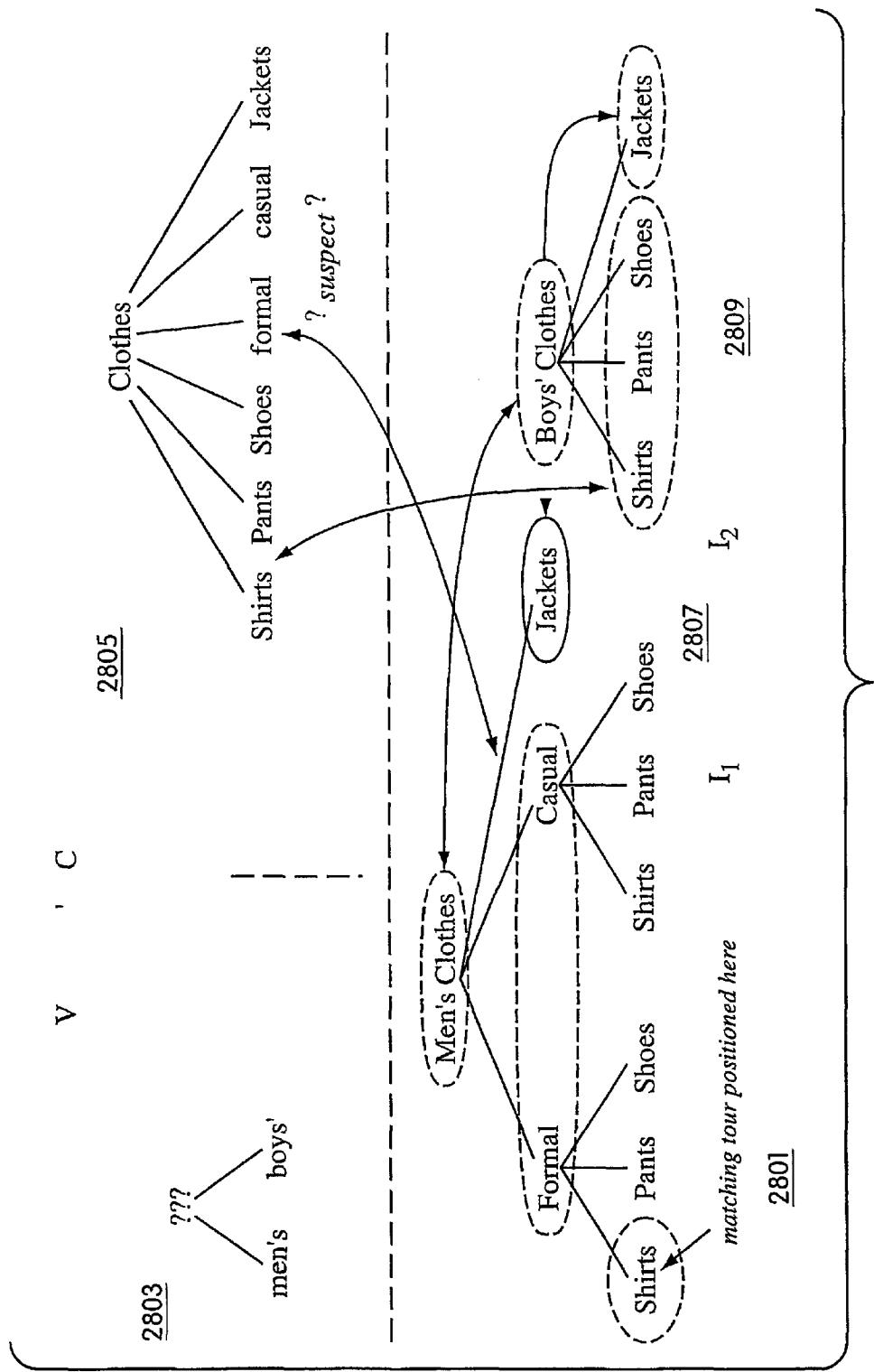
FIG. 28 shows how the CFU procedure might deal with the problem of FIG. 27.
Figure 29:
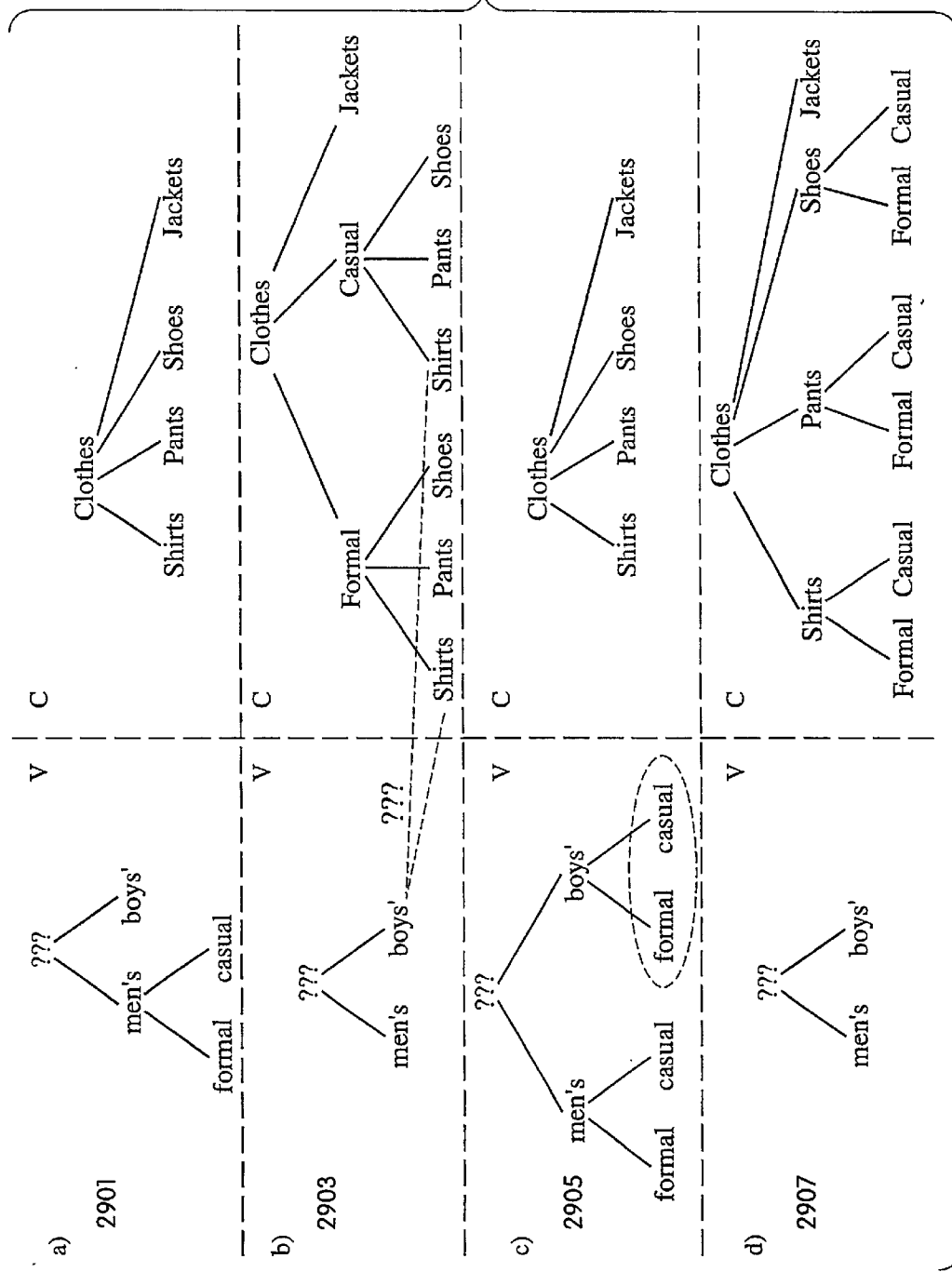
FIG. 29 shows possible solutions of the problem of FIG. 27.

Multi-Level Factoring: FIGS. 27, 28, and 29

The example shown in FIG. 27 illustrates an additional complicating element: multiple factorings, as this interacts with factoring flattened vs. relatively unflattened structures. Here we have the plausible situation that a distinction important in the realm of men's clothes (2701) (formal vs. casual) is not deemed important for boys (2703). In addition, the same subtree repeats under categories "Formal" and "Casual" under Men's Clothes. (We assume the factoring interaction is invoked from two roots, Men's Clothes and Boys' Clothes).

To clarify the precise problem faced in the transform, FIG. 28 illustrates the exact state of the transform walk at the point where the multi-level occurrence of concept Shirts is discovered. We have finished the first level siblings and have begun the children under Formal, which correlate to the currently empty subtree under the (suspect) concept Formal in C 2805.

At the point in the procedure where the problem is discovered, we do not have visibility yet onto the overall configuration. We do not know that all the other children of Men's Clothes/Formal (in 2807) will have matches in C 2805. We know only that an anomalous concept under a suspect concept has a match at the "uncle" level. This is our first hint that a multi-level factoring problem may emerge.

The configuration raises, as usual, some subtle ontological questions. In particular: are all Shirts Formal Shirts? If so, we can eliminate Shirts at the higher level in the taxonomy and leave it below Formal. We can see, informally, from the original models that this is not the case. Also, the content suggests in this case that the condition does not hold-unlike Boots and Hiking Boots, in the earlier example, which suggested a clearer superset/subset relation. But there is little structural information in the model configuration as shown to allow us to conclude this. (Compare with the Boots example earlier and it will be apparent that the pattern of concept matches, levels, etc. is very similar in the two examples, but the intended semantics is quite different.)

The following procedure handles this sort of anomaly.

We begin with an outcome like that pictured in FIG. 28. Note that in this case, some duplication remains in the models.

But there is a problem. We need to allocate current Boys' Clothes instances to the new models. With the configuration as shown, how do we link instances of, for example, Boys' Shoes? These can't be linked to Shoes under either Formal or Casual, as these distinctions do not apply to the current extent of Boys' Clothes.

The following steps outline the performance of the algorithm (refer to FIGS. 27 and 28):

1) Assume Boys' Clothes 2703 is the first set of siblings seen. These are carried over to C 2805 as is.
2) Concept "Formal" in 2801 is anomalous, is carried over to C 2805 as a "suspect" concept.
3) Similarly with concept "Casual".
4) Jackets matches.
5) Done with this level. C 2805 now has: Shirts, Pants, Shoes, Jackets, Formal, Casual, Jackets. Recurse to next set of siblings.
6) Under Formal in 2701 we find "Shirts." Anomalous since C 2805 has no sub-structure as of yet below Formal.
7) Because it takes place under a suspect concept, we search "Uncle" level concepts before adding it. We find a match.
8) Once again, we face a modeling problem; which is preferable? Elicit the answer from the user, prompting with the semantic import of the different possible decisions:
   If we leave Formal in C 2805 we are saying that Formal and Casual were extensional attributes of Men's Clothes. There could be Boys' Formal and Boys' Casual, and the model simply had not articulated these.
   If we make Formal part of V 2803, we are saying the category is relevant only to Men's Clothes; i.e., it has intensional import in the model.

Intensional Scenario. Assume we decide Formal is intensionally correlated to Men's Clothes. (See the discussion below for the alternative scenario.)

1) We move Formal to V, unify Shirts, link instances to both Shirts in C and Men's/Formal in V.
   We now must reset the "current sibling list" in C from the (null) children list under Formal (a concept now placed in the other factor model V), back to the "uncle" level sibling list.

At the same time, we must remember our context within the model V, which is now positioned at Men's/Formal.

2) Repeat the matching procedure for Pants. Only now, Pants is directly matched to its analogue in C. We link instances to that concept and to Men's/Formal in V. Similarly for Shoes.

3) We have finished the children of concept Formal in the original input model $I_i$. We now move on to the children of concept Casual.

We have to reset context in V back to Men.

Similarly, we find the analogous (still "suspect") concept Casual in C (as of yet with no children).

4) We match Shirts, which is anomalous under a suspect concept, so check siblings of Casual in C.

5) Process as above (Steps 7–11) for children under Casual. The result is as shown in FIG. 29 (a) (2901).

Extensional Scenario. Starting from Step 8 above: Assume that, instead of Steps 9–13 above, we decide the concept Formal was only extensionally correlated with Men's Clothes. This means we are willing to allow for instances of Boy's Formal (and presumably, but not necessarily, Casual) Clothing to be added to the model later.

In this option we choose the approach that takes account of the actual instances in the current configuration. In saying the concept Formal is extensional, we are saying that instances of Boys' Formal Shirts should be allowed in the model. We know, by informal inspection of the original models, that there are currently no known instances classified this way (as the original models could not have captured this information). So, only by re-classifying or further classifying current instances, or adding new ones, would we need to accommodate Boys' Formal Shirts. This means we could simply follow the same approach as in the intensional case and move the concept Formal to V as in Step 9 above, and illustrated in FIG. 29 at 2901. If and when we need the new category we can introduce it by duplicating the concept Formal under Boys' in V, as indicated in FIG. 29 at 2905. This approach suggests that in this situation we always build the same factored models regardless of the intensional or extensional status. Only in later model evolution might we duplicate Formal/Casual in model V. If this occurs, we have the option of iteratively invoking factoring on that model. Model V will effectively be submitted as the input source model, and the Gender model would result as V2, the "Formality" model as C2.

Modified Intensional Scenario.

Finally, there is another solution illustrated at 2907 in FIG. 29. Recall that the semantic question "begged" by the multi-level match was: "Are all Shirts Formal?" Since "Boys' Shirts" don't use the "Formal" distinction, the answer is no. Yet there may be a significant subset of shirts that are intensionally Formal. In this case, we can create a concept which stands for the subset of "Formal Shirts". That is, instead of making "Shirts" a sub-concept of "Formal" as in the problematic Figure (b), we make "Formal (Shirts)" a sub-concept of Shirts in model C. We may need to repeat this strategy for some siblings of "Shirts" such as "Pants" and "Shoes." So we are potentially introducing some duplication back into C. However, this last solution (d) seems to address many of the concerns that have emerged in the discussion so far:

We do not reduplicate Shirts, since this causes an assignment problem as we have seen.

We retain the ability to describe Boys' Shirts without use of the Formal characteristic. (In fact, these instances stay allocated to the concept they were allocated to previously.)

Men's Formal shirts can be allocated to the new concept without loss of semantic expressiveness.

The model can accommodate later evolution of the model introducing Boys' Formal (or Casual) Shirts. (Similarly, Men's Shirts without the qualification of Formal vs. Casual could be supported.)

Figure 30:
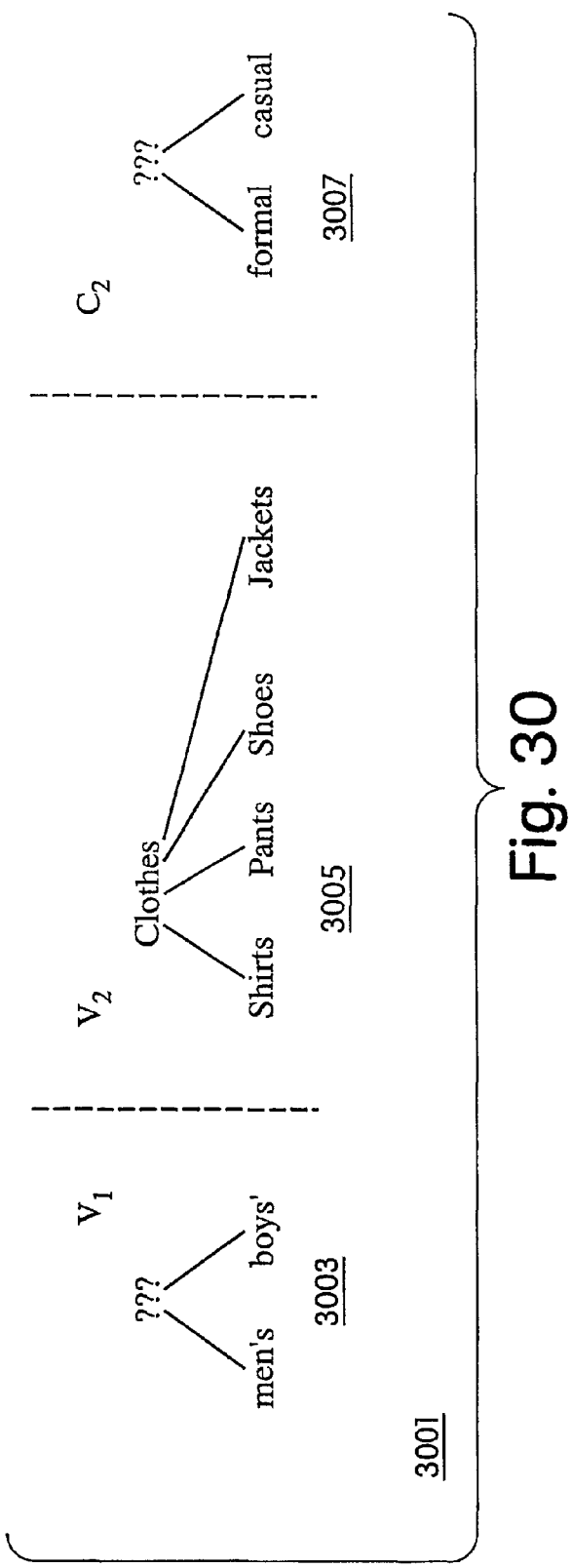
FIG. 30 shows another possible solution of the problem of FIG. 27.

Although the end result has duplication (literally, a "flipping of the axes" for the original model) this also creates clear conditions for iterative execution of the transform-with the subtrees rooted at concepts Shirts, Pants, and Shoes within the Clothes model (Model C in 2907 of FIG. 29) as the three inputs. This iterative execution of the transform will result in a constellation 3001 of the same three models we might have intuitively derived when viewing the three factors, as illustrated in FIG. 30. (Note that we would arrive at the same three models 3001 if we had chosen the alternative at 2905. However, in this case C rather than V would be submitted as the new input model, to the second iteration of the transform; and the Clothing model would be V2, the Formality model C2).

Further Sequencing.

Returning to the illustration in FIG. 28, suppose we have finished processing Men's Clothes/Formal/Shirts and now move on to Pants. In order for the algorithm to work out properly it is important that the suspect concept Clothes/formal still be in C.

The rule of thumb is that, if a suspect concept is added to C, it should remain in the model until the subtrees underneath the concepts from (all!) the original input models $I_i$ have been allocated. Once all these instances have been assigned, we can do a "cleanup" pass over C. If none of the matches have resulted in "utilization" of the concept (no instances assigned to it, no children created for it, no feature links or constraints) then it can be removed.

Figure 31:
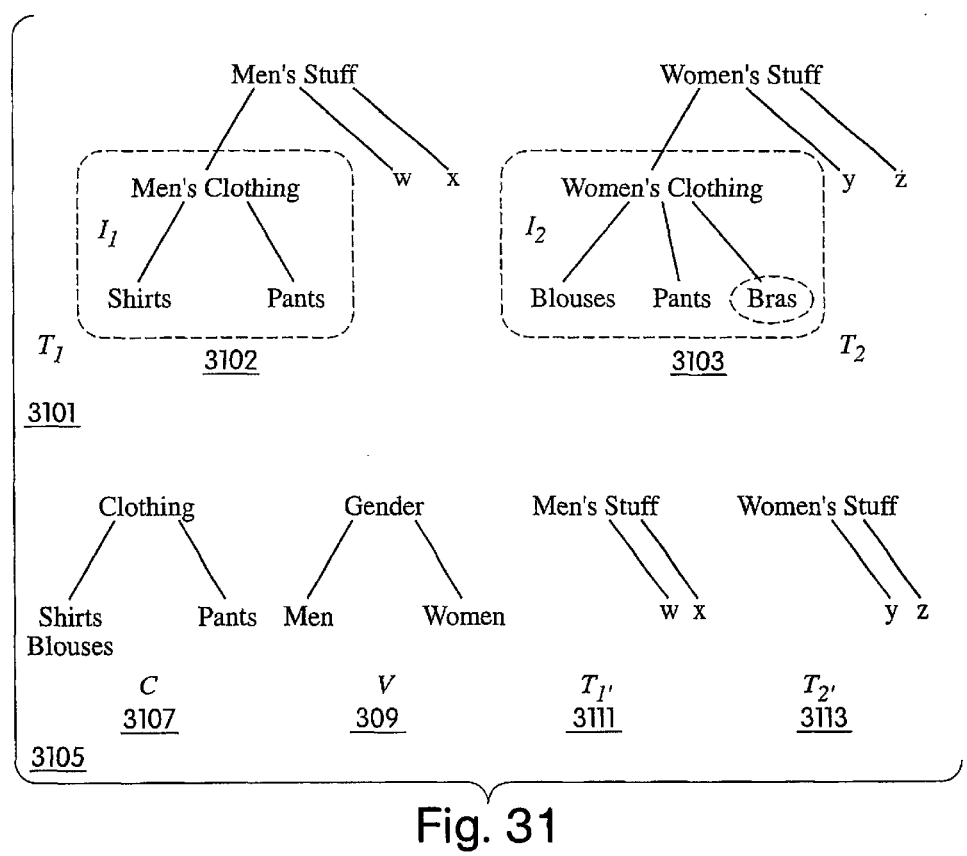

Allocation: FIG. 31

When a single taxonomy has redundant substructure, the subtrees to be factored will in some cases be literal copies that can be matched via simple textual comparison. Where this is the case an almost mechanical and largely automated procedure is sufficient to facilitate factoring. However, in most factoring transformations some but not all the concepts in one input subtree will have clear analogies in the others.

Formal Problems in Allocating Anomalous Concepts: FIG. 31

We term anomalous concepts (or, in this context, simply "anomalies") as a concept which, at the time that correlations are made between the input subtree and C, is deemed to have no match or subset relation in C and therefore becomes a candidate to be added as a new concept, either into C or V. Once added into C, we continue to use the term "anomaly" informally to mean a concept that has linkage to only one input concept. The anomaly may be the result of originally replicated models that were subject to different diverging modifications in different contexts, or models that were independently developed to describe analogous subject areas. It may also be a transient artifact of the sequencing of input trees in the CFU "walk"; so that concepts which are treated as anomalies when they first enter the model C will typically become matches later on.

As an example of the problem of anomalous concepts, suppose we have the original models 3102 and 3103 shown in FIG. 31. The factored models will be as shown at 3105. But where should we place the concept Bras from source model 3103? Since Bra shows up under Women's Clothing and not under Men's Clothing, what is the status of the missing category? How, if at all, do we preserve the implicit information conveyed (or implied) by the original models (i.e., that there are no men's bras)? Is this implicit information actually what the modelers intended? Is it correct, or have we discovered an opportunity for innovation?

CFU provides a systematic "walkthrough" of the models, prompting users for qualitative elicitation and analysis at key points. Though overall procedure is far more streamlined and efficient than manual modification would be, there is still a key "human in the loop" component.

Handling Anomalies

In the following paragraphs we outline a procedure for handling anomalous concepts. For simplicity we consider a scenario with two sets of sibling concepts to be matched and one concept that is clearly an anomaly according to the matching protocol employed. We need to decide where the anomalous concept will reside.

Recommended Procedure. The algorithm for handling anomalies proceeds in the following way:

1) Overall criteria and defaults are established for the factoring pass.
2) The trees are "walked" by the main CFU algorithm, resulting in comparisons of a given group of concept "sibling sets" in multiple input subtrees.
3) Matching criteria are applied to find analogous concepts within the various subtrees. These matching criteria may try to take many factors into account (such as Ariadne decorations, possible splits, merges and level shifts, or the evidence of overlapping extents of the concepts).
4) Once anomalous concepts have been identified, the user is presented with a set of choices for how to allocate the concepts. The semantic implications of the choices can also be made clear through the interaction (with varying degrees of explanatory support provided).
5) Depending on the approach to the walk of the input models, look-ahead and user choices, it may be necessary in some cases to backtrack, undo previous decisions, or otherwise modify the output models as part of the procedure.

This strategy depends on the following criteria:

Is the commonality model C to be produced intended to represent the intersection of the synthesized subtrees (that is, only concepts that occur in all the subtrees) or their union (concepts that occur in any of the subtrees?

Is intensionality expressed or implied by occurrence or non-occurrence of particular concepts in different subtrees? In our example, there is no concept Bras under Men's Clothes. Do we assume that the models are exhaustive in describing what is in the world; i.e., that there are no men's bras? Or do we take the position that absence of the concept does not necessarily imply emptiness of the category?

Similar issues arise regarding the extensionality expressed or implied by the instances associated with each concept.

Case by Case Allocation of Anomalous Concepts

This is a hybrid strategy that employs different strategies on a concept-by-concept basis. The major issue here is how to decide when to place the concept into C, the "composite" factor (In our example, Bras would be added as a concept under Clothing), and when place the concept into V, the "variability" factor (In our example, Bras would be placed under Women). If the user determines that the intent of the factoring is that some concept really should be in the intersection of all models (e.g., there should be a possibility for men's skirts, even if none were present in the original men's model), then the concept goes into the commonality factor C. If, on the other hand, the intent of the factoring is that the concept really is unique to some input models (e.g., maternity clothing is essentially for women only, and never for men), the concept goes into the variability model V.

Recommended Strategy. Given the alternatives above, the recommendation for handling anomalous concepts in this implementation of the CFU transform is as follows:

Establish the intended scope for model C at the start of the interaction. In particular, choose whether we want the model to reflect union vs. intersection semantics. By default, intersection semantics is used. This helps ensure the overall semantic coherence of the various models.

Elicit intended semantics for anomalous concepts on a case-by-case basis per anomalous concept, to determine which constraints to link at the concept.

CFU Procedure in the Case of Anomalous Concepts

The following steps describe a desired interaction to assist the user in allocating anomalous concepts.

Defaults. For anomalous concepts, we first need defaults for where anomalous concepts should be placed?

If we have choose "intersect" protocol for the C model, by default we will tend to exclude concepts that suggest "gaps" (like swimsuits when there are no swimsuits to offer). After the initial case, under intersect protocol the default position for an anomalous concept would be in the appropriate subtree of V.

If we have chosen "union" protocol for the composite model, the default position for an anomalous concept would be added into the composite model C.

We could also specify that anomalies are directed by default to $T_i'$.

Elicitation. For each anomalous concept we can ask the following questions (using the "bra" example):

"Are there already male bras in the current extent?" (This can be tested autonomously by an Ariadne agent.) In this case, the anomaly in the concepts would likely be a result of poor classification and the case would resolve to the more typical matching case.

"Is there a men's undergarment (i.e., closest relevant matched concept in the two subtrees) which is the equivalent of a bra?" Here we are testing the intensional gap. If we find a match, we have reverted back to a potential correlation and fallen out of anomaly processing; however, we may need to handle naming preservation differently.

"Are all bras women's undergarments?"
(No—men's support bras) put the concept in the Clothing (C) model. The "gap" is extensional in nature rather than essential; we do not need to consider adding a constraint to enforce the correlation of Bras with Women's Clothes. (On the contrary, we might want to elicit a placeholder for a "counter-instance" to be placed as an instance. The counter-instance could be tracked (via an infrastructure concept) as a particular category of instance that does not correspond to a specific item. By creating this instance it would exclude "men's bra" from being caught in a gap analysis run on the models. Strictly speaking this is going beyond the scope of processing required for factoring and supporting pre-work for gap analysis.)

Yes: We have determined a necessary feature of the concept Bra. Put the concept Bras in the Gender (V) model w/no constraint.

CONCLUSION

The inventors have disclosed to those skilled in the pertinent arts the best mode presently known to them of making and using systems which perform the CFU transform on input graphs. While the transform can be used with particular advantage with taxonomies that represent catalogs of items, it can be used with any graphs having facet types such that a hierarchical walk through the graph is possible. The inventors have disclosed a prototype implementation of their invention and have also disclosed how other embodiments may use correlation techniques different from those employed in the prototype and may deal with correlations at different levels of the graphs. While the prototype is implemented in the Ariadne system, the techniques of the invention can be used generally with graphs and do not require the use of the Ariadne system. The inventors have further disclosed two different user interfaces for indicating whether the nodes belonging to a tuple of nodes are in fact analogous; other embodiments may employ other user interfaces. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method performed in a system having a processor, a memory accessible thereto, and a user interface of unifying child nodes of a plurality of parent nodes from one or more other graphs into composite graph child nodes of a composite graph parent node in a composite graph, the graphs being stored in the memory and the method comprising the steps performed by the processor of:

correlating the child nodes, including any of the composite graph child nodes, to produce one or more sets of possibly analogous nodes;

displaying a representation of the set of possibly analogous nodes in the user interface and receiving an indication via the user interface whether nodes in the represented set are taken to be analogous; and making siblings of the composite graph child nodes of the composite graph parent node as required to provide a composite graph child node corresponding to each of the indicated sets of analogous nodes.

2. A method performed in a system having a processor and a memory accessible thereto of correlating a node in a first graph with a possibly analogous node in a second graph, both graphs being stored in the memory and the method comprising the steps performed by the processor of:

analyzing the first node's relationship to another node in the first graph to obtain a first result;

analyzing the second node's relationship to another node in the second graph to obtain a second result; and using the results to determine at least in part whether the first node is correlated with the second node.

3. A system for unifying similar structures from one or more source graphs into a composite graph, the system comprising:

a correlator that correlates nodes from similar portions of the similar structures to find one or more sets of possibly analogous nodes;

a user interface that displays a representation of the set of possibly analogous nodes and receives an indication whether the represented nodes are taken to be analogous; and an allocator that allocates the indicated set of analogous nodes to a corresponding node in the composite graph.

4. The system set forth in claim 3 wherein:

when there is no corresponding node in the composite graph, the allocator adds a corresponding node thereto.

5. The system set forth in claim 3 wherein:

the correlator correlates nodes from similar portions of pairs of similar structures; and the representation of the set of possibly analogous nodes represents a pair of possibly analogous nodes.

6. The system set forth in claim 3 further comprising:

a variability graph containing nodes corresponding to nodes in the similar structures that differentiate the similar structures one from another.

7. The system set forth in claim 6 wherein:

the user interface further displays the similar structures and receives indications of the differentiating nodes therein; and the system further responds to the indications of the differentiating nodes by allocating nodes in the variability graph corresponding to the indicated differentiating nodes.

8. The system set forth in claim 6 wherein:

the system further comprises a remainder graph corresponding to each of the source graphs, each remainder graph containing those nodes of the source graph that do not have corresponding nodes in either the composite graph or the variability graph, whereby no information contained in the source graphs is lost.

9. The system set forth in claim 3 wherein:

the nodes in the source graphs and the composite graph represent concepts;

the concept nodes in the source graphs are associated with item instance nodes; and when a concept in a given one of the similar structures has a corresponding concept in the composite graph, the allocator associates each item instance node associated with the concept with the corresponding concept in the composite graph.

10. The system set forth in claim 6 wherein:

the nodes in the source graphs, the composite graph, and the variability graph represent concepts;

the concept nodes in the source graphs are associated with item instance nodes; and the allocator associates each item instance node associated with a concept in a given one of the similar structures that has a corresponding concept in the composite graph with the corresponding concept in the composite graph and with a node in the variability graph that corresponds to a node in the given similar structure.

11. The system set forth in claim 6 wherein:

the nodes in the composite graph and the variability graph represent concepts;

the composite graph is a concept graph and the variability graph is a feature graph; and the allocator connects each node allocated to the composite graph to the nodes in the feature graph that are features of the nodes in the set of nodes corresponding to the allocated node.

12. The system set forth in claim 3 wherein:

the source graphs are not permanently altered by operation of the system thereon.

13. The system set forth in claim 3 wherein:

one or more of the source graphs is a pre-existing composite graph.

14. The system set forth in claim 12 wherein:

the pre-existing composite graph was produced by the system.

15. The system set forth in claim 3 wherein:

the similar structures are parent nodes with child nodes, the parent nodes corresponding to a node in the composite graph;

the correlator correlates the child nodes; and the allocator allocates a correlated child node to a corresponding node in the composite graph that is a child of the node in the composite graph that corresponds to the parent nodes in the similar structures.

16. The system set forth in claim 15 wherein:

having correlated and allocated the child nodes in the similar structures, the system correlates and allocates the nodes in any further similar structures, each further similar structure having one of the correlated and allocated child nodes as a parent node.

17. The system set forth in claim 16 wherein:

the parent nodes of the further similar structures correspond to the same node in the composite graph.

18. The system set forth in claim 3 wherein:

the correlator correlates the nodes at least in part on the basis of a value of a property in the nodes being correlated.

19. The system set forth in claim 18 wherein:

the correlation is on the basis of a best match between the values of the properties.

20. The system set forth in claim 18 wherein:

the correlator correlates the nodes additionally on the basis of similar locations in the similar structures.

21. The system set forth in claim 20 wherein:

the similar structures are trees; and the correlator correlates nodes belonging to corresponding levels in the trees.

22. The system set forth in claim 3 wherein:

the correlator correlates the nodes at least in part on the basis of similarity of relationships between nodes and the structures to which the nodes belong.

23. The system set forth in claim 22 wherein:

the similar structures are trees; and the correlator correlates nodes belonging to corresponding levels in the trees.

24. The system set forth in claim 22 wherein:

the nodes in the source graphs are connected by typed facets; and the correlator correlates the nodes at least in part on the basis of similarity of facets.

25. The system set forth in claim 22 wherein:

the nodes in the source graphs and the composite graph represent concepts;

the concept nodes in the source graphs are associated with item instance nodes; and the correlator correlates the nodes in the source graphs at least in part on the basis of similarity of item instance nodes.

26. The system set forth in claim 3 wherein:

the user interface further receives editing inputs for editing the set of possibly analogous nodes; and the indication whether the represented nodes are to be taken as analogous is an accept input for accepting the set of possibly analogous nodes as edited.

27. The system set forth in claim 26 wherein:

the user interface further includes a representation of nodes that do not belong to the set of possibly analogous nodes and the editing inputs include a first editing input that indicates that the set of possibly analogous nodes is not taken to be analogous and a second editing input that indicates that nodes in the representation of nodes that do not belong to the set of possibly analogous nodes are to be taken as analogous.

28. The system set forth in claim 27 wherein:

the user interface responds to the first editing input by adding any node that is not taken to be analogous to the representation of nodes that do not belong to the set of possibly analogous nodes and responds to the second editing input by adding the nodes that do not belong to the set of possibly analogous nodes but are to be taken as analogous to the representation of possibly analogous nodes.

29. The system set forth in claim 26 wherein:

the user interface further includes representations of contexts of the nodes in the set of possibly analogous nodes.

30. The system set forth in claim 26 wherein:

the user interface further includes a representation of a method used to correlate the nodes in the set of possibly analogous nodes.

* * * * *